United States Patent
Da Silva et al.

(10) Patent No.: US 12,323,817 B2
(45) Date of Patent: Jun. 3, 2025

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventors: Icaro L. J. Da Silva, Solna (SE); Claes Tidestav, Bålsta (SE); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 17/642,799

(22) PCT Filed: Sep. 8, 2020

(86) PCT No.: PCT/SE2020/050843
§ 371 (c)(1),
(2) Date: Mar. 14, 2022

(87) PCT Pub. No.: WO2021/066700
PCT Pub. Date: Apr. 8, 2021

(65) Prior Publication Data
US 2023/0007499 A1  Jan. 5, 2023

Related U.S. Application Data

(60) Provisional application No. 62/909,803, filed on Oct. 3, 2019.

(51) Int. Cl.
H04W 36/24 (2009.01)
H04W 16/18 (2009.01)
(Continued)

(52) U.S. Cl.
CPC ........... *H04W 16/18* (2013.01); *H04W 24/02* (2013.01); *H04W 36/249* (2023.05); *H04W 36/00692* (2023.05)

(58) Field of Classification Search
CPC combination set(s) only.
See application file for complete search history.

(56) References Cited

U.S. PATENT DOCUMENTS

2019/0075550 A1* 3/2019 Lee .................. H04W 72/23
2019/0208429 A1* 7/2019 Hong ................ H04L 5/001
(Continued)

FOREIGN PATENT DOCUMENTS

WO  2019160342 A1  8/2019

OTHER PUBLICATIONS

International Search Report and Written Opinion of the International Searching Authority for PCT International Application No. PCT/SE2020/050843 dated Dec. 9, 2020.
(Continued)

*Primary Examiner* — Hanh N Nguyen
(74) *Attorney, Agent, or Firm* — Sage Patent Group

(57) ABSTRACT

A method performed by a User Equipment, UE is provided. The UE receives from a network node, a higher layer configuration comprising a set of SpCell configurations, to be configured in the UE. While being in connected state, the UE receives a lower layer signaling from a network node. The lower layer signaling comprises an indication. The indication indicates one or more SpCells comprised in the set of SpCell configurations, to be any one or more out of: activated or deactivated.

22 Claims, 26 Drawing Sheets

(51) Int. Cl.
*H04W 24/02* (2009.01)
*H04W 36/00* (2009.01)

(56) References Cited

U.S. PATENT DOCUMENTS

| | | | |
|---|---|---|---|
| 2022/0078670 A1* | 3/2022 | Kung | H04W 74/0833 |
| 2024/0040444 A1* | 2/2024 | Damnjanovic | H04W 36/0061 |
| 2024/0334263 A1* | 10/2024 | Zhang | H04W 36/00835 |

OTHER PUBLICATIONS

Mediatek Inc., "RRC Configurations Related to Conditional Handover in NR," R2-1908946, 3GPP TSG-RAN WG2 Meeting #107, Prague, Czech Republic, Aug. 26-30, 2019, 5 pages.

ASUStek, "Remaining issues on beam management," R1-1807210, 3GPP TSG-RAN WG1 Meeting #93, Busan, Korea, May 21-25, 2018, 9 pages.

Samsung, "New MAC CEs for NR MIMO," R2-1802418, 3GPP TSG-RAN WG2 Meeting #101, Athens, Greece, Feb. 26-Mar. 2, 2018, 18 pages.

Ericsson, "On signalling reduction for beam management," Tdoc R1-1809214, 3GPP TSG-RAN WG1 Meeting #94, Gothenburg, Sweden, Aug. 20-24, 2018, 3 pages.

Ericsson, "Lower-layer mobility enhancements," Tdoc R1-1902528, 3GPP TSG-RAN WG1 Meeting #96, Athens, Greece, Feb. 25-Mar. 1, 2019, 8 pages.

3GPP TS 38.212 version 15.6.0 Release 15, "5G; NR; Multiplexing and channel coding," ETSI, Jul. 2019, 106 pages.

3GPP TS 38.214 V15.6.0, "3rd Generation Partnership Project; Technical Specification Group Radio Access Network; NR; Physical layer procedures for data (Release 15)," Jun. 2019, 105 pages.

3GPP TS 38.321 version 15.3.0 Release 15, "5G; NR; Medium Access Control (MAC) protocol specification," ETSI, Sep. 2018, 77 pages.

3GPP TS 38.331 version 15.6.0 Release 15, "5G; NR; Radio Resource Control (RRC); Protocol specification," ETSI, Jul. 2019, 516 pages.

3GPP TS 38.300 V15.6.0, "3rd Generation Partnership Project; Technical Specification Group Radio Access Network; NR; NR and NG-RAN Overall Description; Stage 2 (Release 15)," Jun. 2019, 99 pages.

3GPP TS 38.321 V15.6.0, "3rd Generation Partnership Project; Technical Specification Group Radio Access Network; NR; Medium Access Control (MAC) protocol specification (Release 15)," Jun. 2019, 78 pages.

* cited by examiner

Intra-cell beam management
No RRC signalling involved for the switching

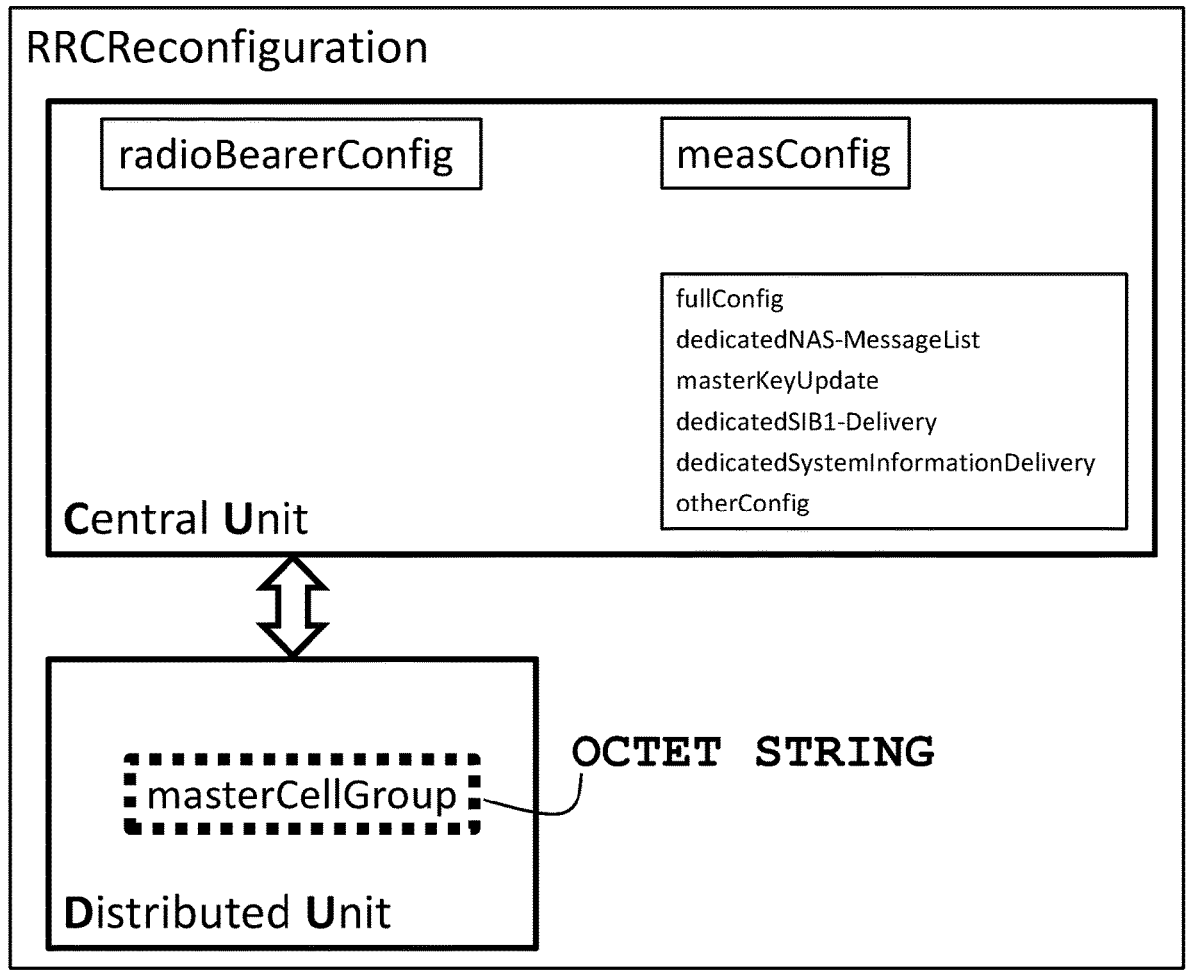
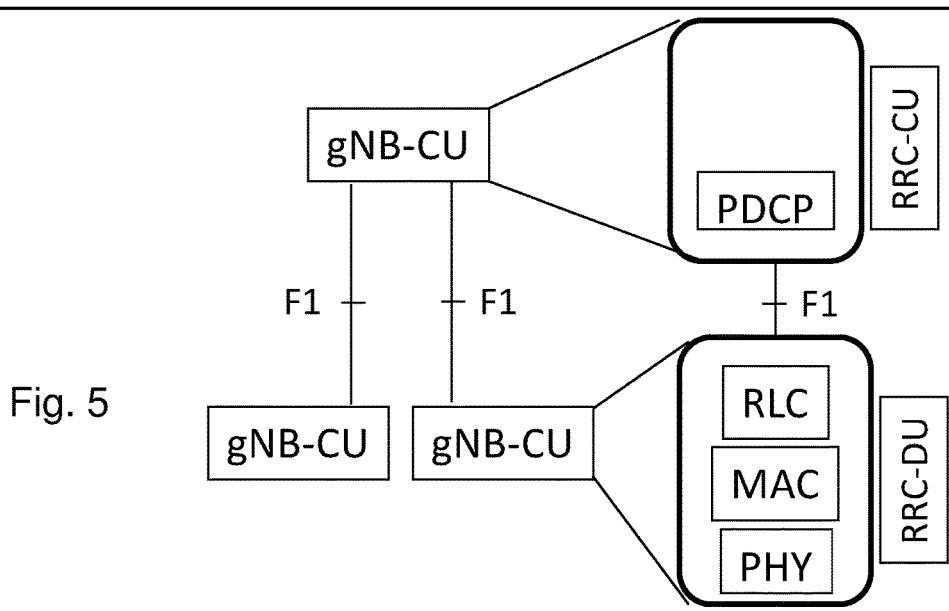
Fig. 5

| R | Serving Cell ID | | | | | BWP ID | | Oct 1 |
|---|---|---|---|---|---|---|---|---|
| $T_7=1$ | $T_6=0$ | $T_5=1$ | $T_4=1$ | $T_3=0$ | $T_2=1$ | $T_1=0$ | $T_0=0$ | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=1$ | Oct 3 |

Fig. 10

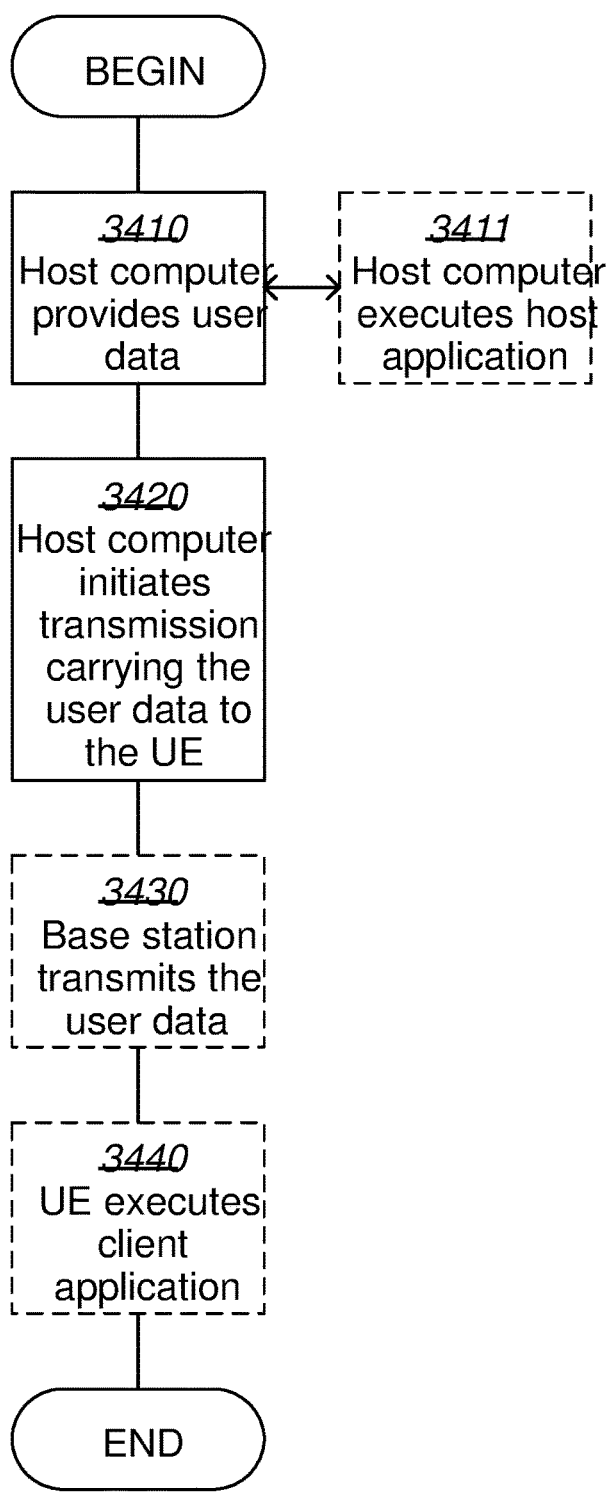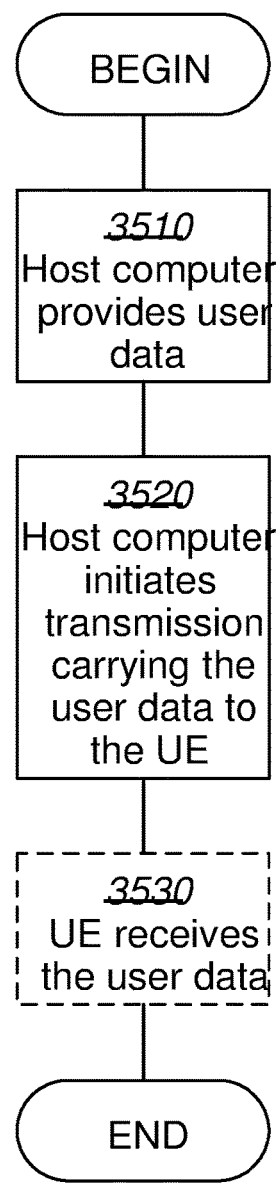
FIG. 24
FIG. 25

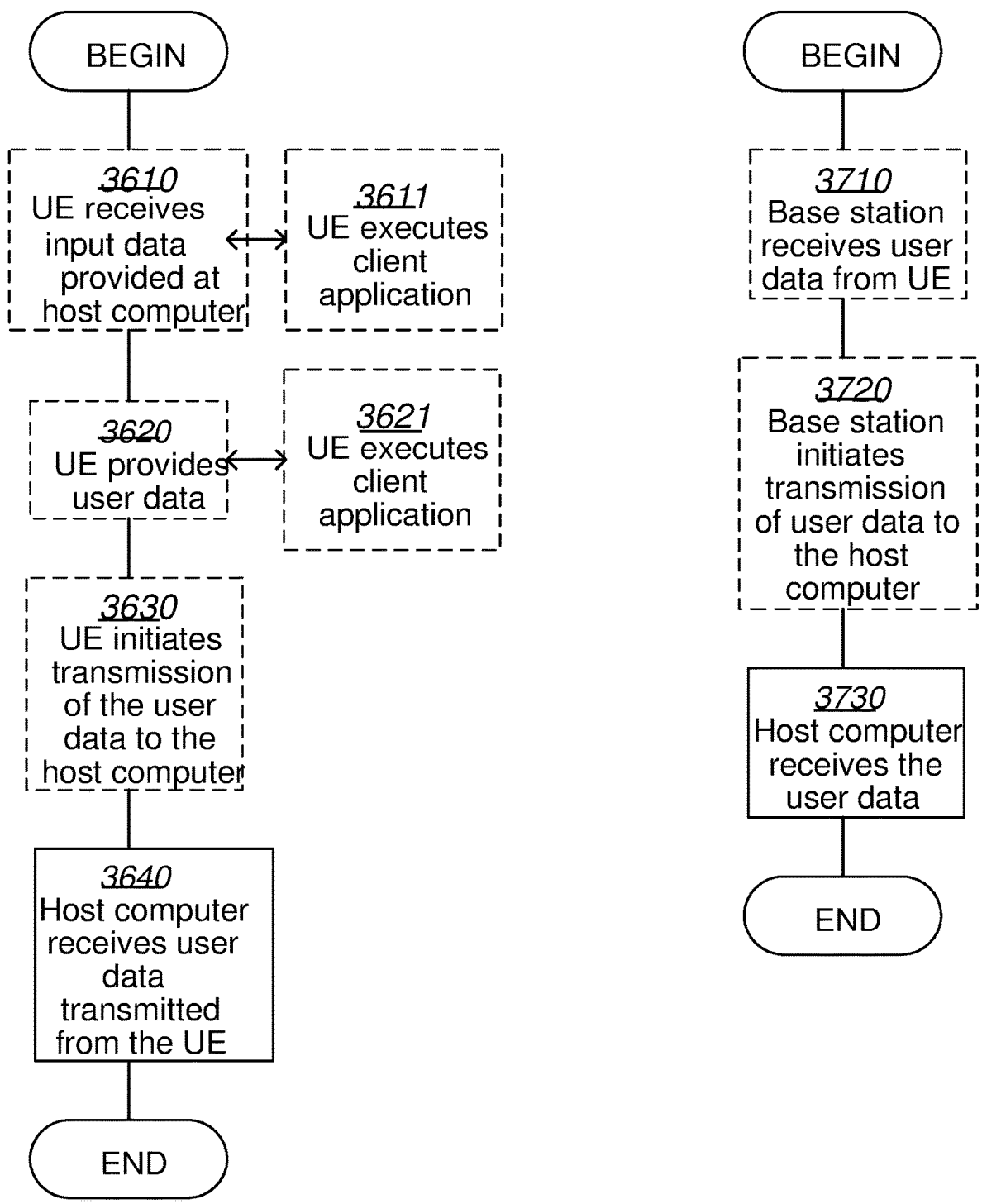

USER EQUIPMENT, NETWORK NODE AND METHODS IN A WIRELESS COMMUNICATIONS NETWORK

CROSS REFERENCE TO RELATED APPLICATIONS

This application is a 35 U.S.C. § 371 national stage application of PCT International Application No. PCT/SE2020/050843 filed on Sep. 8, 2020, which claims the benefit of U.S. Provisional Patent Application Ser. No. 62/909,803, filed on Oct. 3, 2019, the disclosures and content of which are incorporated by reference herein in their entireties.

TECHNICAL FIELD

Embodiments herein relate to a User Equipment (UE), a network node and methods therein. In some aspects, they relate to handling of SpCells in a wireless communications network.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Mobility in 3GPP 5G NR Release-15

Early during the 3GPP Release-15 standardization, it was agreed that NR would support two types of mobility:

Mobility without Radio Resource Control (RRC) involvement (intra-cell);

Mobility with RRC involvement (inter-cell);

Mobility with RRC involvement is quite similar to the LTE mobility functionality: it is based on event-driven measurement reporting over RRC, where the UE performs measurement on various reference signals (mapping to cells) and filters these measurements. When the filtered measurements fulfil certain criteria parametrized by the NW, the UE will trigger a measurement report. However, differently from LTE a cell may be defined by multiple beams, which may be realized by multiple Synchronisation Signal (SS)/Physical broadcast channel (PBCH) Blocks (SSB) s transmitted in different directional beams, while in LTE a single broadcasted signal is transmitted, as shown in FIG. 1 which depicts differences between cell definition in NR and LTE.

That leads to a procedure where changing beams from different cells require RRC signaling and a set of UE protocols actions e.g. reset of buffers, etc.

FIG. 2 depicts Inter-cell inter-node beam changing, handover realized with RRC signaling in 3GPP Release-15.

According to 3GPP TS 38.300, for inter-gNB handover, inter-cell and inter-node mobility, the signaling procedures consist of at least the following elemental components illustrated in FIG. 3. FIG. 3 Inter-gNB handover procedures.

1. The source gNB initiates handover and issues a HANDOVER REQUEST over the Xn interface. This is possibly based on measurement reports, which may have been configured when the UE enters Connected state.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE may access the target cell without reading system information. For some cases, the information required for contention-based and contention-free random access may be included in the RRCReconfiguration message. The access information to the target cell may include beam specific information, if any.
4. The UE moves the RRC connection to the target gNB and replies with the RRCReconfigurationComplete.

NOTE: User Data may also be sent in step 4 if the grant allows.

The handover mechanism triggered by RRC requires the UE at least to reset an MAC entity and re-establish Radio Link Control (RLC). RRC managed handovers with and without Packet Data Convergence Protocol (PDCP) entity re-establishment are both supported. For Data Radio Bearer (DRB) using RLC Acknowledged mode (AM) mode, PDCP may either be re-established together with a security key change or initiate a data recovery procedure without a key change. For DRBs using RLC Unacknowledged Mode (UM); mode and for Signaling Radio Bearers (SRBs), PDCP may either be re-established together with a security key change or remain as it is without a key change. Data forwarding, in-sequence delivery and duplication avoidance at handover may be guaranteed when the target gNB uses the same DRB configuration as the source gNB. Timer based handover failure procedure is supported in NR. RRC connection re-establishment procedure is used for recovering from handover failure.

Mobility without RRC involvement is also known as beam management. It was designed for a situation where multiple beams cover one cell. Due to the smaller coverage area of these narrow beams, it could be anticipated that a UE would change beam more frequently than it changes cells. To reduce the signaling load for the beam switches, it was decided that RRC signaling would not be required to facilitate such changes. Instead, signaling solution based on Multiple Access Control protocol (MAC) Control Element (CE) or Downlink Control. Information (DCI) has been introduced for beam management/intra-cell mobility. This is illustrated in FIG. 4 depicting Beam switching within the same cell.

Three Examples of Sub-Functionality to Support Beam Management are the Following:
  Layer 1 (L1)—Reference Signal Received Power (RSRP) reporting on SSB and Channel-State Information-Reference Signal (CSI-RS);
  MAC CE based activation/deactivation updates of beam indications, so-called Quasi-Co-Location (QCL) source, explained in the following in more details);
  Beam failure recovery/radio link monitoring/beam failure detection.

As these functionalities were designed to handle mobility without RRC involvement, they were limited to intra-cell operations. In the following, some background about some existing fundamental concepts in the 5G NR L1 specifications are provided: Beam indications, Quasi-Co-Location (QCL) source and Transmission Configuration Indication (TCI) states.

Beam Indications, QCL Source and TCI States

Several signals may be transmitted from the same base station antenna from different antenna ports. These signals may have the same large-scale properties, for instance in terms of Doppler shift/spread, average delay spread, or average delay, when measured at the receiver. These antenna ports are then said to be QCL.

The network may then signal to the UE that two antenna ports are QCL so that the UE interprets that signals from these will have some similar properties. If the UE knows that two antenna ports are QCL with respect to a certain parameter, e.g. Doppler spread, the UE may estimate that parameter based on a reference signal transmitted one of the antenna ports and use that estimate when receiving another reference signal or physical channel the other antenna port. Typically, the first antenna port is represented by a measurement reference signal such as a CSI-RS, known as source RS, and the second antenna port is a demodulation reference signal (DMRS), known as target RS, for physical downlink shared channel (PDSCH) or physical downlink control channel (PDCCH) reception.

For instance, if antenna ports A and B are QCL with respect to average delay, the UE may estimate the average delay from the signal received from antenna port A (known as the source reference signal (RS)) and assume that the signal received from antenna port B (target RS) has the same average delay. This is useful for demodulation since the UE may know beforehand the properties of the channel when trying to measure the channel utilizing the DMRS, which may help the UE in for instance selecting an appropriate channel estimation filter.

Information about what assumptions may be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management procedures with analog beamforming and is known as spatial QCL. There is currently no strict definition of spatial QCL, but the understanding is that if two transmitted antenna ports are spatially QCL, the UE may use the same Rx beam to receive signals associated to them. This is helpful for a UE that uses analog beamforming to receive signals, since the UE need to adjust its Receiving (RX) beam in some direction prior to receiving a certain signal. If the UE knows that the signal is spatially QCL with some other signal it has received earlier, then it may safely use the same RX beam to receive also this signal. Note that for beam management, the discussion mostly revolves around QCL Type D, but it is also necessary to convey a Type A QCL relation for the RSs to the UE, so that it may estimate all the relevant large-scale parameters. In other words, one could say that two signals are transmitted in the same direction or via the same downlink beams when these are QCL Type D. Hence, the network may give this relation between a channel to be decoded (e.g. PDCCH/PDSCH) and a signal that is known to be transmitted in a given direction that may be used as reference by the UE, like a CSI-RS, SSB, etc.

Typically, this is achieved by configuring the UE with a CSI-RS for tracking, TRS-Tracking Reference Signal, for time/frequency offset estimation (and/or SSB). To be able to use any QCL reference, the UE would have to receive it with a sufficiently good SINR. In many cases, this means that the TRS has to be transmitted in a suitable beam to a certain UE.

Together with the concept of QLC source there is the concept of a TCI state. Each of the M states in the list of TCI states may be interpreted as a list of M possible beams transmitted in the downlink from the network and/or a list of M possible Transmission Points (TRP) s used by the network to communicate with the UE. The M TCI states may also be interpreted as a combination of one or multiple beams transmitted from one or multiple TRPs.

To introduce dynamics in beam and TRP selection/switching, the UE may be configured through RRC signaling with M TCI states (e.g. during connection setup, resume, reconfiguration, handovers, etc.), where M is up to 128 in frequency range 2 (FR2) for the purpose of PDSCH reception and up to 8 in FR1, depending on UE capability.

In terms of RRC signaling, TCI states are currently configured as part of the so-called CellGroupConfig, which is a Distributed Unit (DU) configuration (i.e. decided by the baseband unit) in a Central Unit (CU)-DU split architecture, and conveyed to the UE via for example an RRCResume (i.e. during transition from Inactive to Connected) or RRCReconfiguration (e.g. during handovers, intra-cell reconfigurations or transitions from Idle to Connected), as in the example shown below: See also FIG. 5.

```
RRCReconfiguration ::=              SEQUENCE {
   rrc-TransactionIdentifier           RRC-TransactionIdentifier,
   criticalExtensions                  CHOICE {
      rrcReconfiguration                  RRCReconfiguration-IEs,
      criticalExtensionsFuture            SEQUENCE { }
   }
}
RRCReconfiguration-IEs ::=          SEQUENCE {
   radioBearerConfig                   RadioBearerConfig
   secondaryCellGroup                  OCTET ETRIG {CONTAINING CellGroupConfig}
   measConfig                          MeasConfig
   lateNonCriticalExtension            OCTET STRING
   nonCriticalExtension                RRCReconfiguration-v1530-IEs
}
RRCReconfiguration-v1530-IEs ::=    SEQUENCE {
   masterCellGroup                     OCTET STRING {CONTAINING CellGroupConfig)
   fullConfig                          ENUMERATED {true}
   dedicatedNAS-MessageList            SEQUENCE {SIZE{1..maxDRB} } OF DedicatedNAS-Message
   masterKeyUpdate                     MasterKeyUpdate
   dedicatedSIB1-Delivery              OCTET STRING {CONTAINING SIB1}
   dedicatedSystemInformationDelivery  OCTET STRING {CONTAINING SystemInformation}
   otherConfig                         OtherConfig
   nonCriticalExtension                SEQUENCE { }
}
```

The TCI states configurations are signaled as part of the PDSCH configuration, which is configured per each Downlink (DL) Bandwidth Part (BWP) of an Pcell or an SCell (SpCell), i.e. a Primary Cell (PCell) or a Primary Secondary Cell Group (SCG) Cell (PSCell), where an SpCell may be comprised of one or multiple DL BWPs. In terms of signaling this is structured as follows (e.g. for the initial DL BWP case):

```
CellGroupConfig
   spCellConfig
```

-continued

```
spCellConfigDedicated
   initial DownlinkBWP
      pdsch-Config
         TCI-states configurations
         →
   TCI states configurations are always associated to an
   spCell, i.e.a Pcell or an SCell
```

Below the PDSCH configuration (for a given DL BWP) comprising a list of TCI states to be added or modified is shown:

```
PDSCH-Config
The PDSCH-Config IE is used to configure the UE specific PDSCH parameters.
                                      PDSCH-Config information element
-- ASN1START
-- TAG-PDSCH-CONFIG-START
PDSCH-Config ::=                     SEQUENCE {
   dataScramblingIdentityPDSCH          INTEGER {0..1023}
   dmrs-DownlinkForPDSCH-MappingTypeA   SetupRelease { DMRS-DownlinkConfig }
   dmrs-DownlinkForPDSCH-MappingTypeB   SetupRelease { DMRS-DownlinkConfig } tci-StatesToAddModList               SEQUENCE {SIZE{1..maxNrofTCI-States}} OF TCI-State
   tci-StatesToReleaseList              SEQUENCE {SIZE{1..maxNrofTCI-States}} OF TCI-StateId
```

A second list of TCI states is configured for PDCCH (also per DL BWP). In the PDCCH-Config there is a list of so-called CORESET (Control Resource Sets).

PDCCH-Config information element

```
-- ASN1START
-- TAG-PDCCH-CONFIG-START
```

-continued

```
PDCCH-Config ::=            SEQUENCE {
   controlResourceSetToAddModList      SEQUENCE {SIZE {1..3}} OF ControlResourceSet
   controlResourceSetToReleaseList     SEQUENCE {SIZE {1..3}} OF ControlResourceSetId
   searchSpacesToAddModList            SEQUENCE {SIZE {1..10}} OF SearchSpace
   searchSpacesToReleaseList           SEQUENCE {SIZE {1..10}} OF SearchSpaceId
   downlinkPreemption                  SetupRelease { DownlinkPreemption }
   tpc-PUSCH                           SetupRelease { PUSCH-TPC-CommandConfig }
   tpc-PUCCH                           SetupRelease { PUCCH-TPC-CommandConfig }
   tpc-SRS                             SetupRelease { SRS-TPC-CommandConfig }
   ...
}
-- TAG-PDCCH-CONFIG-STOP              List of CORESET(s) provided per BWP
-- ASN1STOP
```

Each CORESET contains a length, 1, 2, or 3 OFDM symbols, as well as a frequency-domain allocation of PDCCH, i.e. where in frequency the PDCCH is transmitted and shall be monitored by the UE. The TCI state configuration indicated which TCI is used to receive the PDCCH candidates transmitted in that CORESET. Each CORESET may have a different TCI state configured/activated, enabling the possibility to use different transmit beams for different PDCCH candidates. In the CORESET configuration, there is a pointer (TCI-State ID) to the list of TCI configurations provided in PDSCH, as shown below:

ration in a given DL BWP. And, for PDCCH the CORESET configuration contains a TCI state pointer to a configured TCI state in PDSCH.

Each TCI state contains the previously described QCL information, i.e. one or two source downlink reference signals (RS), where each source RS associated with a QCL type. For example, a TCI state contains a pair of reference signals, each associated with a QCL type, e.g. two different CSI-RSs {CSI-RS1, CSI-RS2} is configured in the TCI state as {qcl-Type1,qcl-Type2}={Type A, Type D}. It means the

```
-- ControlResourceSet
The IE ControlResourceSet is used to configure a time/frequency control resource set (CORESET) in which to search for
downlink FFS_Section).
                                      ControlResourceSet information element
-- ASN1START
-- TAG-CONTROLRESOURCE-START
ControlResourceSet ::=      SEQUENCE {
   controlResourceSetId              ControlResourceSetId,
   frequencyDomainResources          BIT STRING {SIZE {45}},
   duration                          INTEGER {1..maxCoReSetDuration},
   cce-REG-MappingType               CHOICE {
      interleaved                       SEQUENCE {
         reg-BundleSize                    ENUMERATED {n2, n3, n6},
         interleaverSize                   ENUMERATED {n2, n3, n6},
         shiftIndex                        INTEGER{0..maxNrofPhysicalResourceBlocks-1}
      },
      nonInterleaved                    NULL },
   precoderGranularity               ENUMERATED {sameAsREG-bundle, allContiguousRBs},
   tci-StatesPDCCE-ToAddList         SEQUENCE {SIZE {1..maxNrofTCI-StatesPDCCH}} OF TCI-StateId
   tci-StatesPDCCR-ToReleaseList     SEQUENCE {SIZE {1..maxNrofTCI-StatesPDCCH}} OF TCI-StateId
tci-PresentInDCI                     ENUMERATED {enabled}
   pdcch-DMRS-ScramblingID           INTEGER {0..65535}
   ...
}
-- TAG-CONTROLRESOURCESET-STOP
-- ASN1STOP
                                           List of TCI states per CORESET
```

Each TCI state configuration contains a pointer, known as TCI State ID (TCI-StateId), which points to the TCI state. That pointer may be used, for example, to refer to a TCI configuration in a CORESET configuration. In other words, the TCI configurations are provided in the PDSCH configu- UE may derive Doppler shift, Doppler spread, average delay, delay spread from CSI-RS1 and Spatial Rx parameter (i.e. the RX beam to use) from CSI-RS2. In terms of RRC signaling, a TCI state is represented by an IE called TCI-State as shown below:

TCI-State information element

-- ASN1START
-- TAG-TCI-STATE-START

-continued

| TCI-State information element |
|---|
| TCI-State ::=                          SEQUENCE {
    tci-StateId                         TCI-StateId,
    qcl-Type1                           QCL-Info,
    qcl-Type2                           QCL-Info
OPTIONAL,    -- Need R
    ...
}
QCL-Info ::=                            SEQUENCE {
    cell                                ServCellIndex
OPTIONAL,    -- Need R
    bwp-Id                              BWP-Id
OPTIONAL, -- Cond CSI-RS-Indicated
    referenceSignal                     CHOICE {
        csi-rs                              NZP-CSI-RS-ResourceId,
        ssb                                 SSB-Index
    },
    qcl-Type                            ENUMERATED {typeA, typeB, typeC, typeD},
    ...
}
-- TAG-TCI-STATE-STOP
-- ASN1STOP |

As it is shown above in the TCI-State IE definition, there is a field called cell. According to the definition in TS 38.331, the field called cell in the QCL configuration, i.e. cell field of IE ServCellIndex, is the UE's serving cell in which the Reference Signal that is QCL source is being configured. If the field is absent, it applies to the serving cell in which the TCI-State is configured (i.e. the spCell of the cell group, not an indexed SCell). The RS may be located on a serving cell other than the serving cell in which the TCI-State is configured only if the qcl-Type is configured as type D (see TS 38.214 section 5.1.5).

In other words, for a given spCellConfig, the RS for a given TCI state is associated to a serving cell in that cell group, which may be the PCell/PScell or an associated SCell(s). That is indicated by the field cell in the TCI state configuration. And if the field is absent, that refers to the cell where the TCI state is configured.

Activation of TCI State/Beam Indication/Beam Switching

Once the UE has been configured with a CellGroupConfig (e.g. in RRCResume, during transition from Inactive to Connected, or in a handover), and spCellConfig with PDSCH and PDCCH configurations per BWP having possible TCI states associated to different transmission downlink beams where these channels need to be detected (or in other words, how the UE should consider its Rx beam to decode these channels), the UE needs to know when the network is transmitting in the time domain. In other words, all these TCI states that are configured are not considered to be used/monitored all the time. Hence, a signaling efficient activation/deactivation procedure is defined in NR.

The network may activate via MAC CE (MAC protocol layer Control Element) one TCI state for PDCCH (i.e. provides a TCI for PDCCH) and up to eight active TCI states for PDSCH. The number of active TCI states the UE support is a UE capability, but the maximum is 8.

FIG. 6 depicts TCI state activation via MAC CE. The gNB transmits 601 CSI-RS in narrow beams. The UE reports 602 CSI-RS measurements containing RSRP for the best 1-4 CSI-RS resources. The gNB chooses a CSI-RS from measurement. The gNB knows in which beam it transmitted that CSI-RS resource, and maps that beam to an SSB index. Finally the gNB determines the TCI state S for the corresponding SSB index and sends 603 an indication to activate the TCI state S to the UE.

Assume a UE has 4 active TCI states, from a list of totally 64 configured TCI states. Hence, 60 TCI states are inactive or deactivated for this particular UE, but some may be active for another UE, and the UE needs not to be prepared to have large scale parameters estimated for those. But the UE continuously tracks and updates the large scale parameters for the 4 active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

The MAC CE structure for the activation of UE-specific PDSCH TCI state is shown in FIG. 7, as it has been defined in TS 38.321, with the exact definition of the fields:

FIG. 7 depicts 3GPP FIG. 6.1.3.14-1: TCI States Activation and/or Deactivation for UE-specific PDSCH MAC CE.

Oct 1—means Octet 1—.

Serving Cell ID: This field indicates the identity of the Serving Cell for which the MAC CE applies. It refers to the cell field in the RRC configuration for a given TCI state. The length of the field is 5 bits;

BWP ID: This field indicates a DL BWP for which the MAC CE applies as the codepoint of the DCI bandwidth part indicator field as specified in TS 38.212 [9]. The length of the BWP ID field is 2 bits;

Ti: If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8;

R: Reserved bit, set to 0.

The MAC CE structure for the activation of UE-specific PDCCH TCI state is shown below, as in TS 38.321, with the exact definition of the fields:

FIG. 8 depicts 3GPP FIG. 6.1.3.15-1: TCI State Indication for UE-specific PDCCH MAC CE Serving Cell ID: This field indicates the identity of the Serving Cell for which the MAC CE applies. The length of the field is 5 bits;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in 3GPP TS 38.331 applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

The way the UE knows what a given MAC CE is about is via Logical Channel ID (LCID) values. The following table from TS 38.321 provides LCID(s) for Downlink Shared Channel (DL-SCH) for the different use cases:

| Index | LCID values |
| --- | --- |
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

For dynamic scheduling, the basic NR physical time-frequency resource grid is illustrated in FIG. 9, where only one resource block (RB) within a 14-symbol slot is shown. One OFDM subcarrier during one OFDM symbol interval forms one resource element (RE).

Downlink transmissions may be dynamically scheduled, i.e., in each slot the gNB transmits downlink control information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH and the decoding is successfully, it then decodes the corresponding PDSCH based on the decoded control information in the PDCCH. Uplink data transmission may also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

An example of how the TCI States are mapped to the code points in DCI Transmission Configuration Indication field in NR-Rel-15 is now given. The example is given in FIG. 10, where the MAC CE for Activation/Deactivation of TCI States for UE-specific PDSCH has a size of 3 octets and contains 16 Ti fields corresponding to 16 different TCI State IDs (where i=0, 1, 2, . . . , 15) that have been configured in a UE for a given BWP. In this example, TCI States with IDs i=2, 4, 5, 7, 8, 9, 11, and 13 are being activated with the MAC CE shown in the figure. This means that the TCI State IDs are mapped to the codepoint values of DCI Transmission Configuration Indication field as follows:

TCI State iD i=2 corresponds to codepoint value 0
TCI State iD i=4 corresponds to codepoint value 1.
TCI State iD i=5 corresponds to codepoint value 2
TCI State iD i=7 corresponds to codepoint value 3.
TCI State iD i=8 corresponds to codepoint value 4.
TCI State iD i=9 corresponds to codepoint value 5.
TCI State iD i=11 corresponds to codepoint value 6.
TCI State iD i=13 corresponds to codepoint value 7

FIG. 10 depicts an example illustrating how the TCI States are mapped to the codepoints in DCI Transmission Configuration Indication field in NR-Rel-15.

Reduced Mobility Interruption Using MAC CE Signaling

The beam management functionality was designed for a situation where multiple beams cover one cell. Due to a possibly smaller coverage area of these narrow beams, it is anticipated that a UE would change beam more frequently than it changes cells. To reduce the signaling load for the beam switches, it was decided that RRC signaling would not be required to facilitate such changes. Instead, signaling solution based on MAC CE or DCI was introduced in the NR L1 specifications.

The signaling during a beam switch involves a so called changing of the QCL source for the PDCCH and/or PDSCH. The QCL properties of the source enable the UE to demodulate the PDCCH/PDSCH DMRS by providing some guidance to the channel estimation. So, in summary, the following observation may be made: The beam management functionality specified in 3GPP Release-15 provides the mechanisms to change the QCL source for the PDCCH/PDSCH DMRS via MAC CE. FIG. 11 depicts Mobility interruption time, wherein RAR means Random Access Response Once the UE has been provided with a new QCL source, it performs measurements on the corresponding RS to derive the relevant QCL properties. These QCL properties are then used when demodulating the PDCCH/PDSCH. As was intended, the update of the QCL source has low overhead and low latency. The MAC CE message is only two octets, and the UE applies the newly activated QCL source 3 ms after the HARQ ACK for the MAC CE message has been sent. Hence, in summary, the following observation may be made: the beam management functionality specified in Rel-15 provides the mechanisms to change the QCL source for the PDCCH/PDSCH DMRS via MAC CE.

Note that the MAC CE indication is a synchronized procedure: The NW and the UE has the same understanding of when the update configuration takes effect. And, differently from RRC procedures like an RRCReconfiguration, there is no acknowledgement message, e.g. upon receiving an RRCReconfiguration the UE transmits to the network an RRCReconfigurationComplete.

In 5G NR, the network has the possibility to provide the UE with a completely new RRC configuration in the handover command. For instance, the configuration for the DMRSs or the PDCCH/PDSCH scrambling may be different in the new cell compared to the old cell. However, in contrast to LTE, there are no physical layer parameters that are hardcoded based on the physical cell identity (PCI) in NR. It is thus possible quite some similar physical layer configurations in serving and target cell.

In this case, it has been argued in R1-1902528 Lower-layer mobility enhancements (http://www.3gpp.org/ftp/TSG_RAN/WG1_RL1/TSGR1_96/Docs//R1-1902528.zip) that the only thing that is needed for the UE to be able to start receiving data on the physical layer in the target cell is that the QCL source is updated: this would enable the UE to align to the target cell in an indicated direction to demodulate the bits and decode the data.

As Discussed in the Previous Section, the RRC IE that Carries the QCL Source is Called TCI-State:

```
TCI-State ::=          SEQUENCE {
  tci-StateId          TCI-StateId,
  qcl-Type1            QCL-Info,
  qcl-Type2            QCL-Info           OPTIONAL,   -- Need R
  ...
}

QCL-Info ::=           SEQUENCE {
  cell                 ServCellIndex      OPTIONAL,   -- Need R
  bwp-Id               BWP-Id             OPTIONAL, -- COND CSI-RS-Indicated
  referenceSignal      CHOICE {
    csi-rs             NZP-CSI-RS-ResourceId,
    ssb                SSB-Index
  },
  qcl-Type             ENUMERATED { typeA, typeB, typeC, typeD },
  ...
}
```

As may be seen, the TCI state contains pointers to reference signal(s). The reference signals are implicitly associated with a serving cell via a serving cell integer index: hence, in Release-15, it is only possible to change QCL source to reference signals transmitted within a serving cell, SpCell or associated SCell within that SpCell group: it is not possible to change the QCL source to a reference signal in a non-serving cell.

It is noted that it is possible for the UE to perform measurements and derive at least some QCL properties from SSB transmitted from neighbour cells: this is what the UE would need to do to perform the Radio Resource Management (RRM) measurements to support L3-related procedures such as Secondary Cell Group (SCG) addition, synchronization with sync, i.e. handovers, etc. For example, to perform the SSB-based RSRP (SS-RSRP) measurements on a target cell, the UE would have to synchronize to the Primary Synchronization Signal (PSS) of that target, detect the Secondary Synchronization Signal (SSS) and demodulate the PBCH DMRS. The SS-RSRP is then measured on the SSS and optionally on the PBCH DMRS. To perform these actions, the UE would at least have to find the average delay of the SSB and may readily estimate the Doppler shift. Thus, a UE could easily use an SSB in a neighbour cell as a QCL source for PDCCH/PDSCH DMRS reception, providing that the UE previously performed measurements on that SSB.

To be able to use this functionality, it has been proposed in 3GPP R1-1902528 Lower-layer mobility enhancements (http://www.3gpp.org/ftp/TSG_RAN/WG1_RL1/TSGR1_96/Docs//R1-1902528.zip) to introduce an identifier of the non-serving cell in the QCL-info where as proposed, a natural choice for such an identifier is the Physical Cell Identity (PCI).

If a PCI would be introduced in the QCL-info, the network could update the QCL source to an RS in a non-serving cell. Once the indication command takes effect, the NW may directly start transmitting data over PDSCH from the new cell. Since the procedure is synchronized, the NW and the UE have the same understanding of when the updated configuration takes effect. Thus, the interruption in data communication may be eliminated.

Multi-TRP Communications in 3GPP Release-16

3GPP WG RAN1 has agreed to standardize a solution for multi-TRP communications. According to RP-182067 WID Enhancements on MIMO for NR (Australia, September 2018), the objectives of the work is to standardize enhancements on multi-TRP/panel transmission including improved reliability and robustness with both ideal and non-ideal backhaul:

Specify downlink control signaling enhancement(s) for efficient support of non-coherent joint transmission;

Perform study and, if needed, specify enhancements on uplink control signaling and/or reference signal(s) for non-coherent joint transmission;

Multi-TRP techniques for URLLC requirements are included in this WI

Current discussions focus on the support of PDSCH with multi-TRP. One variant that is being considered is a single PDCCH scheduling multiple PDSCH from different TRPs. The single PDCCH is received from one of the TRPs. FIG. 12 shows an example where a DCI received by the UE in PDCCH from TRP1 schedules two PDSCHs. The first PDSCH (PDSCH1) is received from TRP1 and the second PDSCH (PDSCH2) is received from TRP2.

FIG. 12 shows an example of a single PDCCH.

In such cases, each PDSCH transmitted from a different TRP has a different TCI state associated with it. In the example of FIG. 12, PDSCH1 is associated with TCI State p, and PDSCH 2 is associated with TCI state q. The PDSCH DM-RSs from the different TRPs may belong to different DMRS CDM groups. In the example of FIG. 12, the DMRS for PDSCH1 belongs to CDM group u while the DMRS for PDSCH2 belongs to CDM group v.

In 3GPP RAN1 #96 in Athens the following has been agreed:

Agreement

To support multiple-PDCCH based multi-TRP/panel transmission with intra-cell (same cell ID) and inter-cell (different Cell IDs), following RRC configuration may be used to link multiple PDCCH/PDSCH pairs with multiple TRPs one CORESET in a "PDCCH-config" corresponds to one TRP FFS whether to increase the number of CORESETs per "PDCCH-config" more than 3

FFS: UE monitoring/decoding behavior for multiple PDCCHs.

Include in LS to RAN2.

As it may be seen, the agreement indicates that multi-TRP transmission includes the inter-cell use case, where multiple beams may be transmitted from multiple cells. Referring to the previous figure, this would mean that the UE could have activated TCI states associated to PDCCH configurations with TCI states associated to a CQL sources associated to different cell IDs.

A problem will be identified and discussed under Detailed Description below.

SUMMARY

An object of embodiments herein is to improve the handling of SpCells in a wireless communications network.

According to an aspect of embodiments herein, the object is achieved by a method performed by a User Equipment, UE.

The UE receives from a network node, a higher layer configuration comprising a set of SpCell configurations, to be configured in the UE.

While being in connected state, the UE receives a lower layer signaling from a network node. The lower layer signaling comprises an indication. The indication indicates one or more SpCells comprised in the set of SpCell configurations, to be any one or more out of: activated or deactivated.

According to another aspect of embodiments herein, the object is achieved by a method performed by a network node. The network node configures a User Equipment, UE, by sending to the UE, a higher layer configuration comprising a set of SpCell configurations, to be configured in the UE. While the UE is in connected state, the network node transmits a lower layer signaling to the UE. The lower layer signaling comprises an indication. The indication indicates one or more SpCells comprised in the set of SpCell configurations, to be any one or more out of: activated or deactivated.

According to another aspect of embodiments herein, the object is achieved by a User Equipment, UE, being configured to:

Receive from a network node, a higher layer configuration comprising a set of SpCell configurations, to be configured in the UE, and while being in connected state, receive a lower layer signaling from a network node, which lower layer signaling is adapted to comprise an indication, which indication is adapted to indicate an SpCell comprised in the set of SpCell configurations, to be any one or more out of: activated, or deactivated.

According to another aspect of embodiments herein, the object is achieved by a network node being configured to:

Configure a User Equipment, UE, by sending to the UE, a higher layer configuration comprising a set of SpCell configurations to be configured in the UE, and while the UE is in connected state, transmit a lower layer signaling to the UE, which lower layer signaling is adapted to comprise an indication, which indication indicates one or more SpCells comprised in the set of SpCell configurations, to be any one or more out of: activated or deactivated.

It is furthermore provided herein a computer program product comprising instructions, which, when executed on at least one processor, cause the at least one processor to carry out any of the methods above, as performed by the user equipment or the radio network node. It is additionally provided herein a computer-readable storage medium, having stored there on a computer program product comprising instructions which, when executed on at least one processor, cause the at least one processor to carry out the method according to any of the methods above, as performed by the radio network node or the user equipment.

BRIEF DESCRIPTION OF THE DRAWINGS

Examples of embodiments herein are described in more detail with reference to attached drawings in which:

FIG. 5 is a schematic block diagram illustrating prior art.
FIG. 10 is a schematic block illustrating prior art.
FIGS. 24-27 are flowcharts illustrating methods implemented in a communication system including a host computer, a base station and a user equipment.

DETAILED DESCRIPTION

Figure 1:
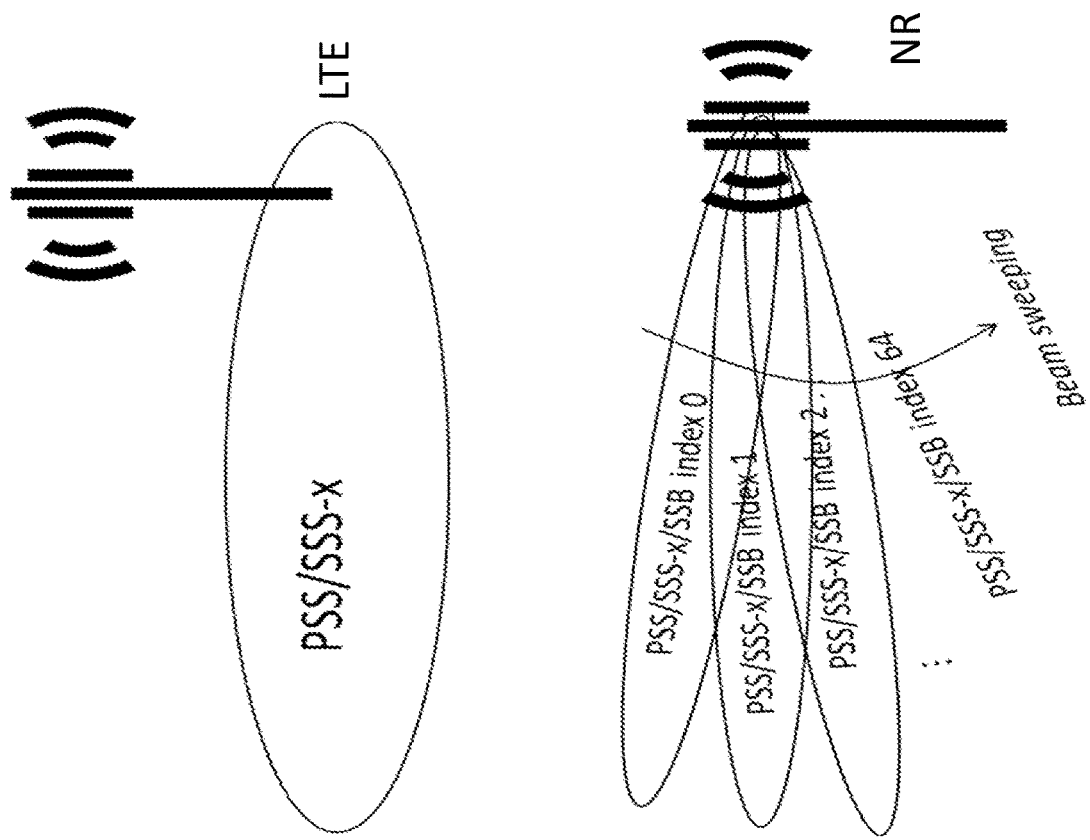
FIG. 1 is a schematic block diagram illustrating prior art.
Figure 2:
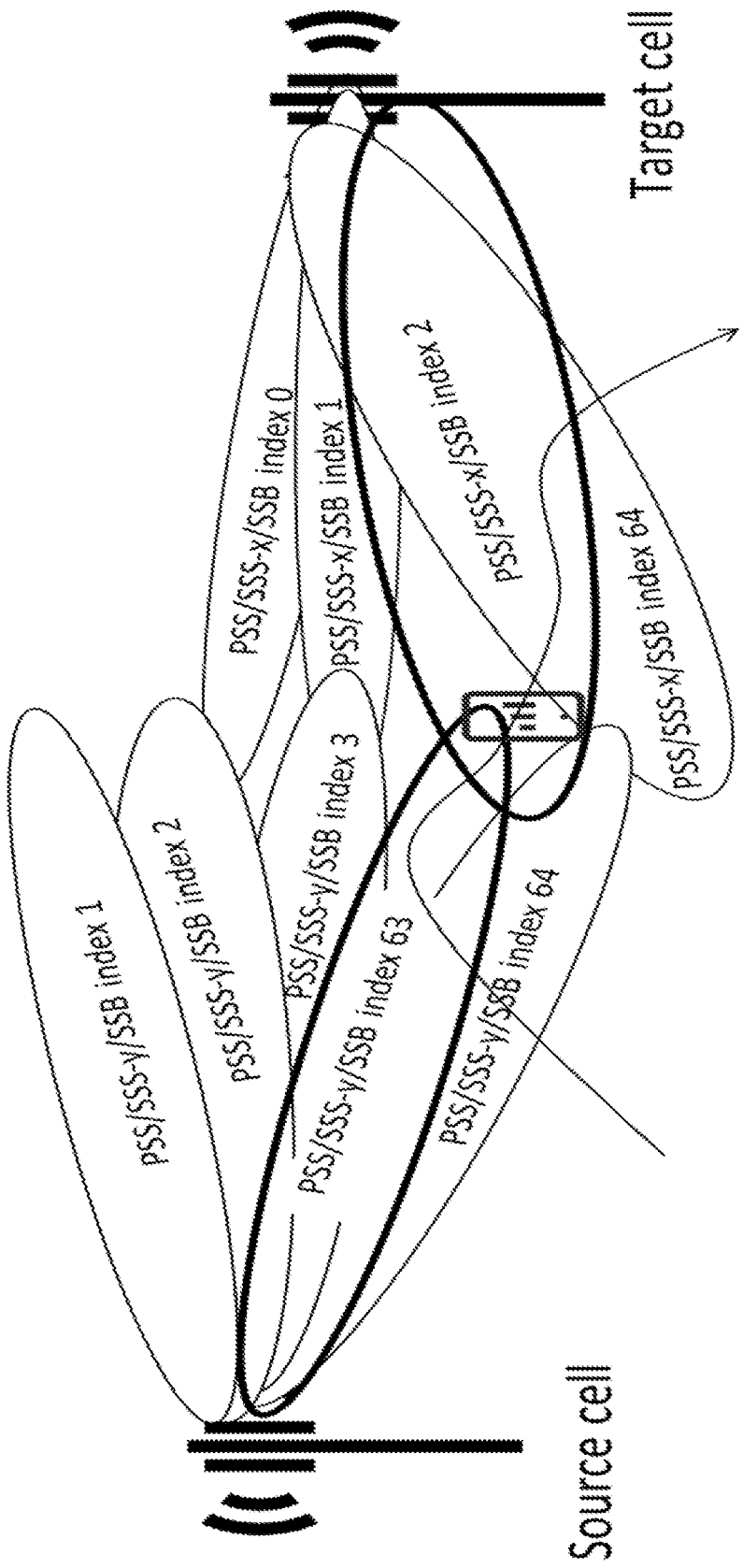
FIG. 2 is a schematic block diagram illustrating prior art.
Figure 3:
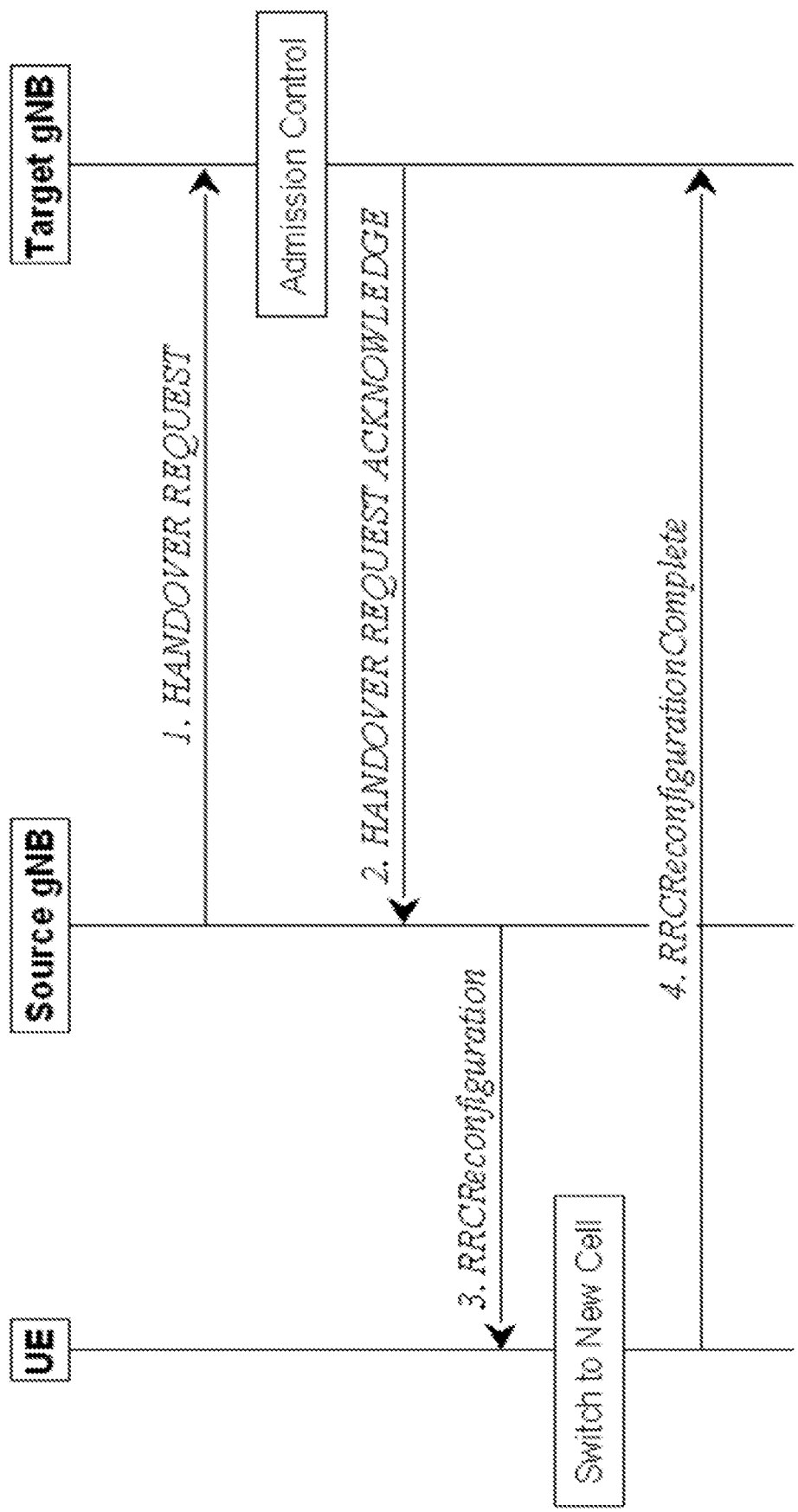
FIG. 3 is a sequence diagram illustrating prior art.
Figure 4:
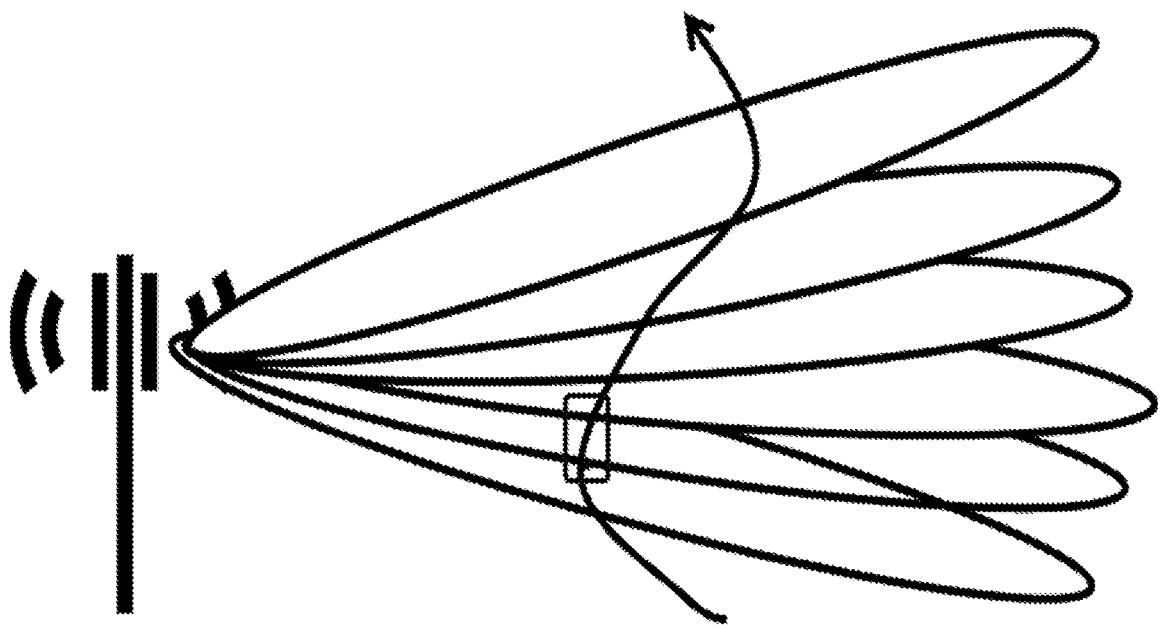
FIG. 4 is a schematic block diagram illustrating prior art.

As a part of developing embodiments herein the inventors identified a problem which first will be discussed.

The problem addressed herein is how to enable e.g. a PSCell addition or inactivation, and a mobility mechanism (inter-cell mobility) relying on lower layer signaling, i.e. in a protocol layer below RRC (also referred to as a protocol layer equal to or below MAC CE), like using a MAC CE where the UE may change cells, e.g. move from one beam from one cell to another beam from another cell, by an indication not involving RRC signaling or any other higher layer protocols i.e. above the MAC protocol in the stack, for example, via MAC CEs.

A first existing solution is the one in the current 5G NR specifications. As discussed in the background, the existing solution in the standard (3GPP 5G NR Release-15) does not support this inter-cell beam switching use case without RRC signaling. In one hand, the standard has a mechanism for TCI state activation/deactivation which works as a way to make the UE switch Rx beams (or in other words, switch the direction it listens to/assuming the network starts transmitting in a different direction or Transmit (Tx) beam), as explained in the background. On the other hand, each TCI state may only be associated to a DL BWP of a cell in the CellGroupConfig, which may either be the spCell itself, like the PCell or PSCell, or a configured SCell.

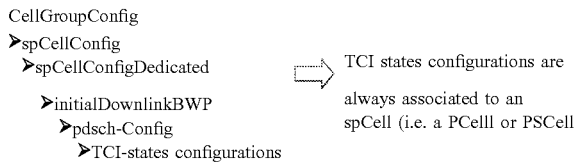

CellGroupConfig
➤spCellConfig
  ➤spCellConfigDedicated       ⇢ TCI states configurations are
    ➤initialDownlinkBWP           always associated to an
      ➤pdsch-Config               spCell (i.e. a PCelll or PSCell
        ➤TCI-states configurations A second existing solution is the one presented in the background, and described in the contribution to 3GPP WG1 R1-1902528 Lower-layer mobility enhancements. There, the fundamental idea of performing L1-based mobility without RRC signaling has been presented to reduce the interruption time.

A third solution to be considered, or at least some aspects of it, is the one discussed for multi-TRP enhancements. Therein, current agreements state that it should be possible for a UE to be connected to beams from multiple TRPs, where each beam may possibly be associated to different cells. In other words, that the UE should be able to have activated a QCL source for a given TCI state associated to a PDCCH configuration that is associated to a cell A, and at the same time have activated a QCL source for a TCI state associated to a PDCCH configuration that is associated to a cell B. However, higher layer impact of that decision was not yet discussed for this problem.

As it may be seen, the agreement indicates that multi-TRP transmission includes the inter-cell use case, where multiple beams may be transmitted from multiple cells. Referring to the previous figure, this would mean that the UE could have activated TCI states associated to PDCCH configurations with TCI states associated to a CQL sources associated to different cell IDs.

For all these Existing Solutions, the Following Problems and Limitations have been Identified:

The existing relationship between TCI states and an SpCell since according to the contribution one may have a TCI for a cell that is associated to a non-serving (i.e. not associated to any SpCell); Current specifications define that TCI states are configured per cell group, i.e., it may only the associated to one SpCell. Hence, it remains unclear how to make that associated to non-serving cells;

Whether the notion of an SpCell remains the same or not. Currently, the UE changes PCell when performs a handover (or PSCell, if this is a PSCell/SCG change), but when it changes a TCI state it still maintains the same notion of PCell. In the contribution, nothing is mentioned about that.

It also remains unclear, the relation between these TCI states for non-serving cell and the UE configuration e.g. whether that is part of the CellGroupConfig, spCellConfig, etc. So, the overall signaling considerations is missing.

A standard contribution proposes to introduce an identifier of the non-serving cell in the QCL-info and indicates that a natural choice for such an identifier is the physical cell identity (PCI). However, considering that the PCI is encoded with 10 bits and that the existing MAC CE structure only allow serving cell indexes with 5 bits, it remains unclear how that could be done.

An object of embodiments herein may therefore to improve the handling of SpCells in a wireless communications network.

Example embodiments herein provide a method that makes it possible to properly configure a UE to e.g. perform inter-cell mobility using lower layer protocol such as MAC CEs, and update a minimum set of parameters for an SpCell, like cell-specific parameters, via MAC CEs, or any other lower layer signaling. In some embodiments, it is possible to configure the UE with TCI states associated to different SpCells that may have different common configuration(s).

A general advantage exists in deployments where the network functionality processing RRC message and the network functionality processing MAC messages are placed in different locations. For example, in a CU/DU split architecture as defined by 3GPP. If CU where RRC messages are processed, are placed in a cloud environment, possibly further from the UE compared to the DU, where MAC messages and related functions are processed, RRC measurement reports and RRC Reconfigurations for handovers will take longer to get to the UE as that may also require some DU/CU signaling e.g. to modify the DU context. Hence, using MAC CE for inter-cell mobility also has the potential to reduce the delays in inter-cell mobility due to the potential to avoid CU/DU signaling that exists today.

Figure 13:
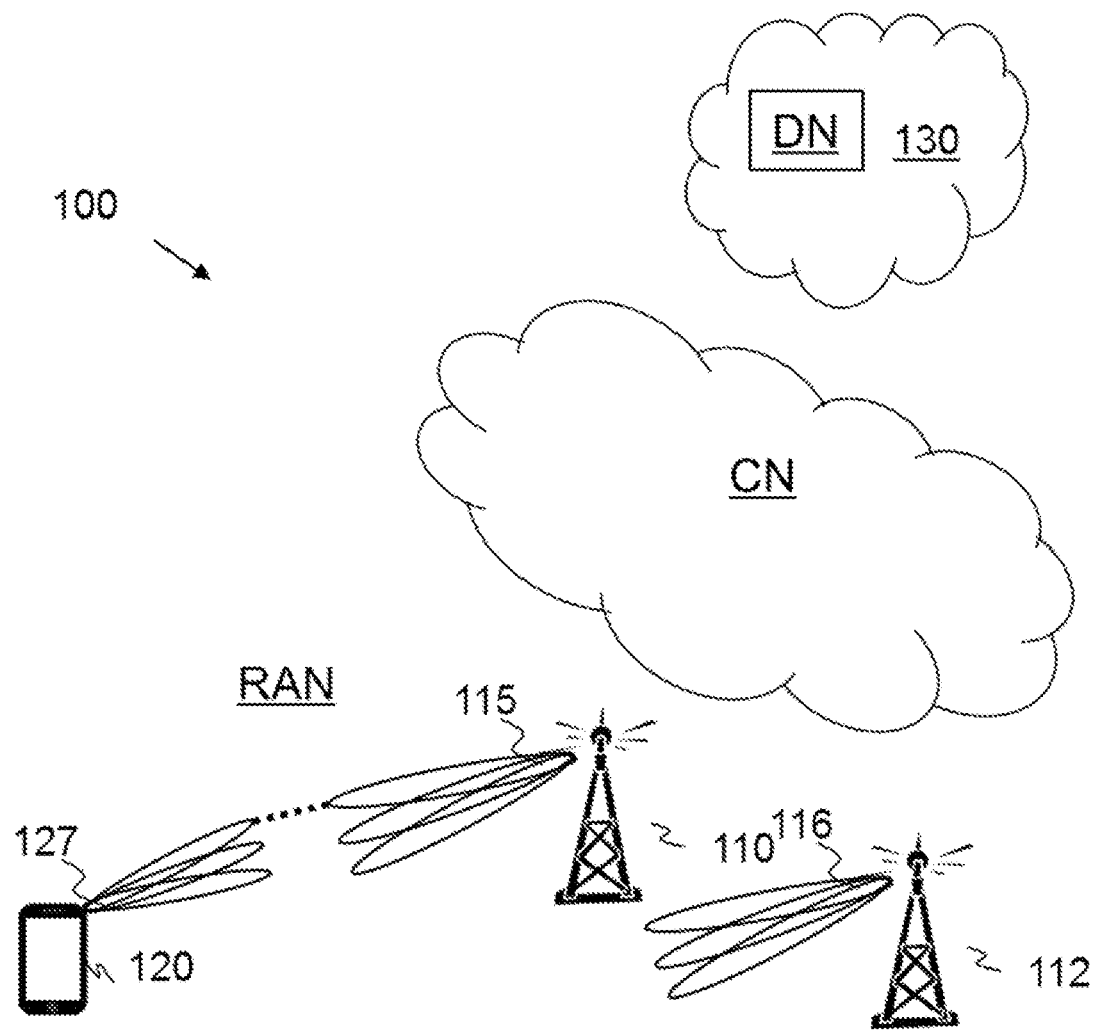
FIG. 13 is a schematic block diagram illustrating embodiments of a wireless communications network.

FIG. 13 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes such as a network node 110 and a network node 112 operate in the wireless communications network 100, providing radio coverage by means of antenna beams, referred to as beams herein. The network node 110 provides a number of beams 115, and may use these beams for communicating with e.g. a UE 120. The network node 112 also provides a number of beams 116, and may use these beams for communicating with e.g. the UE 120. The network nodes 110 and 112 each provides radio coverage over a geographical area by means of antenna beams. The geographical area provided by the antenna beams may also be referred to as a number of SpCells, a service area, beam or a group of beams. The network nodes 110 and 112 may each be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a standalone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by network node 110 depending e.g. on the radio access technology and terminology used.

User Equipments operate in the wireless communications network 100, such as a UE 120. The UE 120 may provide radio coverage by means of a number of antenna beams 127, also referred to as beams herein.

The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may in a first aspect be performed by the UE 120, and in a second, aspect by the network node 110. As an alternative, a Distributed Node (DN) and functionality, e.g. comprised in a cloud 140 as shown in FIG. 13, may be used for performing or partly performing the methods.

Figure 14:
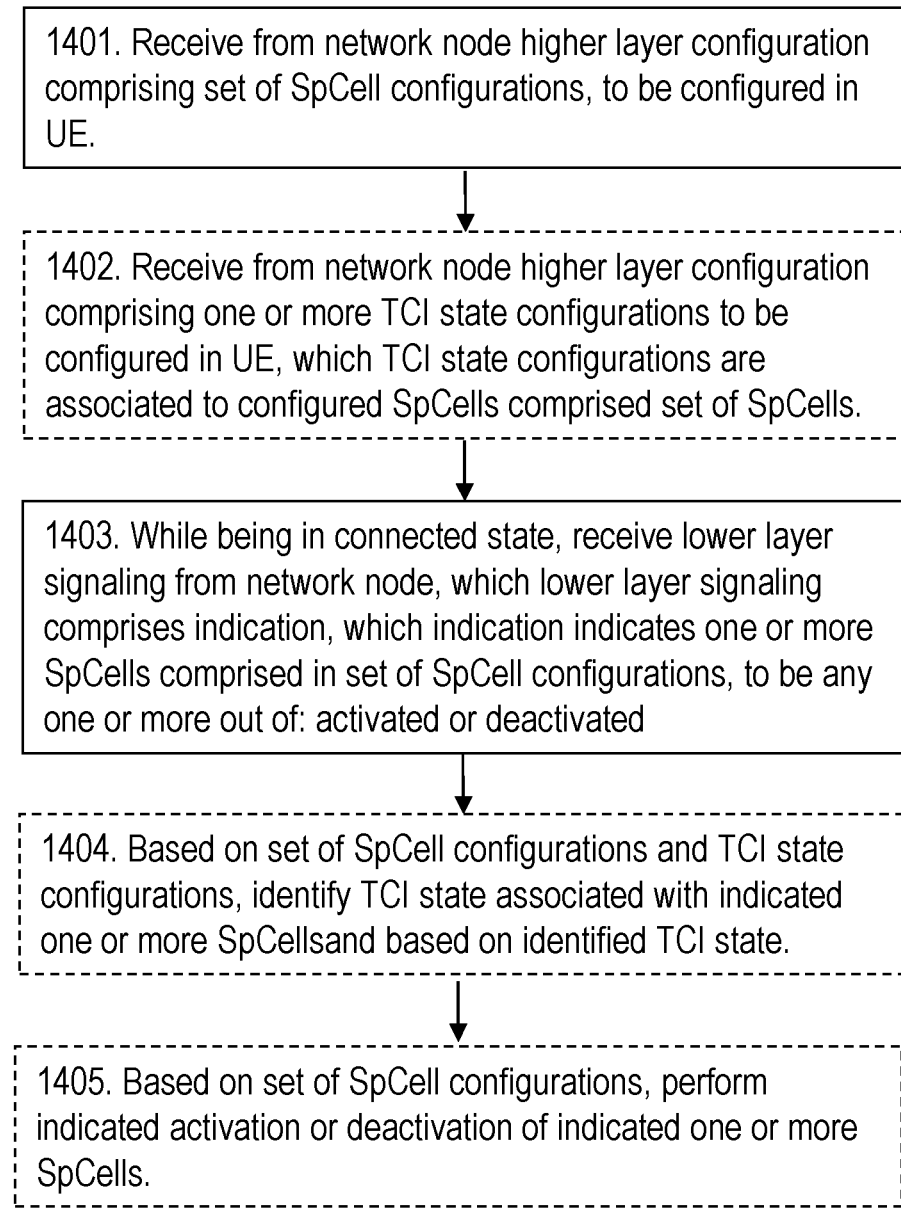
FIG. 14 is a flowchart depicting embodiments of a method in a UE.

FIG. 14 shows an example method performed by the UE 120 The method may comprise any of the actions below.

Action 1401

The UE 120 receives from the network node 110 a higher layer configuration comprising a set of SpCell configurations, to be configured in the UE 120. E.g. the UE 120 receives e.g. from the network node 110, a higher layer configuration with a set of one or multiple SpCell configurations.

- The set of SpCell configurations comprises UE-specific configurations i.e. configurations that are considered active, or "current", for the set of SpCell(s) and remain active as long as the UE 120 moves between cells in the configured set of SpCell(s), since this is a set of specific configurations, also possibly called UE-specific configuration.
- The term active may mean that the UE 120 is using the SpCell(s), acting/operating according to that configuration. Hence, this means that the UE 120 is using UE-specific parameters regardless which SpCell is activated or deactivated.
- The term SpCell refers to the same term SpCell as defined in 3GPP TS 38.331 and TS 38.300. The method describes "a set of SpCell(s)" which means that the set comprises a set of candidate cells that may be the SpCell (in the sense of an SpCell in TS 38.331—or PCell in case of single connectivity or PSCell when operating in Multi-Radio Dual Connectivity). In more general term, one could also call these cell configurations (instead of SpCell configurations, except that these are not the existing SCell configurations in CellGroupConfig).
- The set of SpCell configurations comprises SpCell-specific configurations i.e. configurations that are only considered active if the associated SpCell is also considered active.
- The term active means that the UE 120 is using them, acting/operating according to that configuration. Hence, this means that the UE 120 is using UE-specific parameters regardless which SpCell is activated or deactivated.
- In the mobility case, only one SpCell may be activate at the UE 120. Hence, upon mobility the UE 120 changes what is the activate configuration, depending which SpCell is considered as activated.
- An SpCell is considered active/activated/current SpCell if the UE 120 has at least one active TCI state for that SpCell.
- Each SpCell configuration contains at least one identifier enabling the UE 120 to unambiguously distinguish each SpCell configuration.
- That is important so the activation of a given SpCell indicates to the UE 120 which SpCell configuration shall be activated. On solution relies on an integer like a cell index that is mapped to a cell identifier, e.g. PCI, Cell ID, etc.) where the cell index may have fewer bits than the cell identifier. And, this cell index is also the one used in the MAC CE to indicate to the UE 120 which SpCell configuration the UE 120 shall activate (and which configured SpCell is to be considered the active SpCell.
- The SpCell configuration contains the mapping between a short identifier and a long identifier where the short identifier is the one used in the MAC CE, like a serving cell index, while the long identifier is a cell identity, e.g. a Physical Cell Identity or a Cell Identity as broadcasted in system information.
- The method comprises different alternative solutions concerning how these SpCell configurations state configurations are signalled, which may vary depending on which configurations are considered as UE-specific and/or SpCell-specific. These different solutions for the signaling reflect different alternatives to consider what may be common configurations for the set of SpCell(s), e.g. bearer configurations, all configurations above the MAC layer, like PDPC configurations, etc. These may be set specific or UE-specific, as called above. And, consequently, which configurations are to be considered UE-specific so that when the UE 120 moves across the set of SpCell(s) it remains using the same configuration for these UE-specific parameters;
- In the description above the term set of SpCell(s) is used to refer to any signaling structure where one or multiple SpCell configurations may be provided to the UE, for example, a list of SpCell configurations.

Action 1402

In some embodiments the UE 120 receives from the network node 110, a higher layer configuration comprising one or more TCI state configurations to be configured in the UE 120. The TCI state configurations are associated to the configured SpCells comprised the set of SpCells. E.g. the UE 120 may receive a higher layer configuration with TCI state configurations associated to the set of configured SpCell(s).

- There may be different alternatives for that association to be further explained in the detailed description such as:
- a list of TCI states configurations per SpCell;
- a list of TCI states configurations that is common to a set of configured SpCell(s);
- Each configured TCI state may comprise an indication to one of the SpCell(s) in the configured set of SpCell(s) configured for the UE 120.
- That is important so the activation of a given TCI state indicates to the UE 120 which SpCell configuration shall be activated upon the activation of a TCI state.

One solution relies on an integer like a cell index that is mapped to a cell identifier (e.g. PCI, Cell ID, etc.) where the cell index may have fewer bits than the cell identifier. And, this cell index is also the one used in the MAC CE to indicate to the UE 120 which SpCell configuration the UE 120 shall activate (and which configured SpCell is to be considered the active SpCell).

Each TCI state has a QCL configuration with reference signals where an SpCell indication is configured.

That is important so the activation of a given TCI state indicates to the UE 120 the SpCell of the configured RSs in the QCL configuration. For example, network provides the UE 120 with a TCI configuration X for SpCell-A with a certain CSI-RS and SSB. Then, upon receiving a MAC CE with an indication to activate a that TCI state X the UE 120 may know that it shall rely on the configured reference signals for the SpCell-A.

Figure 16:
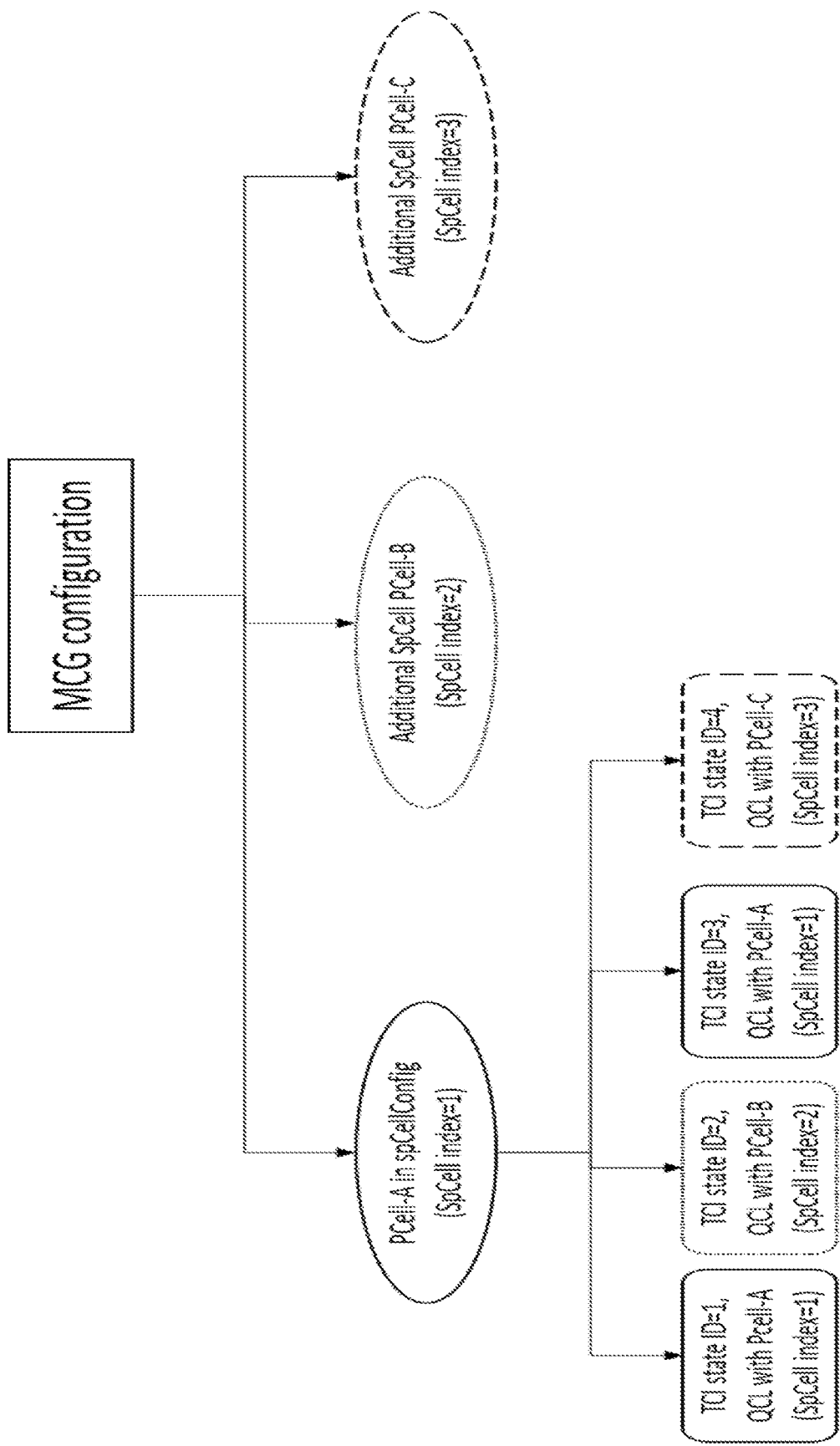
FIG. 16 is a schematic block illustrating embodiments herein.

The TCI state configurations may be a list of TCI states is associated to the set of configured SpCell(s), such as the one depicted in FIG. 16; In a variant also presented, each SpCell configuration has its own associated list of TCI states.

The first case considers that the TCI state configurations is UE-specific. In other words, as the UE 120 changes SpCell(s) within the configured set of SpCell(s) the TCI state configurations remain the same (although the state of these being activate/deactivate may change).

The variant considers that the TCI state configurations is SpCell-specific. In other words, as the UE 120 changes SpCell(s) within the configured set of SpCell(s) the TCI state configurations also change (not only the states of these being activated/deactivated).

The method comprises different alternative solutions concerning how these TCI state configurations are signalled. For example, in one alternative implementing the first case a list of TCI state configurations is provided in SpCellConfig and is valid for the whole set of configured SpCells, i.e., the current SpCell where the UE 120 is receiving the configuration and the additional SpCells that may become an activate SpCells with lower layer signaling (MAC CEs). In another example, implementing the variant, the TCI states are signaled in each SpCell configuration within the set, so that upon changing the SpCell the UE 120 also changes the TCI state configuration i.e. any further activation/deactivation of TCI state would now be associated to the newly active SpCell. Yet another variant is to consider that the TCI state configuration is still provided as an SpCell configuration of one fo the SpCell(s), like the first in a list or an explicitly indicated to be the main SpCell, where within that main SpCell configuration in each TCI state there may still be a reference (like a cell index encoded as an integer) to additional SpCell which the UE 120 may be moved to with lower layer signaling. Hence, even though TCI states would be configured as part of an SpCell configuration it would in fact be a UE-specific configuration valid for the set of configured SpCell(s).

FIG. 16 illustrates one example of a Master Cell Group (MCG) configuration as described above for this last case where an SpCell and additional SpCell(s) are defined. The TCI state configurations may be included in the PCell-A (part of the SpCellConfig) and refer to additional SpCell(s). Then, activating one of the additional SpCell(s) do not lead to any changes in the TCI state configurations provided in PCell-A so that MAC CEs may still be used to activated/deactivated the TCI states configured in PCell-A but associated to PCell-A, PCell-B and PCell-C, as shown below.

FIG. 16 illustrates an example of the Association between TCI states and configured SpCells stored at the UE 120.

Referring again to FIG. 14.

Action 1403

While being in connected state, the UE 120 receives a lower layer signaling from the network node 110. The lower layer signaling comprises an indication, which indication indicates one or more SpCells comprised in the set of SpCell configurations, to be any one or more out of: activated or deactivated.

E-g—the UE 120 may receive while in Connected state (e.g. RRC_CONNECTED), a lower layer signaling activating or deactivating an SpCell.

Lower layer signaling may be a MAC CE containing an index pointing unambiguously to one of the configured SpCell(s);

In some embodiments, the MAC CE indicates at least one TCI state of an SpCell to be activated, where that SpCell is within the set of configured SpCell(s). One may see that as a single signaling indicating a new cell to be considered the UE's active SpCell and the set of TCI states to be activated and deactivated. The activation of an SpCell may rely on random access or not.

In an alternative solution one MAC CE indicates one SpCell to be activated, where that SpCell is within the set of configured SpCell(s). That leads the UE 120 to perform random access in the new SpCell (possibly relying on contention free or contention based resources) by sending a preamble and receiving (in the success case) a random access response and/or a MAC CE indicating which TCI states of that new SpCell are to be considered activated/deactivated. Noticed that upon receiving the first MAC CE the UE 120 uses the TCI state configurations of that target SpCell, and waits for the response in the target to indicate which TCI states in the configuration are to be activated and/or deactivated.

Action 1404

Based on the set of SpCell configurations and TCI state configurations, the UE 120 may in some embodiments, identify the TCI state associated with the indicated one or more SpCells and based on the identified TCI state.

Action 1405

The UE 120 may in some embodiments perform the indicated activation, or deactivation of the indicated one or more SpCells.

Figure 15:
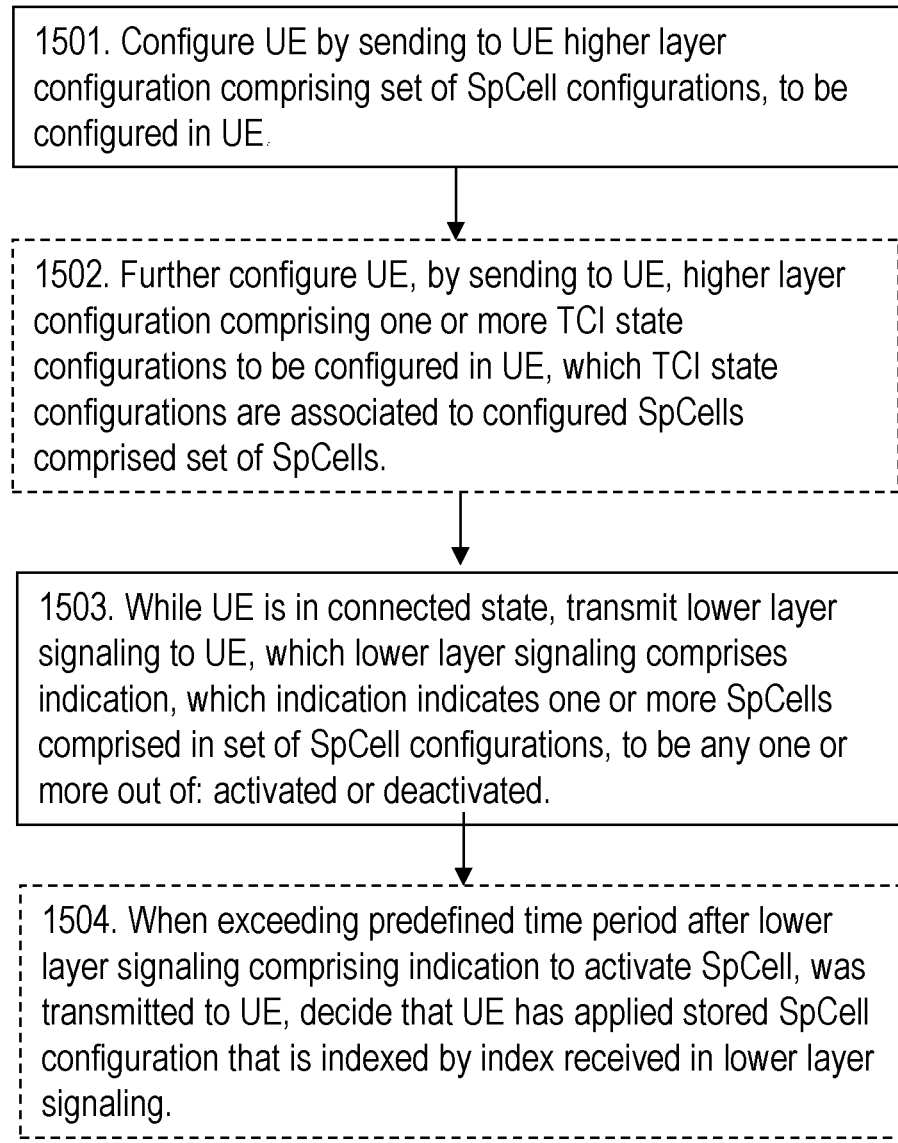
FIG. 15 is a flowchart depicting embodiments of a method in a network node.

FIG. 15 shows an example method performed by the network node 110, e.g. also called a gNodeB—gNodeB. The method may comprise any one or more of the actions below.

Action 1501.

The network node 110 configures the UE 120, by sending to the UE (120), a higher layer configuration comprising a set of SpCell configurations, to be configured in the UE 120.

E.g. the network node 110 configures a Connected UE 120 with a higher layer configuration with a list of SpCell configurations;

Action 1502.

The network node 110 may further configure the UE 120, by sending to the UE (120), a higher layer configuration comprising one or more TCI state configurations to be configured in the UE 120, which TCI state configurations are associated to the configured SpCells comprised the set of SpCells.

E.g., the network node 110 may configure the UE 120 with a list of TCI states associated to a set of SpCells (e.g.

common to the whole set of configurations), where each TCI state configuration is associated to one of the configured SpCells.

Action 1503.

While the UE 120 is in connected state, the network node 110 transmits a lower layer signaling to the UE 120. The lower layer signaling comprises an indication, which indication indicates one or more SpCells comprised in the set of SpCell configurations, to be any one or more out of: activated or deactivated.

E.g., the network node 110 may transmit a lower layer signaling activating or deactivating one of the configured SpCell(s).

In some embodiments, a source network node (e.g. a DU, baseband unit, etc.) transmits the lower layer signaling to activate an SpCell from the configured set of SpCells and at least one TCI state associated to one of its configured SpCell candidates;

In some variant embodiments a source network node, e.g. a DU, baseband unit, etc. transmits the lower layer signaling to only activate an SpCell from the configured set of SpCells. That would lead the UE 120 to perform random access in the target SpCell, possibly relying on contention-free or contention-based random access. Then, a second network node 110, which may be the same as the first or not, associated to the target SpCell receives a preamble and identifies the UE 120; Hence, once the UE 120 is synchronized it transmits a MAC CE indicating which TCI state for that target SpCell is to is to be activated;

Lower layer signaling may be a MAC CE containing an index pointing unambiguously to one of the configured SpCell;

Action 1504.

In some embodiments, when exceeding a predefined time period after the lower layer signaling comprising an indication to activate an SpCell, was transmitted to the UE 120, the network node 110 decides that the UE 120 has applied a stored SpCell configuration that is indexed by an index received in the lower layer signaling.

E.g., upon transmitting a lower layer indication to activate an SpCell, network node 110 decides, also referred to as assumes, after X ms that the UE 120 has applied a stored SpCell configuration that is indexed by the index received in the MAC CE.

The UEs mentioned in the below examples may be represented by the UE 120, and the network nodes and gNBs mentioned in the below examples may be represented by the network node 110, and the network side mentioned in the below examples may be represented by the network node 110. In other words, the UE 120 is referred to as UE, the network node 110 is referred to as network node, gNB, and network side, in all the examples below.

The embodiments herein refers most of the time to the problem of mobility i.e. when the UE is transmitting and/or receiving from one so-called source cell and triggers a procedure to start transmitting/receiving from another cell so-called target cell. However, many aspects of the embodiments herein are also applicable for multi-TRP transmissions where the UE may be connected simultaneously to multiple cells. In that case, instead of changing from one cell to another the UE would add and/or remove, activate and/or deactivate, a cell using lower layer signaling, i.e. signaling in a protocol layer below RRC like PDCP, RLC, MAC or physical layer (PHY) signaling. The term L1-based mobility is often used in the document to refer to this feature.

Different alternatives with different advantages, depending on the scenarios and architectural assumptions, are disclosed in the document. All solutions have in common the fact that they comprise the UE receiving a set of configurations from the network, e.g. PDCCH and PDSCH configurations and associated TCI states, to enable mobility using more signaling efficient and fast lower layer signaling i.e. UE deactivates a TCI state associated to one cell and activates a TCI state associated to another cell. That would require new ways to associate SpCell(s) to TCI states, and in some solutions, even defining a new type of cell that does not fit the existing definition of a serving cell like an SpCell, e.g. PCell or PSCell, or an SCell.

Across the embodiments herein, the terminology of 5G NR has been used. However, that should not be seen as a limiting factor. In fact the method may be applicable for any RAT where the concept of TCI states, or equivalent, like beam-based mobility is applicable.

Configuration of a List SpCell Candidates

An idea of L1-based mobility is the UE receiving a lower layer signaling like a MACE CE and, upon reception, performing inter-cell mobility i.e. a procedure similar to a reconfiguration with sync, handover or PSCell change. That also comprises the UE switching from a current configuration to a new configuration, according to the new target. The new configuration may contain some UE-specific configuration that is the same as the current configuration according to source i.e. that part of the configuration remains unchanged when the UE performs L1-based mobility.

One relevant scenario where L1-based mobility may be applied is when multiple cells are deployed and defined in the same DU in the network side. For example, there might be cells under the control of the same baseband (BBU). In that case, even if the network would transmit an RRCReconfiguration message to indicate to the UE a handover, reconfiguration with sync, most of the UE-specific configurations of a source PCell and a target PCell could possibly remain the same after a handover reconfiguration with sync, including the TCI states configurations and other beam management related configurations, likes RLM, beam failure detection, beam recovery, etc. However, as the name says, cell-specific parameters may need to be changed at the UE upon handovers, such as cell identifiers, other parts of system information, etc. The following variant of the provided method explores more that scenario where most of the configurations between cells in the set of SpCell(s) as defined in the method are UE-specific i.e. possible to be common across SpCell(s) in the configured set.

That variant comprises a set of configurations that is common to the set of configured SpCell(s), such as the following, typically outside the cell group configuration and not set by DUs) as defined in TS 38.331:

radioBearerConfig of IE RadioBearerConfig;
measConfig of IE MeasConfig.

Common in this context means that the UE may move between the SpCell(s) using lower layer signaling, e.g. MAC CE, and keep these configurations, unless the UE is reconfigured e.g. with an RRCReconfiguration.

In addition to it, the UE receives in a CellGroupConfig as part of the MCG configuration, or any other equivalent notion of cell group, like an SCG configuration in case these SpCell are being associated to an SCG when the UE operates in MR-DC, some configurations considered common to the set of configured SpCell(s) that are candidates and may be activated, which could also be considered UE-specific configurations, such as:

cellGroupId (of IE CellGroupId);
rlc-BearerToAddModList (of IE SEQUENCE (SIZE (1 . . . maxLC-ID)) OF RLC-BearerConfig);
rlc-BearerToReleaseList (of IE SEQUENCE (SIZE (1 . . . maxLC-ID)) OF LogicalChannelIdentity);
mac-CellGroupConfig (of IE MAC-CellGroupConfig);
physicalCellGroupConfig (of IE PhysicalCellGroupConfig);
etc.

In prior art, i.e. in the latest version of the specifications when this document was written, these are configurations typically set by a DU, but considered common to the cell group i.e. the SpCell and the associated SCell(s). But according to embodiments of the method herein, these are common to the set of configured SpCell(s), which makes sense at least for the case where the configured SpCell(s) in the set are from the same DU, as it is often assumed for carrier aggregation i.e. for the configured SCell(s) and SpCell(s) int eh same cell group. See again FIG. 5.

The method comprises the UE receiving a higher layer configuration with a set of SpCell configurations. The UE receives an MCG configuration, masterCellGroup of IE CellGroupConfig, possibly in an RRCReconfiguration message during an IDLE to CONNECTED transition, and, in addition to the existing MCG SpCell configuration (currently conveyed in spCellConfig of IE SpCellConfig), the UE receives a list of additional SpCell configurations.

That may be encoded in ASN.1 as a SEQUENCE of SpCell configurations. In one example, the list contains only the configurations for the additional SpCell(s) as the configuration of the current SpCell is still provided in spCellConfig of IE SpCellConfig, as shown below:

```
-- Configuration of one Cell-Group:
CellGroupConfig ::=                              SEQUENCE {
    cellGroupId                                      CellGroupId,
    rlc-BearerToAddModList                           SEQUENCE (SIZE(1 . . . maxLC-ID)) OF RLC-
BearerConfig                    OPTIONAL,    -- Need N
    rlc-BearerToReleaselist                          SEQUENCE (SIZE{1 . . . maxLC-ID)) OF
LogicalChannelIdentity          OPTIONAL,    -- Need N
    mac-CellGroupConfig                              MAC-CellGroupConfig
OPTIONAL,    -- Need M
    physicalCellGroupConfig                          PhysicalCellGroupConfig
OPTIONAL,    -- Need M
    spCellConfig                                     SpCellConfig         OPTIONAL,    -- Need M
→ spCellConfigList   →   →   →   →   →          → SEQUENCE (SIZE 1 . . . maxNrofSpCells-1)) OF
AdditionalSpCellConfig OPTIONAL,
    sCellToAddModList                                SEQUENCE (SIZE (1 . . . maxNrofSCells)) OF
SCellConfig                     OPTIONAL,    -- Need N
    sCellToRelsaselist                               SEQUENCE (SIZE (1 . . . maxNrofSCells)) OF
SCellIndex                      OPTIONAL,    -- Need N
    . . . ,
    [[
    reportUplinkTxDirectCurrent-v1530                ENUMERATED (true)
OPTIONAL        -- Cond BWP-Reconfig
    ]]
}
```

The method comprises another variant where the UE only receives a list of SpCellConfig(s) and the first element in the list is the configuration of the SpCell the UE is resuming or setting up the connection. In that case one may say that the additional SpCell(s) as the remaining elements, except the first one.

CellGroupConfig field descriptions

...

spCellConfig

Parameters for the SpCell of this cell group (PCell of MCG or PSCell of SCG).

spCellConfigList

List of additional SpCell configurations for the SpCell(s) that are target candidates for L1-based mobility (i.e. to be changed via MAC CE). The UE applies one of the configurations upon receiving a MAC CE triggering a TCI state activation associated to that a particular SpCell.

The method may comprise the configuration of SpCell-specific parameters for each additional SpCell, such as at least the following:

- An SpCell index: that may be referred (e.g. indexed, indicated, implicitly indicated, etc.) in a TCI state configuration within the SpCellConfig to associate to one of the additional SpCell (different from the current SpCell). Details and examples are shown in the following;
- Cell-specific configuration, such as a Physical Cell Identifier (PCI), downlink frequency information for the synchronization/reference signals that are being transmitted by that additional SpCell, further information typically obtained via system information, etc. That is needed since the UE needs a mapping between the SpCell index and at least the PCI and frequency that the synchronization signals are being transmitted. In more general terms, this could be any content configured in ServingCellConfigCommon (as defined in TS 38.331).

Note: The wording SpCell-specific parameters may comprise cell-specific parameters in more general terms, where that cell may operate as an SpCell at some point in time when activated via MAC CE.

An example of an ASN.1 encoding for the additional SpCell configuration (possibly also called S-SpCell) is the following, where the ServingCellConfigCommon EI is similar to the one defined in the NR RRC specifications (TS 38.331):

additional SpCell(s),m except if the UE is re-configured via RRC e.g. with an RRCReconfiguration updating/modifying the UE-specific parameters in spCellConfig.

In that alternative, TCI states configurations (i.e. PDSCH and PDCCH configurations per DL BWPs) within the SpCellConfig includes TCI states associated to the current SpCell and also to these additional SpCell(s). In other words, the configuration for each additional SpCell does not contain TCI states configurations (as it does not contain any dedicated or UE-specific configurations). And, upon the change of SpCell e.g. where one of the additional SpCell(s) becomes a target SpCell via MAC CE or any other lower layer signaling, the UE applies the cell-specific configuration of the additional SpCell having as reference the configuration of the previously active SpCell, i.e. the source SpCell where the UE has received the MAC CE. However, as the additional SpCell configuration does not contain TCI state configuration, the UE remains using the TCI state configuration from the source SpCell, or in more general case, from the SpCell were the UE has entered Connected state, and only updates the states (activated/deactivated) of the TCI states in that configuration. Or, in more general terms, the UE keeps its UE-specific configurations upon the change of SpCell and only changes the cell-specific configurations.

In another alternative each additional SpCell configuration may contain cell-specific configurations (like in ServingCellConfigCommon) and UE-specific configuration

```
AdditionalSpCellConfig ::=        SEQUENCE {
spCellIndex                       ServCellIndex,
spCellConfigCommon                ServingCellConfigCommon,
...
}
```

As it may be seen above, in this example the configuration of each additional SpCell does NOT contain UE-specific or dedicated configuration, as it is assumed in this example that all UE-specific configurations are provided as part of the spCellConfig field of IE SpCellConfig, i.e., the UE-specific or dedicated configuration remains the same as the UE moves via MAC CE between the current SpCell and the (dedicated). In that case the configuration type or IE for the additional SpCell(s) may be the same as the one defined for the current SpCell i.e. SpCellConfig. An example of an ASN.1 encoding for the additional SpCell configuration in that alternative (possibly also called Secondary SpCell) is the following, where the SpCellConfig IE and is similar to the one defined in the NR RRC specifications (TS 38.331):

```
-- Configuration of one Cell-Group:
CellGroupConfig ::=                    SEQUENCE {
    cellGroupId                        CellGroupId,
    rlc-BearerToAddModlist             SEQUENCE (SIZE (1 ... maxLC-ID)) OF RLC-BearerConfig        OPTIONAL,    -- Need N
    rlc-BearerToReleaseList            SEQUENCE (SIZE (1 ... maxLC-ID)) OF LogicalChannelIdentity        OPTIONAL,    -- Need N
    mac-CellGroupConfig                MAC-CellGroupConfig        OPTIONAL,    -- Need M
    physicalCellGroupConfig            PhysicalCellGroupConfig        OPTIONAL,    -- Need M
    spCellConfig                       SpCellConfig        OPTIONAL,    -- Need M
    spCellConfigList                   SEQUENCE (SIZE 1 ... maxNrofSpCells-1)) OF SpCellConfig OPTIONAL,
    sCellToAddModList                  SEQUENCE (SIZE (1 ... maxNrofSCells)) OF SCellConfig        OPTIONAL,    -- Need N
    sCellToReleaseList                 SEQUENCE (SIZE (1 ... maxNrofSCells)) OF SCellIndex        OPTIONAL,    -- Need N
    ...,
    [[
    reportUplinkTxDirectCurrent-v1530  ENUMERATED (true)
    OPTIONAL    -- Cond BWP-Reconfig
    ]]
}
-- Serving cell specific MAC and PHY parameters for a SpCell:
SpCellConfig ::=                       SEQUENCE [
```

```
    servCellIndex                          ServCellIndex
OPTIONAL,        -- Cond SCG
    reconfigurationWithSync                ReconfigurationWithSync
OPTIONAL,        -- Cond ReconfigWithSync
    rlf-TimersAndConstants                 SetupRelease [ RLF-TimersAndConstants ]
OPTIONAL,        -- Need M
    rlmInSyncOutOfSyncThreshold            ENUMERATED (n1)
OPTIONAL,        -- Need S
    spCellConfigDedicated                  ServingCellConfig
OPTIONAL,        -- Need M
    . . .
}|
```

In this alternative, one example of UE-specific configuration that is defined for each SpCell(s), current and additional, is the TCI states configurations. The UE's current TCI state configuration comprises the TCI state configurations in the current SpCell and the TCI states configurations from all additional SpCell(s), where each TCI state configuration is configured in each SpCell. In other words, any of these TCI states configurations are part of the current UE's configuration and may be activated and/or deactivated with MAC CEs. This is to some extent similar to the handling of TCI states within a Cell Group where each serving cell (e.g. SpCell and SCell(s)) contain their own TCI states configurations that are considered part of the UE's current configuration and may be activated and/or deactivated via MAC CE. Herein, according to the method, the principle applied for SCells is applied for the additional SpCell(s).

One way to implement this alternative of having both cell-specific and UE-specific configurations in the current and additional SpCell(s) is to define a new interpretation of the SCell list in CellGroupConfig. According to current RRC specifications, the UE may be configured with a CellGroupConfig for the MCG or SCG configuration comprising an SpCell configuration and configurations for each configured SCell. In a way, one may say that the UE may be configured with a set of SCell(s) where each of these are candidate cells for carrier aggregation. Then, UE may receive specific MAC CEs to activate and/or deactivate SCell(s) and/or their TCI states that have been configured in the CellGroupConfig, where these are the highlighted MAC CEs used for that purpose:

| Index | LCID values |
|-------|-------------|
| 52 | TCI State Indication for UE-specific PDCCH |
| 53 | TCI States Activation/Deactivation for UE-specific PDSCH |
| 57 | SCell Activation/Deactivation (four octet) |
| 58 | SCell Activation/Deactivation (one octet) |

In this variant of the provided method the list of SCell(s) may also be used to indicate cells that may also be candidates as additional SpCells, according to what is described in this document as additional SpCell(s). This variant may comprise two different ways to enable the UE to distinguish that a given cell and its configuration in the list is an SCell or an SpCell candidate. In the first way, a new field is added to indicate that the cell is an SpCell candidate. In another way, this is implicitly indicated e.g. by the fact that the SCell frequency is in the same frequency as the SpCell frequency (i.e. the frequency of the SpCell where the UE has been configured).

In this variant, there may also be different ways to trigger lower layer mobility. In one embodiment, the same MAC CE used for SCell activation is received by the UE and upon reception, if that is activating a cell in the list known to be an SpCell candidate, the UE performs lower layer mobility (i.e. synchronizes with the new cell and apply parameters associated to the configured cell in the Scell configuration list). In another solution, a new MAC CE is defined for lower layer mobility, to distinguish from SCell activation. There may be a third solution enabling the UE to distinguish yet another use case: multi-TRP transmission. In that third solution, the candidate for SpCell may also be a candidate for inter-cell multi-TRP transmission. In that solution, the UE may receive a MAC CE that indicates the addition of that cell for inter-cell multi-TRP transmission, distinguishing from lower layer mobility and SCell activation/deactivation.

The advantage of this variant of reusing the SCell list is the minimized changes to the specifications as the SCell signalling is used, though with a different interpretation, a broader one, as the cells are not any longer only SCell but may be SpCEll candidates or candidates for inter-cell multi-TRP transmissions.

That embodiment may comprise an additional configuration in the SCell configuration to indicate to the UE that this is a candidate for lower layer mobility i.e. a candidate to be an SpCell, and not an SCell. That may be an indication e.g. a flag or a specific configuration that is applicable for SpCell(s). Hence, upon reception of a MAC CE whose identifier is associated to that cell whose indication indicates that this is an SpCell candidate, the UE performs inter-cell lower layer mobility instead of activating an SCell.

The embodiment of the method may also comprise the configuration of an SpCell index, like the spCellIndex of IE ServCellIndex above, for the current SpCell, that is configured in spCellConfig of IE SpCellConfig. The reasoning is that the current SpCell, e.g. cell-A where UE resumes, should be possibly referred in a TCI state configurations in case the UE performs inter-cell mobility with lower layer signalling to another cell (cell-B) and afterwards network later decides to activate a TCI state of cell-A. In this alternative, the current SpCell is the one where the UE entered Connected state e.g. from Inactive and/or Idle. Hence, when the UE receives that configuration in an RRC Resume like message (in response to an RRC Resume Request like message) or in a first RRCReconfiguration after coming from Idle the UE interprets the SpCellConfig as the configuration for the cell the UE is currently resuming, while the additional SpCell configurations are the ones the UE may be moved with lower layer signalling. That aspect (index for the current SpCell) is novel compared to existing specifications. Even though there is a serving cell index in the SpCell configuration for the current SpCell the UE enters Connected state e.g. upon resume, that index is only used for a PSCell configuration, i.e. the field is absent for an MCGs, when the SpCellConfig refers to a PCell, as shown in the excerpt below taken from NR RCC specifications (TS 38.331):

```
-- Serving cell specific MAC and PHY parameters for a SpCell:
SpCellConfig :=                       SEQUENCE {
    servCellIndex                     ServCellIndex         OPTIONAL,    --
Cond SCG
    reconfigurationWithSync           ReconfigurationWithSync
OPTIONAL,     -- Cond ReconfWithsync
    rlf-TimersAndConstants            SetupRelease { RLF-TimersAndConstants }
OPTIONAL,    -- Need M
    rlmInSyncOutOfSyncThreshold       ENUMERATED {n1}
OPTIONAL,    -- Need S
    spCellConfigDedicated             ServingCellConfig
OPTIONAL,    -- Need M
    ...
}
```

| Conditional Presence | Explanation |
| --- | --- |
| BWP-Reconfig | The field is optionally present, Need N, if the BWPs are reconfigured or if serving cells are added or removed. Otherwise it is absent. |
| ReconfWithSync | The field is mandatory present in case of SpCell change, PSCell addition, SI update for PSCell and AS security key change; otherwise it is optionally present, need M. The field is absent in RRCResume or RRCSetup messages. |
| SCellAdd | The field is mandatory present upon SCell addition; otherwise it is absent, Need M. |
| SCellAddMod | The field is mandatory present upon SCell addition; otherwise it is optionally present, need M. |
| SCG | The field is mandatory present in an SpCellConfig for the PSCell. It is absent otherwise. |

According to current specifications the IE ServCellIndex concerns a short identity, at least shorter than the cell identifiers that are broadcasted, like the PCI and Cell Identity, used to identify a serving cell, i.e. the PCell, the PSCell or an SCell, with value 0 for the PCell, while the SCellIndex that has previously been assigned applies for SCells. In other words, PCell would always have value zero.

Hence, one novel aspect in the method is the definition of an index, e.g. an integer of 5 bits, for that current PCell so that it may be referred in the TCI state configuration without ambiguities, since according to the method there may be additional PCell(s). An example of a new ASN.1 structure for SpCellConfig with the new index is shown below:

```
-- Serving cell specific MAC and PHY parameters for a SpCell:
SpCellConfig ::=                    SEQUENCE {
servCellIndex                       ServCellIndex           OPTIONAL, -Cond SCG
    spCellIndex                    → ServCellIndex           OPTIONAL,
    reconfigurationWithSync         ReconfigurationWithSync
OPTIONAL,    -- Cond ReconfWithSync
    rlf-TimersAndConstants          SetupRelease { RLF-TimersAndConstants }
OPTIONAL,    -- Need M
    rlmInSyncOutOfSyncThreshold     ENUMERATED {n1}
OPTIONAL,    -- Need S
    spCellConfigDedicated           ServingCellConfig
OPTIONAL,    -- Need M
    ...
}
```

| SpCell Configfield descriptions |
| --- |
| reconfigurationWithSync |
| Parameters for the synchronous reconfiguration to the target SpCell. |
| rlf-TimersAndConstants |
| Timers and constants for detecting and triggering cell-level radio link failure. For the SCG, rlf-TimersAndConstants may only be set to setup and is always included at SCG addition. |
| servCellIndex |
| Serving cell ID of a PSCell. The PCell of the Master Cell Group uses ID = 0. |
| spCellIndex |
| SpCell identifier to be referred in a TCI state configuration. In case a list of additional SpCells is configured, the field is mandatory, otherwise it is absent. |

Another possible embodiment is to change the definition of the existing serving cell index i.e. enabling its usage for the current SpCell, not necessarily set to 0, and/or the additional SpCells. Hence, these indexes could be used in the MAC CEs to indicate which SpCellI(s) are to be activated/deactivated. That also comprises the possibility to indicate which SpCell is to be considered when TCI states are to be activated/deactivated.

Notice that, in current signalling in 3GPP Release15 and/or Release16, the SpCellConfig does not contain common configuration as that is assumed to be acquired by the UE via system information. However, according to the method the additional SpCell(s) have a common configuration, like ServingCellConfigCommon, and also the SpCell configuration, i.e. where the UE enters Connected. The reasoning is that when the UE performs L1-based mobility the UE may leave that cell and possibly come back. And, if it comes back it needs to have in its configuration the common configuration. That may be done by defining a UE variable where the UE stores the common configuration of the SpCell that has been initially configured, (signalling optimization since there is no need to signal that as UE has obtained via broadcasting, or by defining that explicitly in the signalling.

In many of the presented embodiments, the UE has a list of indexes; each associated to a configured SpCell i.e. the current SpCell and all additional SpCell which are candidate to be activated via lower layer signalling like MAC CE(s).

identifiers and integers, serving cell index, to be signalled in the lower layer signalling (e.g. MAC CEs) in the are provided in an RRCReconfiguration and/or RRCResume transmitted on SRB1, both encrypted and/or integrity protected. In that sense, while the MAC CE is not encrypted, it only contains an integer from 0 to N (where N could be e.g. 8) regardless which are in the network the UE is located i.e. it would not reveal much about UE's location, the mapping between this integer and the cell identities is provided in an encrypted in the SRB1 messages.

Variant Relying on a CellGroupConfigSet

In yet another embodiment variant for the signaling, the UE is configured with common configuration for the whole set of SpCell(s), i.e. dedicated or UE-specific, like one of the variants where the additional SpCell configurations are provided only with cell-specific configurations. An example of some configurations that may be considered common are the inter-cell L1 reporting configurations and the TCI state configurations, i.e. the configurations that are activated and/or deactivated with MAC CEs. In other words, the UE may consider these common configurations as long as it is being signaled to activate/deactivate these SpCells in this configured set.

A signaling example is shown below in a high level, for the case of RRCReconfiguration, even though this could be the case of an RRCSetup or RRCResume messages, i.e. during the transition to Connected, rather than a re-configuration of a Connected UE in a given source cell:

RACReconfiguration Message

```
-- ASN1START
-- TAG-RRCRECONFIGURATION-START
RRCReconfiguration ::=                SEQUENCE {
    rrc-TransactionIdentifier             RRC-Transactiondentifier,
    criticalExtensions                    CHOICE {
        rrcReconfiguration                    RRCReconfiguration-IEs,
        criticalExtensionsFuture              SEQUENCE { }
    }
}
...
RRCReconfiguration-v17-IEs ::=        SEQUENCE {
 → radioBearerConfig →   →   →   →   →   → RadioBearerConfig,
 → measContig →   →   →   →   →   →   →   → MeasConfig,
    masterCellGroup-r17                   → OCTET STRING (CONTAINING CellGroupConfigset)
OPTIONAL, -- Need M
    nonCriticalExtension                  SEQUENCE { }
OPTIONAL
}
CellGroupConfigSet :: = →   →   →   → SEQUENCE {
 → commonSpCellConfigSetConfig →   →   → CommonSpCellConfigSetConfig
 → dedicatedSpCellConfigSetConfig →   →   → SEQUENCE {SIZE {1..maxNrofSpCells}} OF
SpCellConfig                              OPTIONAL, -- Need M
    nonCriticalExtention                  SEQUENCE { }
OPTIONAL
}
|
...
-- TAG-RRCRECONFIGURATION-STOP
-- ASN1STOP
```

The MAC CE activating a given SpCell needs to contain the same identifier configured for that SpCell. Details provided later.

From a security and privacy perspective, according to embodiments of the method, cell identifiers like Cell ID, Physical Cell Identity—PCI, ARFCN or other frequency information, or any other information enabling a possible intruder to identify the UE's location, like PCI/frequency or unique Cell IDs-CellIdentity, are configured within an encrypted message. The configuration of SpCell(s), current and additional, containing the mapping between these cell In this example embodiment, an IE like CellGroupConfigSet is defined, and/or set, by a DU which configures a set of SpCells where the UE may perform mobility via MAC CEs without the need of a re-configuration, i.e., via activation/deactivation of SpCell(s). In that example, if the UE receives a MAC CE activating one of the deactivated SpCells the UE considers the cell being activated the new SpCell and applies the SpCell specific parameters (e.g. in this example these are the SpCellConfig in the list associated to the SpCell being activated). UE keeps the current configuration for the common parameters for the whole set, e.g. in this example above, the commonSpCellConfigSetConfig.

Embodiment Variant Relying on Additional SpCell Configuration Having a Reconfiguration with Sync Another variant of the method according to embodiments herein, relies on signaling in the additional SpCell configuration a reconfiguration with sync. Notice that this is already the case in one of the variants where each SpCell, first/current and additional, have their configurations with the IE SpCellConfig, which contains a reconfigurationWithSync field of IE ReconfigurationWithSync, used for handovers and other inter-cell procedures (like PSCell change) requiring a synchronization with a new cell. In that previous variant, UE-specific configurations were emphasized for each SpCell, while in this variant, all UE-specific/dedicated parameters are configured in the first SpCell configuration of IE SpCell while the additional SpCell configurations contains:

Cell-specific configuration (e.g. ServingCellConfigCommon);
Reconfiguration with Sync (e.g. ReconfigurationWithSync).

to the SpCell being activated. UE keeps the current configuration for the common parameters for the whole set, e.g. in this example above, the commonSpCellConfigSetConfig.

Embodiment Variant Relying on Additional SpCell Configuration Having a Reconfiguration with Sync Another variant of the method according to embodiments herein, relies on signaling in the additional SpCell configuration a reconfiguration with sync. Notice that this is already the case in one of the variants where each SpCell, first/current and additional, have their configurations with the IE SpCellConfig, which contains a reconfigurationWithSync field of IE ReconfigurationWithSync, used for handovers and other inter-cell procedures (like PSCell change) requiring a synchronization with a new cell. In that previous variant, UE-specific configurations were emphasized for each SpCell, while in this variant, all UE-specific/dedicated parameters are configured in the first SpCell configuration of IE SpCell while the additional SpCell configurations contains:

Cell-specific configuration, e.g. ServingCellConfigCommon;
Reconfiguration with Sync, e.g. ReconfigurationWithSync.

An Example of that Signaling is Shown Below:

```
-- Configuratiion of one Cell-Group:
CellroupConfig ::=                                     SEQUENCE {
   cellGroupId                                         CellGroupId,
   rlc-BearerToAddModList                              SEQUENCE (SIZE(1 ... maxLC-ID)) OF RLC-
BearerConfig            OPTIONAL,   -- Need N
   rlc-BearerToReleaseList                             SEQUENCE (SIZE(1 ... maxLC-ID)) OF
LogicalChannelIdentity          OPTIONAL,   -- Need N
   mac-CellGroupConfig                                 MAC-CellGroupConnfig
OPTIONAL,   -- Need M
   physicalCellGrougConfig                             PhysicalCellGroupConfig
OPTIONAL,   -- Need M
   spCellConfig                                        SpCellConfig       OPTIONAL,   -- Need M
→ spCellConfigList →  →  →  →  →  →  → SEQUENCE (SIZE (1 ... maxNrofspCells-1)) OF
AdditionalSpCellconfig OPTIONAL,
   sCellToAddModList                                   SEQUENCE (SISE (1 ... maxNrofSCells)) OF
SCellConfig             OPTIONAL,   -- Need N
   sCellToReleaseList                                  SEQUENCE (SIZE (1 ... maxNrofSCells)) OF
SCellIndex              OPTIONAL,   -- Need N
   ...,
   [[
   reportUplinkTxDirectCurrent-v1530                   ENUMERATED (true)
OPTIONAL    -- Cond BWP-Reconfig
   ]]
}
AdditionalspCellConfig ::= →  →   → SEQUENCE {
   spCellIndex →  →  →  →  →   → ServCellIndex,
   spCellConfigcommon                                  ServingCellConfigComnon,
   reconfigurationWithSync                             ReconfigurationWithSync
OPTIONAL,    -- Cond ReconfWithSync
   rlf-TimersAndConstants                              SetupRelease { RLF-TimersAndConstants }
OPTIONAL,   -- Need M
   rlmInSyncutOfSyncThreshold                          ENUMERATED (n1)
OPTIONAL,   -- Need S
   ...
}
```

An Example of that Signaling is Shown Below:

In this example embodiment, an IE like CellGroupConfigSet is defined, and/or set, by a DU which configures a set of SpCells where the UE may perform mobility via MAC CEs without the need of a re-configuration, i.e., via activation/deactivation of SpCell(s). In that example, if the UE receives a MAC CE activating one of the deactivated SpCells the UE considers the cell being activated the new SpCell and applies the SpCell specific parameters, e.g. in this example these are the SpCellConfig in the list associated Then, upon reception of a MAC CE indicating the activation of a configured SpCell that is not the current SpCell, e.g. with an spCellIndex=X in the MAC CE, the UE May perform a reconfiguration with sync according to the reconfigurationWithSync configuration of IE ReconfigurationWithSync associated to the same SpCell indicated by the same indication, e.g. spCellIndex=X in the Additional SpCell configuration. That may comprise a random access procedure that enables the UE to obtain a time alignment with the new target SpCell, possibly obtain a new C-RNTI, and possibly perform contention-based random access (so that each target does not have to allocate dedicated resources for UEs that are not connected to it, or are do not have that cell as activated). That in turn enables more flexible deployments where the set of SpCell(s) configured to a UE are not necessarily synchronized in the downlink/uplink and/or time aligned.

The configuration may also comprise RLM and RLF related configurations to given further flexibility such as:

```
-   rlf-TimersAndConstants    SetupRelease { RLF-    TimersAndConstants
}         OPTIONAL, -- Need M;
-   rlmInSyncOutOfSyncThreshold      ENUMERATED {n1}
    OPTIONAL, --Need S
```

Other Aspects, e.g. Signalling Optimizations

Another aspect of the method is the possibility to have a delta signaling for the UE-specific configurations of each additional SpCell, for the case where each configured SpCell, current and additional, have UE-specific configurations e.g. in the variant where each SpCell configuration has SpCellConfig IE and ServingCellConfigCommon IE. The advantage here is to optimize and/or reduce the signaling to provide these SpCell configurations. In that solution, the UE-specific configuration in each additional SpCell configuration may be a delta signaling to be applied to the UE's first SpCell, i.e. the UE-specific configuration of the SpCell the UE resumes or connects/setups to. Hence, upon reception of a MAC CE indicating to activate one of the configured SpCell(s) that is deactivated, the UE applies the UE-specific configurations of the new SpCell on top of the UE's first SpCell configuration.

Another aspect of the example method is the possibility to have a delta signaling for the cell-specific configurations of each additional SpCell, for the case where each configured SpCell, current and additional, have cell-specific configurations e.g. in the variant where each SpCell configuration has ServingCellConfigCommon IE. The advantage here is to optimize/reduce the signaling to provide these SpCell configurations. In that solution, the cell-specific configuration in each additional SpCell configuration may be a delta signaling to be applied to the UE's first SpCell, i.e. the cell-specific configuration of the SpCell the UE resumes or connects/setups to. Hence, upon reception of a MAC CE indicating to activate one of the configured SpCell(s) that is deactivated, the UE applies the cell-specific configurations of the new SpCell on top of the UE's first SpCell configuration.

Another embodiment variant relies on a full configuration where the UE discards the previous SpCell configuration before applying the new SpCell configuration. That may be indicated by an indication e.g. a full-config flag. This variant is valid for UE-specific parameters and/or cell-specific parameters.

Configuration of TCI States and Association with SpCell(s)

Some embodiments of the method comprises the UE receiving a higher layer configuration with TCI state configurations associated with one SpCell from the set of configured SpCell(s).

In some alternative embodiments, relying on the list of additional SpCell(s) configurations, in addition to the SpCell configuration of the current/first SpCell, the TCI states configurations may be provided as part of the SpCellConfig, i.e. configuration of the current SpCell, the first SpCell where the UE resumes and/or setups up the RRC connection. That is related to the alternative embodiments where the additional SpCell(s) only contain cell-specific configurations. Herein, the TCI state configuration is considered as part of the UE's current configuration as long as the UE performs inter-cell mobility among the configured SpCell(s).

In some other alternative embodiments, TCI states configurations are provided within each SpCell configuration, current/first and additional (i.e. within an SpCellConfig).

In one variant of these alternative embodiments, the TCI state configuration considered as part of the UE's current configuration is the one associated to the currently activated SpCell, i.e. the first SpCell the UE connected to, or the SpCell indicated via MAC CE. In other words, only these TCI states part of UE's current configuration may be activated via MAC CE. To activate a TCI state of another SpCell the UE receives first a MAC CE activating a new SpCell, change the UE's current configuration to the one associated to the new SpCell so the new TCI state configuration is the one configured in the new SpCell, to then possibly receive a MAC CE activating a TCI state of the new SpCell. The advantage of that approach is the possible reuse of indications in the MAC CEs;

In another variant of these alternative embodiments, the TCI state configuration considered as part of the UE's current configuration is the union of the TCI state configurations associated to the currently activated SpCell, i.e. the first SpCell the UE connected to, and the additional SpCell(s). Hence, any TCI state of any configured SpCell may be activated or deactivated via MAC CEs, as the union is part of the UE's current configuration.

In some other alternative embodiments, the TCI states configurations are common to the set of SpCell(s) i.e. is provided as part of a common configuration for all the candidate SpCell(s). Hence, upon reception of MAC CEs for lower layer mobility the UE remains with the same TCI state configuration(s) though the state may be updated via MAC CEs.

According to some embodiments of the method, the association between a configured SpCell and a TCI state configuration is done via an SpCell index, or equivalent index. Considering the ASN.1 example it is shown, to illustrate that concept, the set would comprise the spCell-Config and the spCellConfigList with the additional SpCell.

When looking at the existing TCI state configuration, i.e. 5G NR Release-15, there is a field called "cell" of IE ServCellIndex, as follows (excerpt from TS 38.331, NR RRC specifications):

```
TCI-State ::=                    SEQUENCE {
    tci-StateId                      TCI-StateId,
    qcl-Type1                        QCL-Info,
    qcl-Type2                        QCL-Info
OPTIONAL,    -- Need R
    ...
}
QCL-Info ::=                     SEQUENCE {
    cell                             ServCellIndex
OPTIONAL,    -- Need R
    bwp-Id                           BWP-Id
OPTIONAL,    -- Cond CSI-RS-Indicated
    referenceSignal                  CHOICE {
        csi-rs                           NZP-CSI-RS-ResourceId,
        ssb                              SSB-Index
    },
    qcl-Type                         ENUMERATED {typeA, typeB, typeC,
typeD},
    ...|
}
```

QCL-Info field descriptions bwp-Id
The DL BWP which the RS is located in.
cell
The UE's serving cell in which the referenceSignal is configured. If the field is absent, it applies to the serving cell in which the TCI-State is configured. The RS may be located on a serving cell other than the serving cell in which the TCI-State is configured only if the qcl-Type is configured as typeC or typeD. See TS 38.214 [19] clause 5.1.5.
referenceSignal
Reference signal with which quasi-collocation information is provided as specified in TS 38.214 [19] subclause 5.1.5.
qcl-Type
QCL type as specified in TS 38.214 [19] subclause 5.1.5.

| Conditional Presence | Explanation |
|---|---|
| CSI-RS-Indicated | This field is mandatory present if csi-rs is included, absent otherwise |

According to some embodiments of the method, one alternative is to extend the meaning of the field "cell" within the QCL-Info configuration, to be not only a reference to a possibly configured SCell of a given cell group, but to be a reference to any configured SpCell, which may be the current SpCell or any additional SpCell. For example, according to current specs, that index is used to refer to an SCell of the cell group and, its absence means a reference to the PCell or PSCell. However, since according to the method there are multiple configured SpCells, and considering that according to the method each TCI state may refer to any of the SpCells, the index is used to refer to any configured SpCell, to indicate to the UE which SpCell should be considered for a given TCI state. The UE then considers the cell indexes in a single pool to refer to SCells within a group and any configured SpCells.

For example, UE is configured with a PCell-A with index=1, e.g. where the UE entered Connected and received the configuration according to an embodiment of the method, an associated SCell-x with index=2, another associated SCell-y with index=3. Then, a list of additional SpCells with PCell-B using index=4. In that case, the index for Pcell-B could not be repeated since it may be referred in the different SpCell configurations. Thanks to that aspect of the method it would be possible to activate and/or deactivate TCI states associated to any configured PCell, current or additional, and any SCell associated to an active PCell.

One possible way to implement this in the RRC specifications is to modify the meaning of the field "cell" in the QCL configuration, as shown below:

QCL-Info field descriptions bwp-Id
The DL BWP which the RS is located in.
Cell
The UE's serving cell in which the referencesignal is configured, which may be an SCell index within that cell group, or an spCell in case additional SpCells are configured. If the field is absent, it applies to the SpCell serving cell in which the TCI-State is configured. The RS may be located on a serving cell other than the serving cell in which the TCI-State is configured only if the qcl-Type is configured as typeC or typeD. See TS 38.214 [19] clause 5.1.5.
referenceSignal

| QCL-Info field descriptions |
| --- |
| Reference signal with which quasi-collocation information is provided as specified in TS 38.214 [19] subclause 5.1.5. |
| qcl-Type |
| QCL type as specified in TS 38.214 [19] subclause 5.1.5. |

| Conditional Presence | Explanation |
| --- | --- |
| CSI-RS-Indicated | This field is mandatory present if csi-rs is included, absent otherwise |

In some other alternative embodiments, a new identifier is configured as part of the TCI state configuration, in the QCL configuration, indicating which SpCell that QCL configuration refers to, in addition to the existing field called "cell". In that case, the field "cell" would still refer to a possibly configured SCell that is indexed in the SCell configuration, while the new identifier refers to a configured SpCell, which may be the current, i.e. the one configured in spCellConfig of IE SpCellConfig, or an additional SpCell. Thanks to that alternative, it would be possible to activate/deactivate TCI states associated to any configured SpCell and any SCell in the configured cell group. An example of that is shown below:

```
TCI-State ::=                SEQUENCE {
   tci-StateId                  TCI-StateId,
   qcl-Type1                    QCL-Info,
   qcl-Type2                    QCL-Info
OPTIONAL,    -- Need R
   ...
}
QCL-Info :: =                SEQUENCE {
   cell                         ServCellIndex
OPTIONAL,    -- Need R
   spCell                       ServCellIndex
OPTIONAL,    -- Need R
   bwp-Id                       BWP-Id
OPTIONAL,    -- Cond CSI-RS-Indicated
   referenceSignal              CHOICE {
      csi-rs                       NZP-CSI-RS-ResourceId,
      ssb                          SSB-Index
   },
   qcl-Type                     ENUMERATED {typeA, typeB,
typeC, typeD},
   ...
}
```

The overall concept for the configuration may be illustrated in the following example, as shown below:
See again FIG. 16.
In this example, the UE starts in IDLE state camping on a cell-A, i.e. it has acquired common and/or cell-specific parameters for cell-A, and transitions to CONNECTED. Then, it receives an MCG configuration, e.g. masterCellGroupConfig within an RRCReconfiguration message, containing the cell-A spCellConfig of IE SpCellConfig for the current PCell, and the configuration for the additional SpCells. Each of these configurations include an SpCell index, in this example, SpCell-A has index=1, SpCell-B has index=2 and SpCell-C has index=3. Then, within spCellConfig of IE SpCellConfig, the UE is configured with a list of TCI states, where each TCI state may be associated to a configured SpCell. In the example above, the UE is configured with 4 TCI states:

TCI-state ID=1 is associated to Pcell-A, hence it has an SpCell index=1;

TCI-state ID=2 is associated to Pcell-B, hence it has an SpCell index=2;

TCI-state ID=3 is associated to Pcell-A, hence it has an SpCell index=1;

TCI-state ID=4 is associated to Pcell-A, hence it has an SpCell index=3;

Notice that according to embodiments of the method even though the UE receives the list of TCI states as part of the spCellConfig, which in principle refers to the configuration of cell-A, the list is in fact a UE-specific configuration. I.e. a dedicated configuration, that is associated to the configured SpCells A, B and C. I.e. the TCI state configurations is common to the configured SpCells. Hence, a change in SpCell, e.g. activation of a TCI state of a different PCell than the current one, does not change the UE-specific configuration, but only the cell-specific configuration. In other words, the UE remains with the same list of configured TCI states.

TCI State Activation for an Additional SpCell or First SpCell

Figure 17:
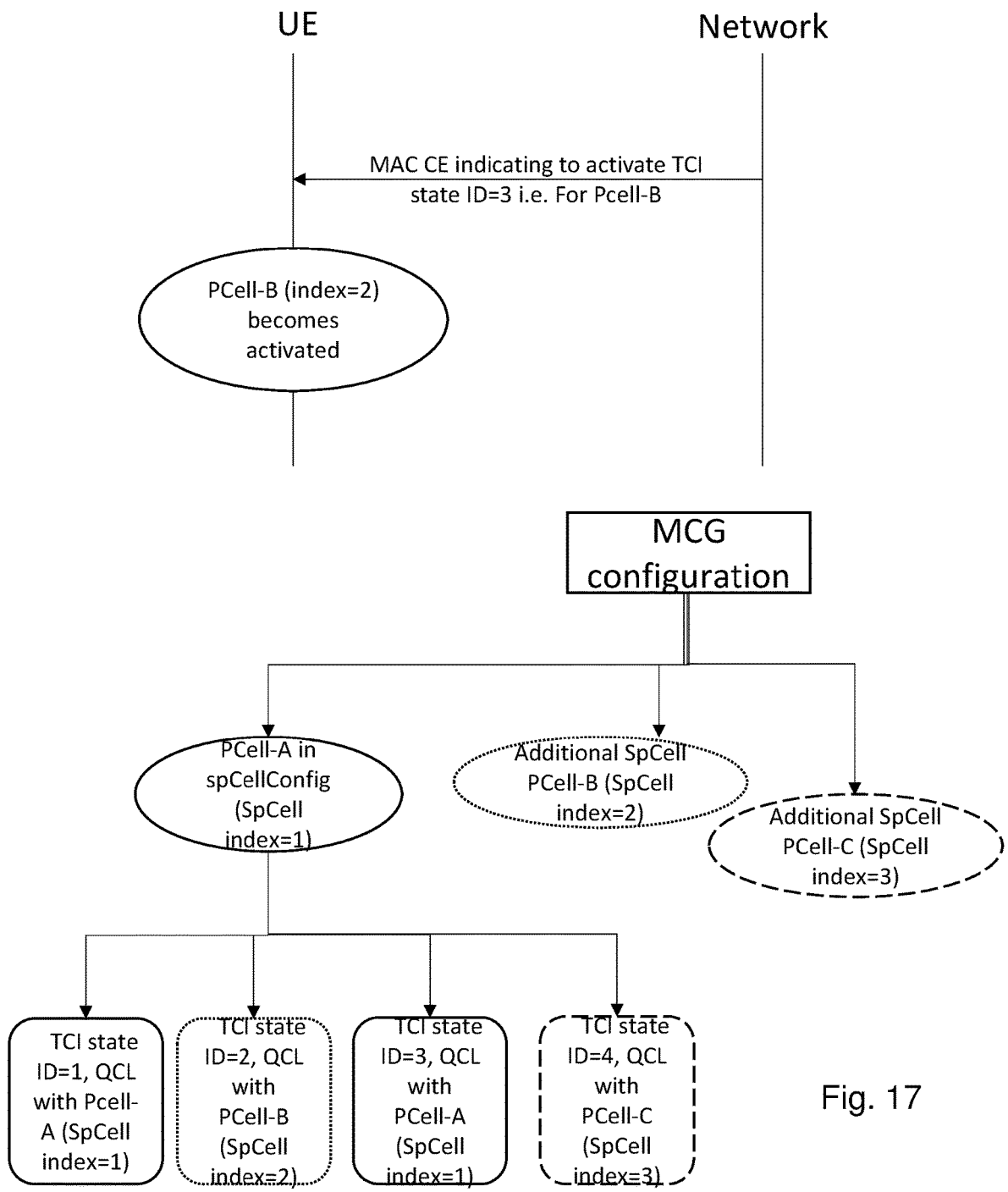
FIG. 17 is a schematic block illustrating embodiments herein.

Activated/active SpCell: Here the notion of active and/or activated PCell, or SpCell in more general terms, is introduced. The notion of an active or activated PCell, or SpCell in more general terms, comprises the fact that the UE is configured with a list of SpCell(s) that may or may not be activated. I.e. activated meaning the fact that the UE has control channels being monitored associated to that SpCell and/or transmits/receives data. The reasoning here is that in the state of the art the UE always has a single PCell with a single UE's current configuration. And, according to the method, the UE has a list of configured SpCell(s). An SpCell is said to be active or activated if at least one of the TCI states associated to that SpCell is activated. Hence, according to the method, a TCI state activation for any physical channel, e.g. via lower layer signaling, may lead to the activation of one of the configured SpCell(s). This concept is illustrated in FIG. 17.

An example of the method comprises the UE setting the SpCell state as "activated" for the cell the UE is connecting to when it initially receives the TCI states configurations with a list of configured PCell(s) e.g. when the UE is transitioning from IDLE to CONNECTED state, that is the cell where the UE receives the first RRCReconfiguration after being transitioned to CONNECTED state;

The example of the method comprises the UE receiving a lower layer signaling command, like a MAC CE that contains an indication that points to one of the configured SpCell(s). That indication may be a serving cell index, e.g. SpCellIndex, that is configured at the UE for each configured SpCell. Hence, upon reception of the MAC CE, the UE knows which SpCell the network wants the UE to consider active and/or activated. The method comprises an implicit deactivation of other SpCell(s) upon the activation of an SpCell. Alternative, that is done explicitly via MAC CEs deactivating other SpCell(s).

An example of the method comprises the UE receiving a lower layer signaling command, like a MAC CE that contains an indication that points to one of the configured TCI states for any physical channel, that may be associated to an activated SpCell or any other configured SpCell. Upon receiving such a lower layer signaling command indicating a configured SpCell that is currently not activated, the UE deactivates the currently activated SpCell, and activates the indicated SpCell in the case of mobility. For the use case of inter-cell multi-TRP the UE may have multiple SpCell candidates activated.

The indication in the lower layer command like the MAC CE applicable to any physical channel may be one of the following (or a combination of these):

TCI state ID;
  In one variant this is one of the unique identifiers that were configured that enable the UE to unambiguously know which TCI state from which SpCell is requested to be activated;
  In another variant this is not a unique identifier and may be used in combination with another identifier to identify which TCI state of which SpCell is to be activated;
SpCell index;
  In one variant this is one of the unique identifiers that were configured that enable the UE to unambiguously know which SpCell is mandated by the network to be activated;
  In another variant this is used in combination with a TCI state ID so that the UE knows which SpCell is to be activated and, within that cell group, which TCI state is to be activated;
Any other identifier or combination of identifiers enabling the UE to activate one of its configured SpCell(s) and a TCI state associated to that SpCell. Both UE and the network needs to have the same understanding of which TCI state is being activate and which PCell is being activated.

Implicit activation and/or deactivation: In some alternatives of the method the activation of a TCI state associated to one of the configure SpCell(s) that is not the current/active SpCell leads the UE to "implicitly" deactivate all TCI states associated to all other SpCell(s), as if the UE would have receive in the same or in other MAC CEs an indicate to deactivate these TCI states associated to the current/active SpCell(s). Handling of SCell(s).

Explicit activation/deactivation: In some other alternatives of the method the activation of a TCI state associated to one of the configure SpCell(s) that is not the current/active SpCell does lead to the UE to "implicitly" deactivate all TCI states associated to all other SpCell(s), but the UE receives in the same or in other MAC CEs an indication to deactivate these TCI states associated to the current/active SpCell(s). In one sub-alternative the UE first receives the MAC CE(s) to deactivate an active SpCell before receiving another one to activate a new SpCell.

In some alternatives for the UE actions, valid for any of these two previous alternatives, explicit or implicit, the activation of a TCI state of one of the configured SpCell(s) that is not the current and/or active SpCell leads the UE to perform actions similar to a reconfiguration with sync where the SpCell associated to the TCI state being activated is the target cell in a reconfiguration with sync.

In one sub-alternative the UE applies a new configuration for the new SpCell, or considers that new configuration activated, and performs random access according to a configuration that was provided. E.g. a contention-free or contention based random access.

In another sub-alternative the UE applies a new configuration for the new SpCell, or considers that new configuration activated, and does not perform random access. That may be indicated in the SpCell configuration, e.g. with a rach-less flag or a synchronized flag.

Yet some other alternative embodiments for the MAC CE design for lower layer inter-cell mobility is to rely on a two-step approach where upon the reception of a first MACE CE, with an SpCell indication, the UE activates the indicated SpCell and associated configurations, e.g. a list of associated TCI states, and a second MAC CE indicates which TCI states associated to the SpCell activated in the first MAC CE are to be activated and/or deactivated.

In some other embodiment variants of the one step approach, when the UE receives a MAC CE only with the SpCell indication to be activated, the UE activates a default TCI state configuration for that newly activated SpCell. That default may be something defined and hard coded or configured as part of the SpCell configuration for the additional SpCell and the first SpCell.

Figure 6:
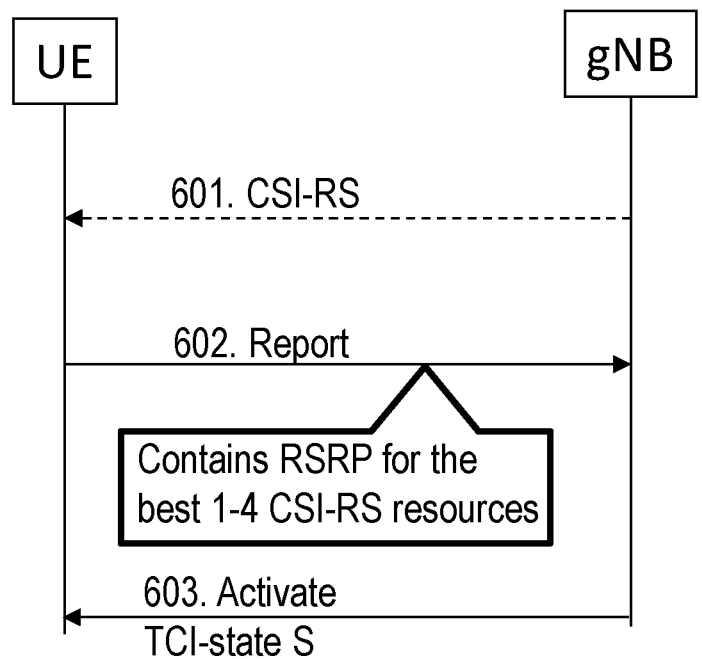
FIG. 6 is a sequence diagram illustrating prior art.
Figure 7:
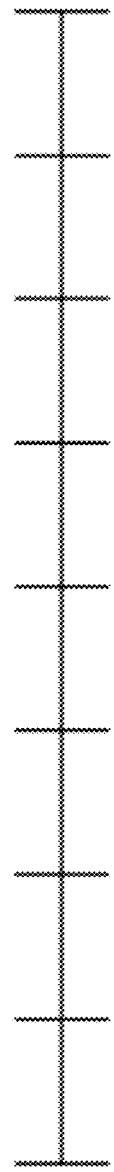
FIG. 7 is a schematic block illustrating prior art.
Figure 8:
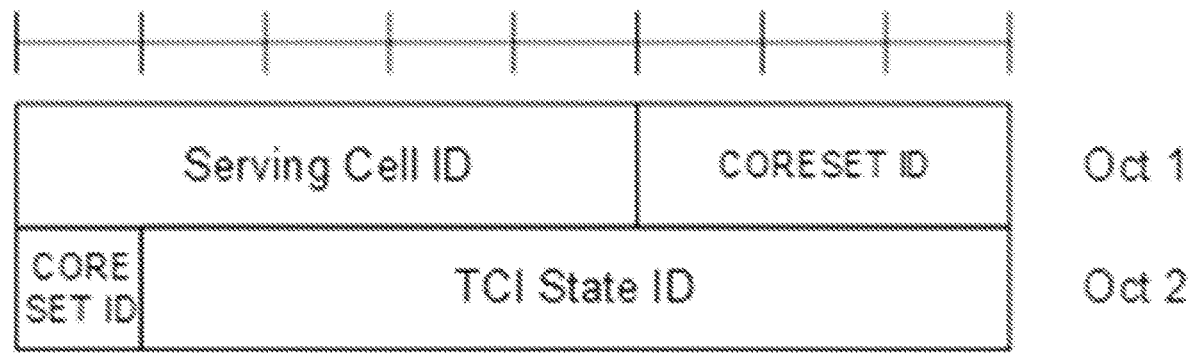
FIG. 8 is a schematic block illustrating prior art.
Figure 9:
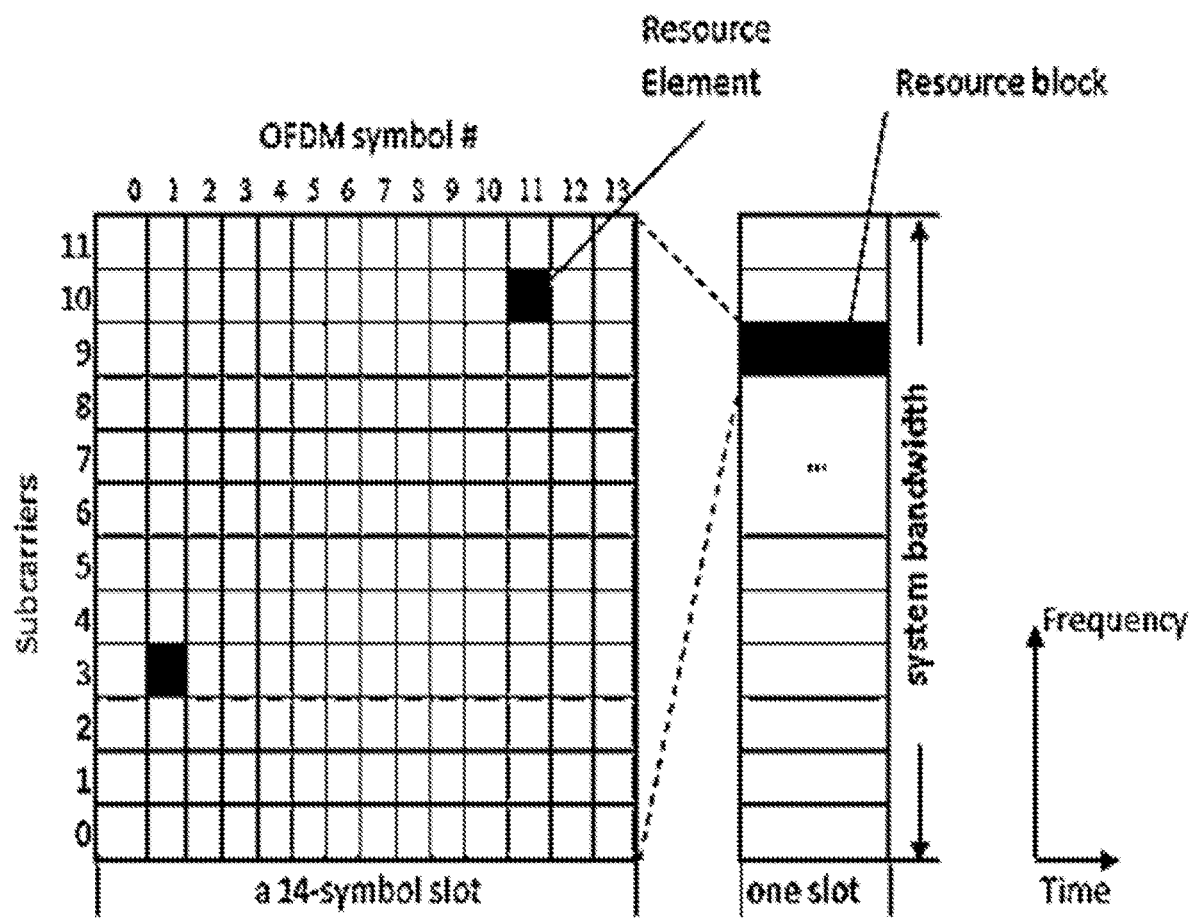
FIG. 9 is a schematic block illustrating prior art.
Figure 11:
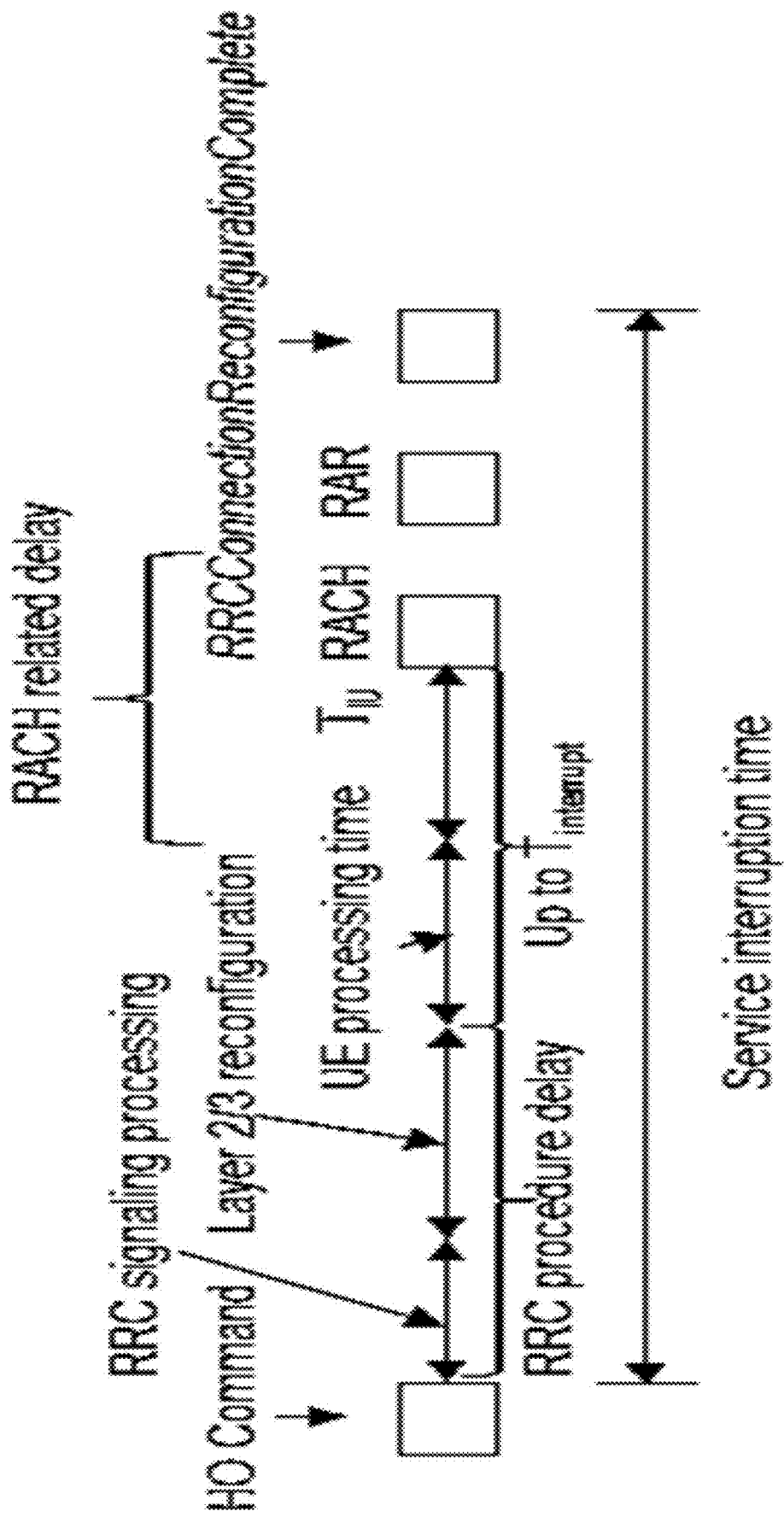
FIG. 11 is a schematic block illustrating prior art.
Figure 12:
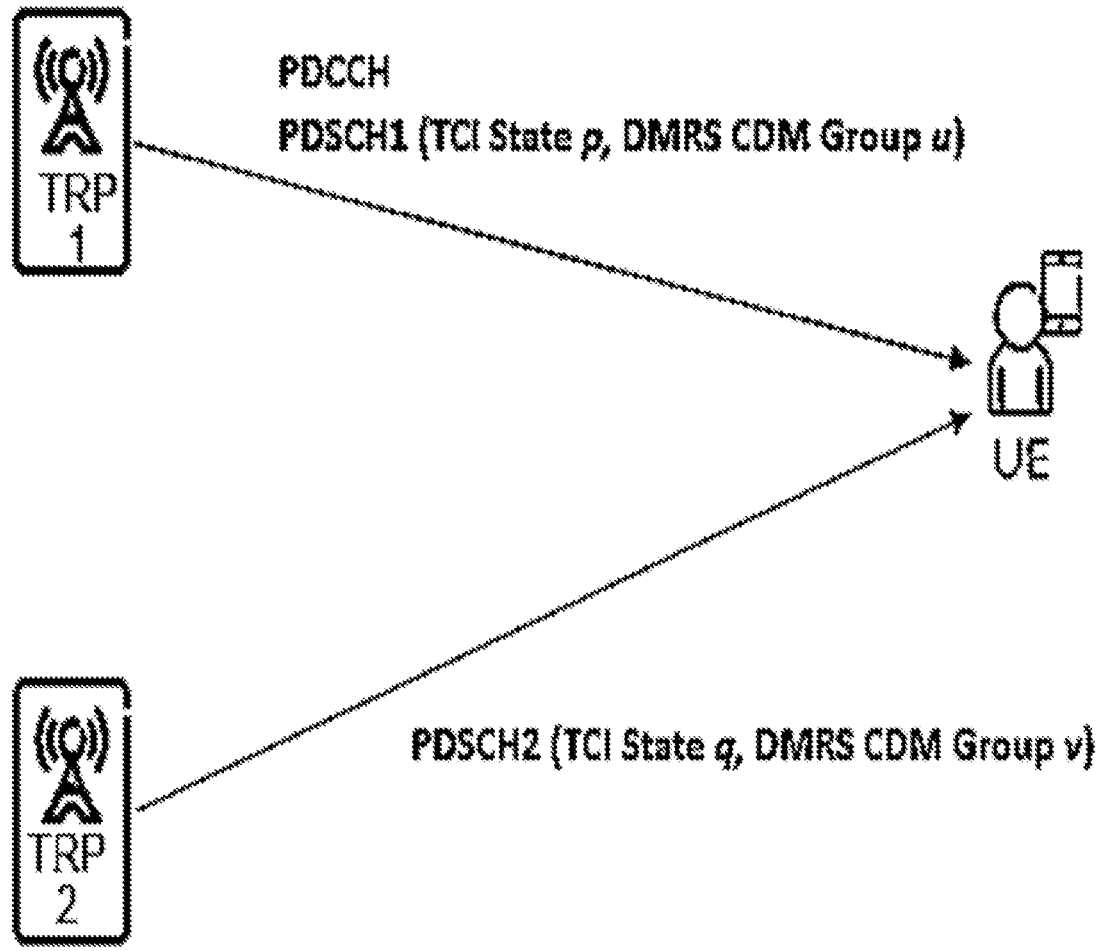
FIG. 12 is a schematic block illustrating prior art.
Figure 18:
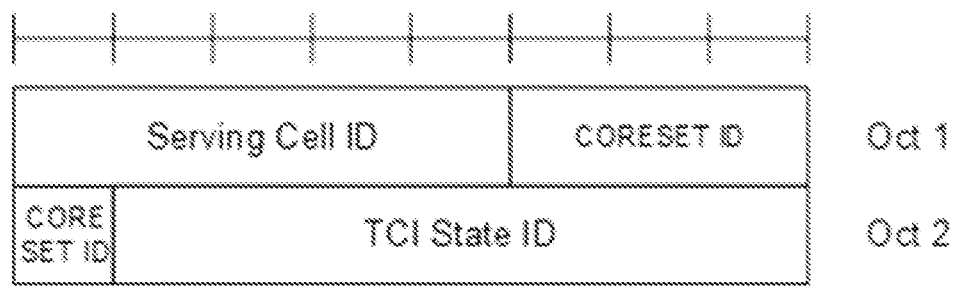
FIG. 18 is a schematic block illustrating embodiments herein.

Below an example based on the combination of the Serving Cell ID and TCI State ID is shown as a way to enable the UE to identify which SpCell to be activated. The TCI state associated to that SpCell is to be activated for a TCI state activation associated to a PDCCH and/or CORESET associated to a given MCG, i.e. to a configured SpCell, as it may be standardized in 3GPP TS 38.321:

FIG. 18 shows 3GPP FIG. 6.1.3.X-1: TCI State Indication for UE-specific PDCCH MAC CE for L1-based mobility.

Serving Cell ID: This field indicates the SpCell index of the SpCell for which the MAC CE applies. That is the spCellIndex in the QCL configuration and the SpCell configuration, as defined in Ts 38.331.

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field and to the PCell indicated in Serving Cell ID. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

In the example above, as that MAC CE has a different meaning compared to the one defined in 3GPP Release15 for the activation of TCI states associated to a single SpCell, the method comprises the definition of a new logical channel ID that maps to this type of MAC CE for L1-based mobility so that the UE knows that upon receiving that it is about activation/deactivation of one of its configured SpCells.

In a variant embodiment of that alternative, the serving cell ID may be associated to any serving cell that is configured i.e. any PCell and any SCell of any MCG. In that case, the Serving Cell IDs are shared in a common pool. If the cell index the UE receives is associated to an SCell of an active PCell, the UE knows that it does not need to change the PCell state. If the cell index the UE receives is associated to an SCell of a deactivated PCell, the UE changes the state of the PCell associated to the indicated Scell to activated. If the cell index the UE receives is associated to a PCell that is deactivated, the UE changes the state of the PCell associated to the indicated Scell to activated.

In another variant embodiment of that alternative, to comprise MRDC use cases, the serving cell ID remains with the same meaning as the one defined in Rel-15, to indicate whether that is related to a Pcell or PScell, while a new identifier is defined for the SpCell index.

In the above description, the UE may activate the SpCell associated with the activated TCI state. The TCI state activation is performed for at least one physical channel. Thus, the SpCell is implicitly activated from the interpretation of the associated TCI state activation. In another embodiment, the SpCell is explicitly activated using dedicated lower signaling, i.e., lower signaling that does not affect the TCI state for any physical channel.

As described up to here in the method, there may be different alternative on how to configure TCI states per BWP for a given SpCell, and how to activate/deactivate them. That also reflects different manners on how the MAC CEs are designed or modified to comprise the action of changing an SpCell, i.e. perform a reconfiguration with sync using MAC CE.

In some alternative embodiments, the MAC CE that indicates to the UE that reconfiguration with sync shall be performed contains an identifier, e.g. Serving Cell index or cell identity, that indicates an SpCell, i.e. an SpCell, like a PCell or PSCell that may not be the one the UE is currently connected, to the UE, or a TCI state associated to an SpCell.

One possible sub-embodiment is an autonomous action where upon receiving a Serving Cell ID, or equivalent, that refers to an SpCell in the configured list. The UE deactivates all TCI states from the previously connected SpCell. One challenge is how to make the multi-TRP case with same MAC CE, so perhaps a different MAC CE is needed for multi-TRP to not have these autonomous UE deactivation of other TCI states;

Another possible sub-embodiment is to rely on explicit signaling i.e. network gives UE a MAC CE to deactivate all TCI states for current SpCell and, at same TTI another MAC CE to activate TCI states in another SpCell. In this embodiment, one could possibly reuse the MAC CE structure for multi-TRP and for L1-based mobility.

Another sub-alternative embodiment is to ignore the Serving cell ID and only rely on the TCI state IDs. In that case, in addition to being able to configure TCI states for an SpCell and SCells, one may include other remaining TCI states, e.g. 65, 66, 67, and associate them to SpCell candidates. Then, when at least one TCI state, NOT associated to any other serving cell, is linked to a given SpCell there is a L1-based mobility. Notice that this could possibly be used for the multi-TRP case. Of course this embodiment may somehow limit the amount of TCI states and SpCell candidates that may be configured.

As described in the configurations aspects for additional SpCell(s), these may be additional PSCell(s) i.e. it should be possible to perform lower layer mobility via MAC CEs for PSCell changes. In that case, the configuration of additional SpCell(s) may be prepared by a secondary Node, which may be from the same RAT or from a different RAT. And, in that case, the MAC CE(s) or other lower layer signaling activating/deactivating TCI states associated to the PSCell may come from the PSCell.

UE Actions Upon SpCell State Change (L1-Based Mobility)

According to embodiments of the method, the UE receives a MAC CE and changes the state of one of its configured PCell(s) from deactivated to activated, SpCell in more general terms. This part describes UE actions upon reception of a MAC CE indicating the change of a TCI state associated to a deactivated PCell.

In L1-based mobility, according to an example of the method, the UE may maintain one active PCell at time. Hence, if the UE receives a MAC CE activating a TCI state associated to a PCell that is deactivated, let's call it a target PCell, the UE considers the current PCell as deactivated and considers the target PCell as activated.

Deactivating a source PCell and activating a new target PCell (where both are configured PCell(s) at the UE) comprises the UE applying parts of the configuration of the target PCell to its current configuration. According to the method, the UE-specific configurations remain the same upon the reception of that MAC CE, i.e., the configuration to be applied is the cell-specific configuration for the target SpCell, that overrides the current cell-specific configuration of the source SpCell. Taking signaling example shown above, for an additional SpCell configuration, the UE would then apply the spCellConfigCommon of IE ServingCellConfigCommon to its current configuration. At the same time, UE keeps its UE-specific configuration as before i.e. the list of TCI states configurations remain the same and network may still use MAC CEs in the target cell to activate and/or deactivate TCI states associated to any of the configured SpCells, either the one in spCellConfig or the additional ones, in the spCellConfigList.

Upon changing the first time via MAC CE from the current SpCell to one of the additional SpCells, the method comprises the UE keeping stored storing the common and/or cell-specific configuration of the first SpCell, even though that has not been provided in dedicated signaling in spCellConfig of IE SpCellConfig. The reasoning is that if the network transmits another MAC CE indicating the activation of a TCI state associated to the first cell, the UE needs to apply that cell-specific configuration to its current configuration.

There may be different assumptions regarding the synchronization between the UE and the candidate SpCells. If the UE is synchronized with a configured SpCell when it receives a MAC CE indicating the activation of a TCI state associated to that SpCell, there is no need to synchronize again. That may be the case when the UE has also been configured to perform measurements associated to that SpCell. Else, if the UE is NOT synchronized with a configured SpCell when it receives a MAC CE indicating the activation of a TCI state associated to that SpCell, the UE start synchronising to the DL of the target SpCell.

In the following, the document describes an example of how the method may be implemented in the 5G NR specifications for the MAC protocol and the RRC protocol. For the MAC protocol, the RED/highlighted parts are new parts compared to existing MAC CE for TCI state activation/deactivation. However, that should not be interpreted necessarily as CRs to the specifications since one may need completely new MAC CEs for the purpose of L1-based mobility.

Indication of TCI State for UE-Specific PDCCH

The network may indicate a TCI state for PDCCH reception for a CORESET of a Serving Cell by sending the TCI State Indication for UE-specific PDCCH MAC CE described in clause 6.1.3.15. That Serving Cell may be any configured SpCell, of any SCell associated the cell group.
The MAC Entity Shall:
1> if the MAC entity receives a TCI State Indication for UE-specific PDCCH MAC CE on a Serving Cell:
2> if the Serving Cell is an activated SpCell or an SCell associated to the cell group:
3> indicate to lower layers the information regarding the TCI State Indication for UE-specific PDCCH MAC CE.
2> else, if the Serving Cell is a deactivated SpCell:
3> consider that Serving Cell to be activated;
3> consider that Serving Cell to be the target SpCell and consider that to be the cell on the SSB frequency indicated by the frequencyInfoDL with a physical cell identity indicated by the physCellId.
3> start synchronising to the DL of the target SpCell, if not synchronised;
3> apply the spCellConfigCommon associated to the activated Serving Cell;
3> consider the lower layers in accordance with any fields, not covered in the previous, if included in the AdditionalSpCellConfig or SpCellConfig associated to that Serving Cell to be activated;
3> indicate to lower layers the information regarding the TCI State Indication for UE-specific PDCCH MAC CE.

Activation/Deactivation of UE-Specific PDSCH TCI State

The network may activate and deactivate the configured TCI states for PDSCH of a Serving Cell by sending the TCI States Activation/Deactivation for UE-specific PDSCH MAC CE described in clause 6.1.3.14. The configured TCI states for PDSCH are initially deactivated upon configuration and after a handover. That Serving Cell may be an activated PCell or an SCell associated to that activated PCell (i.e. part of the same cell group).
The MAC Entity Shall:
1> if the MAC entity receives an TCI States Activation/Deactivation for UE-specific PDSCH MAC CE on a Serving Cell:
2> if the Serving Cell is an activated SpCell or an SCell associated to the cell group: 3> indicate to lower layers the information regarding the TCI States Activation/Deactivation for UE-Specific PDSCH MAC CE.
2> else, if the Serving Cell is a deactivated SpCell:
3> consider that Serving Cell to be activated;
3> consider that Serving Cell to be the target SpCell and consider that to be the cell on the SSB frequency indicated by the frequencyInfoDL with a physical cell identity indicated by the physCellId.
3> start synchronising to the DL of the target SpCell, if not synchronised;
3> configure lower layers in accordance with the spCellConfigCommon associated to the activated Serving Cell;
3> consider the lower layers in accordance with any fields, not covered in the previous, if included in the AdditionalSpCellConfig or SpCellConfig associated to that Serving Cell to be activated;
3> indicate to lower layers the information regarding the TCI State Indication for UE-specific PDCCH MAC CE.

In some other alternative embodiments for the signaling, the additional SpCell configurations contain equivalent to a reconfiguration with Sync, in addition to an SpCell index. That would mean that UE remains with the same UE-specific configuration upon the reception of the MAC CE with the new SpCell indication when changing from one cell to another within that set but may change any of the parameters with MAC CEs that are within a ReconfigurationWithSync.

There may be different assumption regarding the UL sync with the target SpCells. If the UE is UL synchronized and if the target SpCell knows which DL beam in covering the UE, i.e. which DL beam to transmit PDCC and/or PDSCH, the UE performs a TCI state activation without any need for UL sync procedure. Else, if the UE is not UL synchronized and/or if the target SpCell does not know which DL beam in covering the UE, i.e. which DL beam to transmit PDCC/PDSCH, the UE first triggers a random-access procedure with the target cell e.g. by transmitting a preamble, possibly a dedicate preamble configured in the additional SpCell configuration, receiving a RAR and transmitting a MAC MSG.3 with its current Cell Radio Network Temporary Identifier (C-RNTI), which may either be a new one in the Additional SpCell configuration, or the same one used in the source SpCell.

As in the case of an RRC based handover, there may also be a protection time, especially interesting in the case the UE performs a synchronization procedure, like random access.

As in the case of an RRC based handover, the Additional SpCell configuration may also contain an SMTC configuration so the UE is able to perform measurements and find the target SpCell.

Variant where Dedicated Configuration May Also be Updated

Above, it has been assumed that mostly cell-specific parameters are updated when the network activates via MAC CE a TCI state associated to an SpCell that is deactivated at the UE and for which the UE has an additional SpCell configuration.

In this variant of the methods described above, it is comprised the possibility to update UE-specific parameters upon the activation of an SpCell via MAC CE. To enable that, one first modification to 5.1 is to consider that each AdditionalSpCellConfig contains a dedicated configuration, in addition to the cell index as described in above, like different TCI states configurations. An example of an ASN.1 encoding is the following:

```
AdditionalSpCellConfig :: =     SEQUENCE {
  spCellIndex                     ServCellIndex,
  spCellConfigCommon                ServingCellConfigCommon,
  spCellConfigDedicated             ServingCellConfig
  ...
}
```

Figure 19:
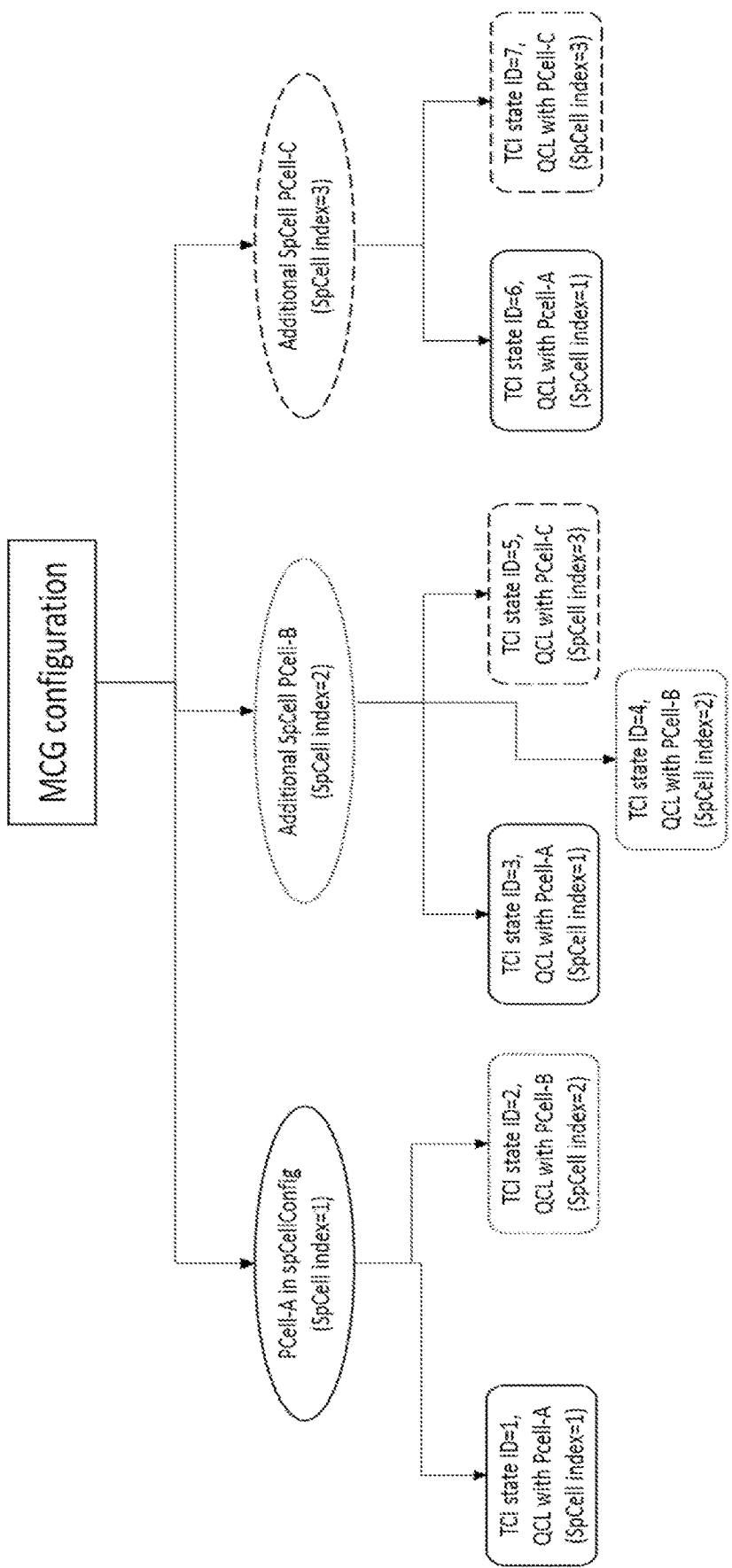
FIG. 19 is a schematic block illustrating embodiments herein.

The overall concept for this variant configuration may be illustrated in the following example, as shown in FIG. 19.

In this example, the UE starts in IDLE state camping on a cell-A (i.e. it has acquired common/cell-specific parameters for cell-A) and transitions to CONNECTED. Then, it receives an MCG configuration, e.g. masterCellGroupConfig within an RRCReconfiguration message, containing the cell-A spCellConfig of IE SpCellConfig for the current PCell, and the configuration for the additional SpCells. Each of these configurations include an SpCell index, in this example, SpCell-A has index=1, SpCell-B has index=2 and SpCell-C has index=3. And, differently from what was shown in 5.1, each SpCell configuration has its own list of TCI states, where each TCI state may be associated to any of the configured SpCells. In the example above, the UE is configured overall with 7 TCI states:

Dedicated configuration for SpCell-A
 TCI-state ID=1 is associated to Pcell-A, hence it has an SpCell index=1;
 TCI-state ID=2 is associated to Pcell-B, hence it has an SpCell index=2;
Dedicated configuration for SpCell-B
 TCI-state ID=3 is associated to Pcell-A, hence it has an SpCell index=1;
 TCI-state ID=4 is associated to Pcell-B, hence it has an SpCell index=2;
 TCI-state ID=5 is associated to Pcell-C, hence it has an SpCell index=3;
Dedicated configuration for SpCell-C
 TCI-state ID=6 is associated to Pcell-A, hence it has an SpCell index=1;
 TCI-state ID=7 is associated to Pcell-C, hence it has an SpCell index=3;

Notice that according to this variant the UE receives a list of TCI states per SpCell configuration. Hence, a change in SpCell, e.g. activation of a TCI state of a different PCell than the current one, implies that the UE starts to consider the new TCI state configuration as its current configuration. For example, if the UE is in PCell-A and receives the configuration of this example. Then, the UE receives a MAC CE activating one of the TCI states of the SpCell-A e.g. TCI-state ID=2, for cell B. The UE then considers cell B as active and apply the dedicated configuration associated to cell B, which comprises a new list of TCI states i.e. TCI-state ID=3 is associated to Pcell-A, hence it has an SpCell index=1; TCI-state ID=4 is associated to Pcell-B, hence it has an SpCell index=2; TCI-state ID=5 is associated to Pcell-C, hence it has an SpCell index=3.

As in the case of an RRC based handover, the Additional SpCell configuration may also contain an SMTC configuration so the UE is able to perform measurements and find the target SpCell.

Reply to MAC CE

When UE receives the MAC CE for switching SpCell (i.e. activate an SpCell that is deactivated) the UE transmits an "acknowledgement indication".

In some variant embodiments, that acknowledgement indication is a random-access preamble that is transmitted to the target cell, i.e. to the newly activated SpCell, upon reception of the MAC CE as described in the method. That enables the target cell to identify an incoming UE via MAC CE, or in more general terms any lower layer signaling, inter-cell mobility. This may be applicable in the case of contention-free random-access resources, e.g. UE-specific preamble, possibly assigned per RS type and resource, like per SSB or SSB group, are allocated for that purpose.

In some other variant embodiments, that acknowledgement indication is a MAC CE transmitted in the uplink to the target cell that contains a UE identifier enabling the target to identify an incoming UE via MAC CE, or in more general terms any lower layer signaling, inter-cell mobility. The UE identifier may be the UE's C-RNTI allocated in source, or a new C-RNTI associated to the newly activated SpCell where that new C-RNTI has been provided in the reconfiguration with sync configuration for that new target SpCell being activated with the MAC CE in the DL from the source. The solution also comprises the definition of a new C-RNTI for that purpose of inter-cell lower layer mobility.

That procedure of sending the "acknowledgement indication" to the target SpCell upon reception of the MAC CE for lower layer inter-cell mobility may be part of a random-access procedure. For example, the UE may send a preamble, receive a random-access response and send that indication in the message 3, i.e., a MAC CE like message including the UE identity, e.g. C-RNTI. The procedure may not involve random access, e.g. depending on a configuration for a configured SpCell indicating that random access is not needed, so that upon receiving the MAC CE from source the UE assumes to be synchronized with the target SpCell and sends the "acknowledgement indication" e.g. MAC CE in the uplink including the UE identity.

Embodiments of the method comprises the transmission of that "acknowledgement indication", e.g. a MAC in the uplink with the UE's configuration, using the UE-specific configurations and cell-specific configurations associated to the new SpCell that the UE is accessing i.e. the SpCell indicated in the downlink MAC CE received from the source SpCell.

Figure 20:
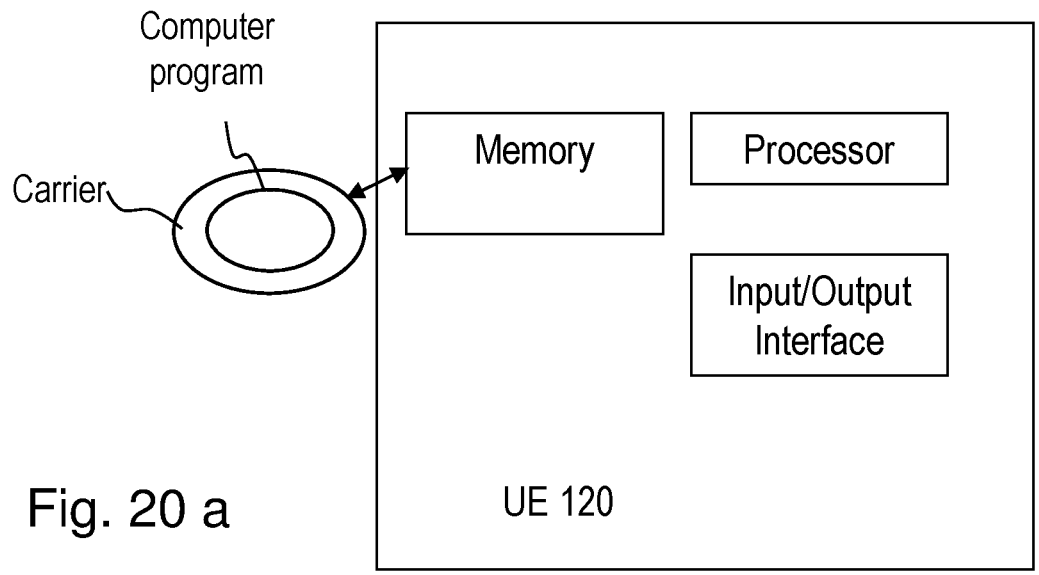
FIGS. 20a and b are schematic block diagrams illustrating embodiments of a UE.
Figure 20:
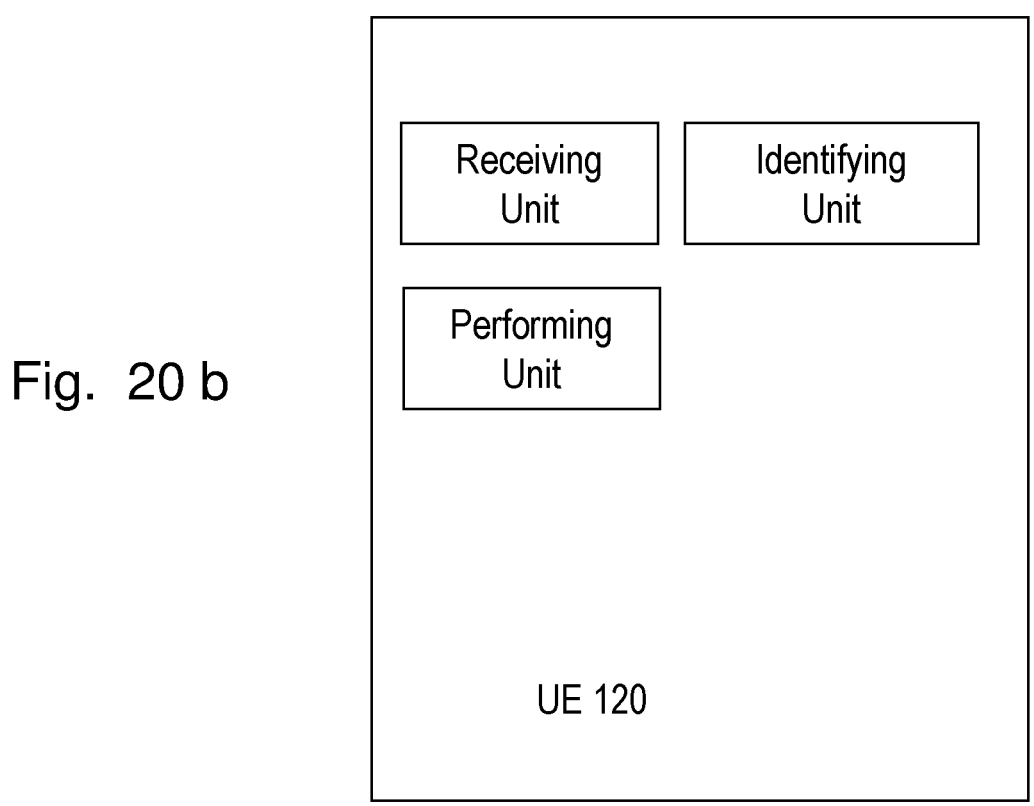

FIGS. 20a and 20b shows an example of arrangements in the UE 120.

The UE 120 may comprise an input and output interface configured to communicate with each other. The input and output interface may comprise a wireless receiver (not shown) and a wireless transmitter (not shown).

The UE 120 may comprise a receiving unit, an identifying unit, and a performing unit to perform the method actions as described herein.

The embodiments herein may be implemented through a respective processor or one or more processors, such as the processor of a processing circuitry in the UE 120 depicted in FIG. 20a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise respective a memory comprising one or more memory units. The memory comprises instructions executable by the processor in the UE 120.

The memory is arranged to be used to store instructions, data, configurations, and applications to perform the methods herein when being executed in the UE 120.

In some embodiments, a computer program comprises instructions, which when executed by the at least one processor, cause the at least one processor of the UE 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the UE 120, described below may refer to a combination of analog and digital circuits, and/or one or more processors configured with software and/or firmware, e.g. stored in the UE 120, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 21:
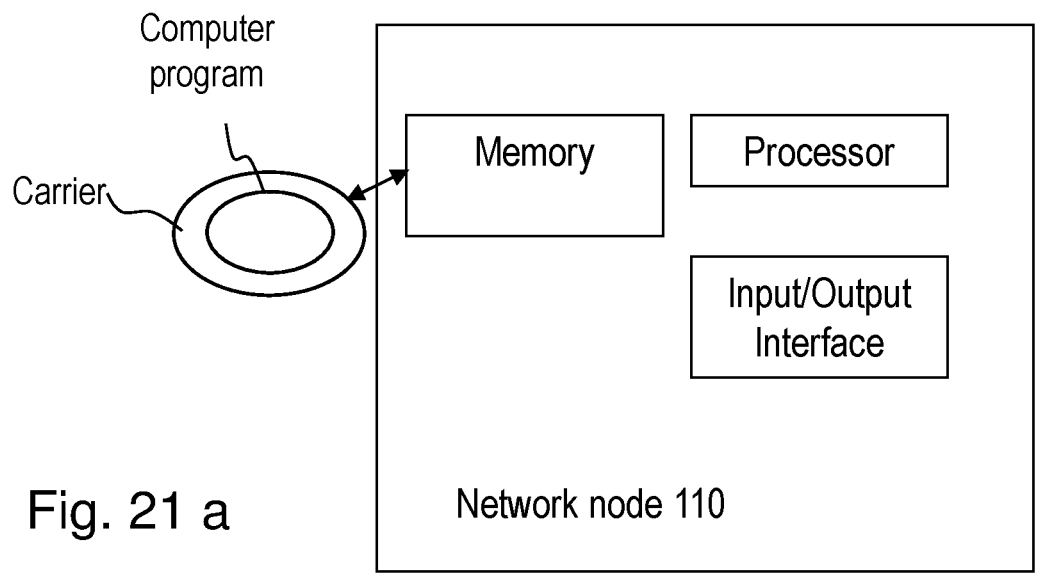
FIGS. 21a and b are schematic block diagrams illustrating an embodiment of a network node.
Figure 21:
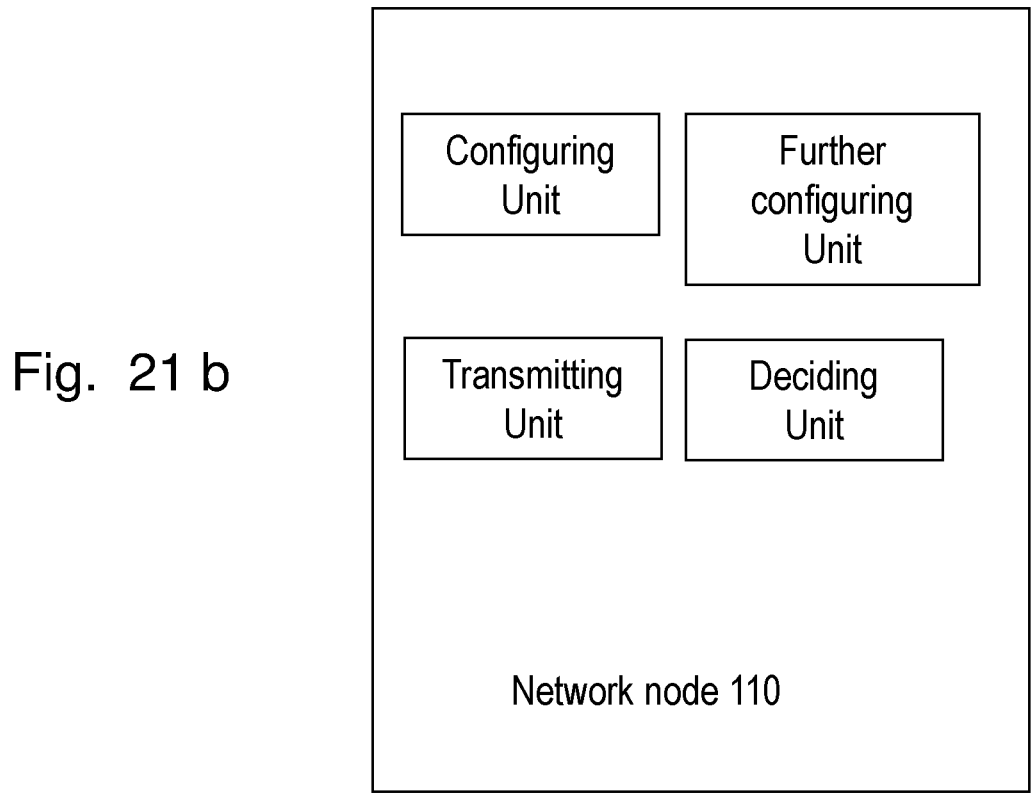

FIGS. 21*a* and 21*b* shows an example of arrangements in the network node 110.

The network node 110 may comprise an input and output interface configured to communicate with each other. The input and output interface may comprise a wireless receiver (not shown) and a wireless transmitter (not shown).

The network node 110 may comprise a configuring unit, a further configuring unit, a transmitting unit and a deciding unit to perform the method actions as described herein.

The embodiments herein may be implemented through a respective processor or one or more processors, such as the processor of a processing circuitry in the network node 110 depicted in FIG. 21*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise respective a memory comprising one or more memory units. The memory comprises instructions executable by the processor in the network node 110. The memory is arranged to be used to store instructions, data, configurations, and applications to perform the methods herein when being executed in the network node 110.

In some embodiments, a computer program comprises instructions, which when executed by the at least one processor, cause the at least one processor of the network node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the network node 110, described below may refer to a combination of analog and digital circuits, and/or one or more processors configured with software and/or firmware, e.g. stored in the network node 110, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-40 are shortly described. See e.g. FIGS. 13, 14, 15, 20*a*, 20*b*, 21*a* and 21*b*.

Embodiment 1. A method performed by a User Equipment, UE, 120, the method comprising any one or more out of:
receiving 1401 from a network node 110 a higher layer configuration comprising a set of SpCell configurations, to be configured in the UE 120,
while being in connected state, receiving 1403 a lower layer signaling from a network node 110, which lower layer signaling comprises an indication, which indication indicates one or more SpCells comprised in the set of SpCell configurations, to be any one or more out of: activated or deactivated.

Embodiment 2. The method according to embodiment 1, further comprising:
based on the set of SpCell configurations, performing 1405 the indicated activation, or deactivation of the indicated one or more SpCells.

Embodiment 3. The method according to any of the embodiments 1-2, further comprising:
receiving 1402 from a network node 110 a higher layer configuration comprising one or more Transmission Configuration Indication, TCI, state configurations to be configured in the UE 120, which TCI state configurations are associated to the configured SpCells comprised the set of SpCells.

Embodiment 4. The method according to any of the embodiment 3, further comprising:
based on the set of TCI, state configurations, performing 1405 the indicated activation, or deactivation of the indicated one or more SpCells.

Embodiment 5. The method according to any of the embodiments 3-4, further comprising:
based on the set of SpCell configurations and TCI state configurations, identifying 1404 the TCI state associated with the indicated one or more SpCells and based on the identified TCI state, performing 1405 the indicated activation, or deactivation of the indicated one or more SpCells.

Embodiment 6. The method according to any of the embodiments 1-5, wherein higher layer relates to a layer being higher than a Medium Access Control MAC protocol in the NR Radio protocol stack, and wherein lower layer relates to a layer being equal to or lower than the MAC protocol in the NR Radio protocol stack.

Embodiment 7. The method according to any of the embodiments 1-6, wherein each SpCell configuration out of the set of SpCell configurations is related to any one out of: a Primary Cell, PCell, or a Primary Secondary Cell, PSCell.

Embodiment 8. The method according to any of the embodiments 1-7, wherein a higher layer configuration is received by RRC signalling.

Embodiment 9. The method according to any of the embodiments 1-8, wherein the lower layer signaling is received by a Medium Access Control, MAC, Control Element, CE.

Embodiment 10. The method according to any of the embodiments 1-9, wherein the method is e.g. for any one out of: switching from one or more SpCells to other one or more SpCells e.g. in mobility, adding an SpCell and/or removing an SpCell.

Embodiment 11. A computer program comprising instructions, which when executed by a processor, causes the processor to perform actions according to any of the embodiments 1-10.

Embodiment 12. A carrier comprising the computer program of embodiment 11, wherein the carrier is one of an electronic signal, an optical signal, an electromagnetic signal, a magnetic signal, an electric signal, a radio signal, a microwave signal, or a computer-readable storage medium.

Embodiment 13. A method performed by a network node 110, the method comprising: any one or more out of:
configuring 1501 a User Equipment, UE, 120, by sending to the UE 120, a higher layer configuration comprising a set of SpCell configurations, to be configured in the UE 120,
while the UE 120 is in connected state, transmitting 1503 a lower layer signaling to the UE 120, which lower layer signaling comprises an indication, which indication indicates one or more SpCells comprised in the set of SpCell configurations, to be any one or more out of: activated or deactivated.

Embodiment 14. The method according to embodiment 13, further comprising:
further configuring 1502 the UE 120, by sending to the UE 120, a higher layer configuration comprising one or more Transmission Configuration Indication, TCI, state configurations to be configured in the UE 120, which TCI state configurations are associated to the configured SpCells comprised the set of SpCells.

Embodiment 15. The method according to any of the embodiments 13-14, further comprising:
when exceeding a predefined time period after the lower layer signaling comprising an indication to activate an SpCell, was transmitted to the UE 120, deciding 1504 that the UE 120 has applied a stored SpCell configuration that is indexed by an index received in the lower layer signaling.

Embodiment 16. The method according to any of the embodiments 13-15, wherein higher layer relates to a layer being higher than a Medium Access Control MAC protocol in the NR Radio protocol stack, and wherein lower layer relates to a layer being equal to or lower than the MAC protocol in the NR Radio protocol stack.

Embodiment 17. The method according to any of the embodiments 13-16, wherein each SpCell configuration out of the set of SpCell configurations is related to any one out of: a Primary Cell, PCell, or a Primary Secondary Cell, PSCell.

Embodiment 18. The method according to any of the embodiments 13-17, wherein a higher layer configuration is transmitted by RRC signalling.

Embodiment 19. The method according to any of the embodiments 13-18, wherein the lower layer signaling is sent by a Medium Access Control, MAC, Control Element, CE.

Embodiment 20. The method according to any of the embodiments 13-19, wherein the method is for assisting the UE 120 e.g. in any one out of: switching from one or more SpCells to other one or more SpCells e.g. in mobility, adding an SpCell and/or removing an SpCell.

Embodiment 21. A computer program comprising instructions, which when executed by a processor, causes the processor to perform actions according to any of the embodiments 13-20.

Embodiment 22. A carrier comprising the computer program of embodiment 21, wherein the carrier is one of an electronic signal, an optical signal, an electromagnetic signal, a magnetic signal, an electric signal, a radio signal, a microwave signal, or a computer-readable storage medium.

Embodiment 23. A User Equipment, UE, 120, being configured to one or more out of:
receive from a network node 110, a higher layer configuration comprising a set of SpCell configurations, to be configured in the UE 120, e.g. by means of a receiving unit in the UE 120,
while being in connected state, receive a lower layer signaling from a network node 110, e.g. by means of the receiving unit in the UE 120 which lower layer signaling is adapted to comprise an indication, which indication is adapted to indicate an SpCell comprised in the set of SpCell configurations, to be any one or more out of: activated, or deactivated.

Embodiment 24. The UE 120 according to embodiment 23, further being configured to:
based on the set of SpCell configurations, perform the indicated activation, or deactivation of the indicated one or more SpCells, e.g. by means of a performing unit in the UE 120.

Embodiment 25. The UE 120 according to any of the embodiments 23-24, further being configured to:
receive from a network node 110 a higher layer configuration comprising one or more Transmission Configuration Indication, TCI, state configurations to be configured in the UE 120, e.g. by means of the receiving unit in the UE 120 which TCI state configurations are adapted to be associated to the configured SpCells comprised the set of SpCells.

Embodiment 26. The UE 120 according to embodiment 25, further being configured to:
based on the set of TCI, state configurations, perform the indicated activation, or deactivation of the indicated one or more SpCells, e.g. by means of the performing unit in the UE 120.

Embodiment 27. The UE 120 according to any of the embodiments 25-26, further being configured to:
based on the set of SpCell configurations and TCI state configurations, identify the TCI state associated with the indicated SpCell, e.g. by means of an identifying unit in the UE 120, and based on the identified TCI state, perform the indicated activation, or deactivation of the indicated one or more SpCells, e.g. by means of the performing unit in the UE 120.

Embodiment 28. The UE 120 according to any of the embodiments 23-27, wherein higher layer is adapted to relate to a layer being higher than a Medium Access Control MAC protocol in the NR Radio protocol stack, and wherein lower layer is adapted to relate to a layer being equal to or lower than the MAC protocol in the NR Radio protocol stack.

Embodiment 29. The UE 120 according to any of the embodiments 23-28, wherein each SpCell configuration out of the set of SpCell configurations is adapted to relate to any one out of: a Primary Cell, PCell, or a Primary Secondary Cell, PSCell.

Embodiment 30. The UE 120 according to any of the embodiments 23-29, wherein a higher layer configuration is adapted to be received by RRC signalling.

Embodiment 31. The UE 120 according to any of the embodiments 23-30, wherein the lower layer signaling is adapted to be received by a Medium Access Control, MAC, Control Element, CE.

Embodiment 32. The UE 120 according to any of the embodiments 23-31, wherein the UE 120 is e.g. for any one out of: switching from one or more SpCells to other one or more SpCells e.g. in mobility, adding an SpCell and/or removing an SpCell.

Embodiment 33. A network node 110 being configured to any one or more out of:
configure a User Equipment, UE, 120, by sending to the UE 120, a higher layer configuration comprising a set of SpCell configurations to be configured in the UE 120, e.g. by means of a configuring unit in the network node 110,
while the UE 120 is in connected state, transmit a lower layer signaling to the UE 120, e.g. by means of a transmitting unit in the network node 110, which lower layer signaling is adapted to comprise an indication, which indication indicates one or more SpCells comprised in the set of SpCell configurations, to be any one or more out of: activated or deactivated.

Embodiment 34. The network node 110 according to embodiment 33, further being configured to:
further configure the UE 120, by sending to the UE 120, a higher layer configuration comprising one or more Transmission Configuration Indication, TCI, state configurations to be configured in the UE 120, which TCI state configurations are adapted to be associated to the configured SpCells comprised the set of SpCells.

Embodiment 35. The network node 110 according to any of the embodiments 33-34, further being configured to:
when exceeding a predefined time period after the lower layer signaling comprising an indication to activate an SpCell, was transmitted to the UE 120, decide that the UE 120 has applied a stored SpCell configuration that is indexed by an index received in the lower layer signaling.

Embodiment 36. The network node 110 according to any of the embodiments 33-35, wherein higher layer is adapted to relate to a layer being higher than a Medium Access Control MAC protocol in the NR Radio protocol stack, and wherein lower layer is adapted to relate to a layer being equal to or lower than the MAC protocol in the NR Radio protocol stack.

Embodiment 37. The network node 110 according to any of the embodiments 33-36, wherein each SpCell configuration out of the set of SpCell configurations is adapted to be related to any one out of: a Primary Cell, PCell, or a Primary Secondary Cell, PSCell.

Embodiment 38. The network node 110 according to any of the embodiments 33-37, wherein a higher layer configuration is adapted to be transmitted by RRC signalling.

Embodiment 39. The network node 110 according to any of the embodiments 33-38, wherein the lower layer signaling is adapted to be sent by a Medium Access Control, MAC, Control Element, CE.

Embodiment 40. The network node 110 according to any of the embodiments 33-39, wherein the network node 110 is for assisting the UE 120 e.g. in any one out of: switching from one or more SpCells to other one or more SpCells e.g. in mobility, adding an SpCell and/or removing an SpCell.

Further Extensions and Variations

Figure 22:
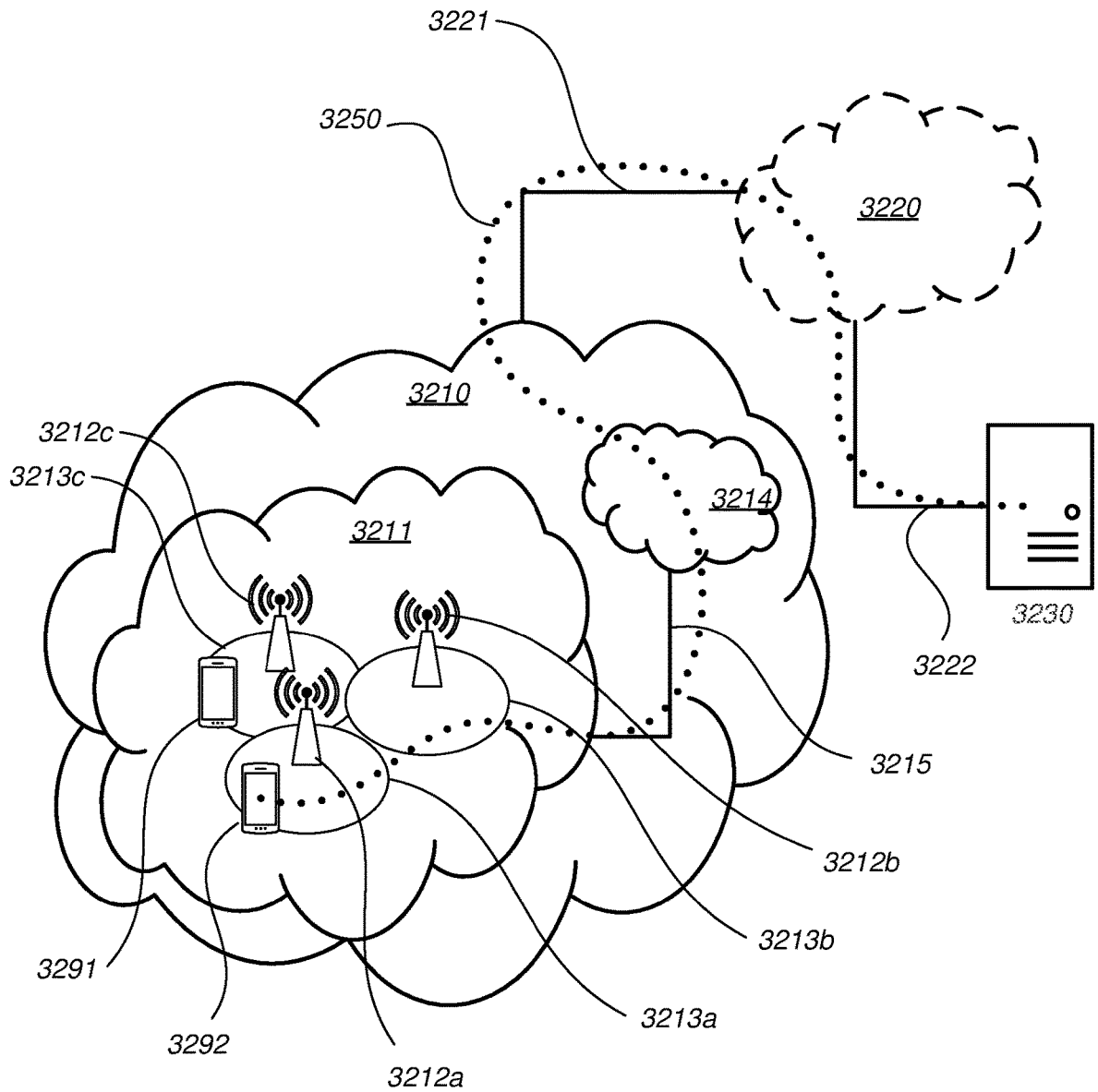
FIG. 22 schematically illustrates a telecommunication network connected via an intermediate network to a host computer.

With reference to FIG. 22, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 23. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 23) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 23:
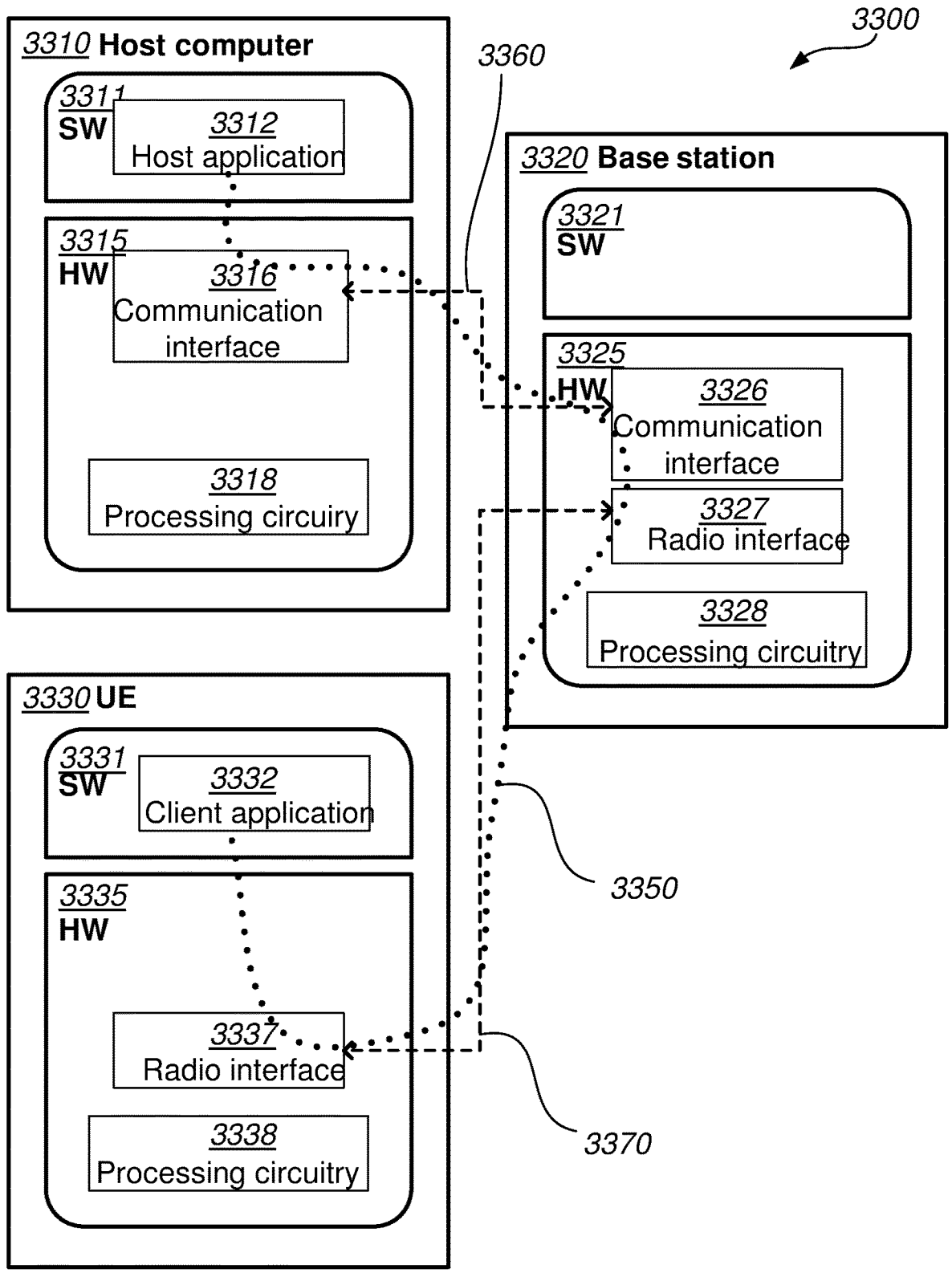
FIG. 23 is a generalized block diagram of a host computer communicating via a base station with a user equipment over a partially wireless connection.
Figure 28:
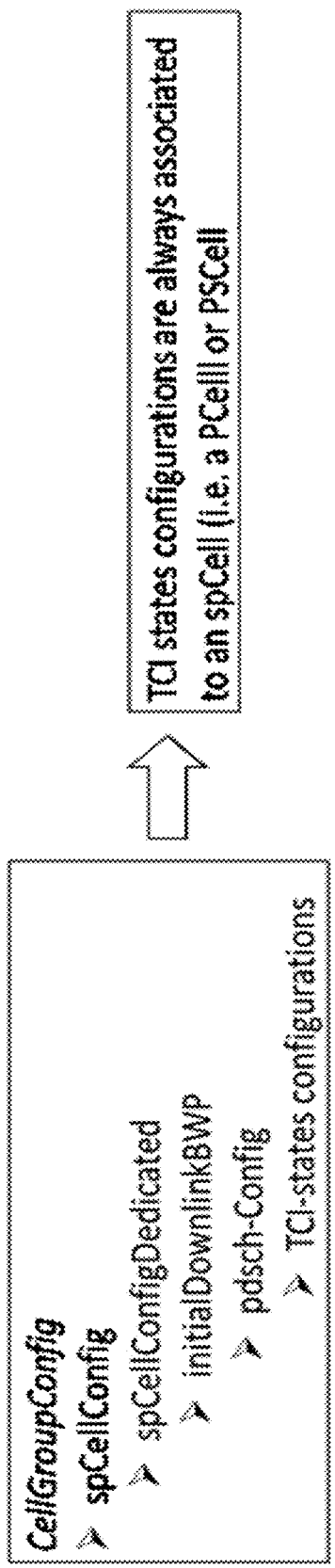

It is noted that the host computer 3310, base station 3320 and UE 3330 illustrated in FIG. 23 may be identical to the host computer 3230, one of the base stations 3212a, 3212b, 3212c and one of the UEs 3291, 3292 of FIG. 24, respectively. This is to say, the inner workings of these entities may be as shown in FIG. 23 and independently, the surrounding network topology may be that of FIG. 22.

In FIG. 23, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 24 is a flowchart illustrating a method implemented in a communication system, in accordance with one embodiment. The communication system includes a host computer, a base station such as the network node 110, and a UE such as the UE 120, which may be those described with reference to FIG. 22 and FIG. 23. For simplicity of the present disclosure, only drawing references to FIG. 24 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 25 is a flowchart illustrating a method implemented in a communication system, in accordance with one embodiment. The communication system includes a host computer, a base station such as a AP STA, and a UE such as a Non-AP STA which may be those described with reference to FIG. 22 and FIG. 23. For simplicity of the present disclosure, only drawing references to FIG. 25 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 26 is a flowchart illustrating a method implemented in a communication system, in accordance with one embodiment. The communication system includes a host computer, a base station such as a AP STA, and a UE such as a Non-AP STA which may be those described with reference to FIG. 22 and FIG. 23. For simplicity of the present disclosure, only drawing references to FIG. 26 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 27 is a flowchart illustrating a method implemented in a communication system, in accordance with one embodiment. The communication system includes a host computer, a base station such as a AP STA, and a UE such as a Non-AP STA which may be those described with reference to FIG. 22 and FIG. 23. For simplicity of the present disclosure, only drawing references to FIG. 27 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a User Equipment (UE), the method comprising:
receiving from a network node, a higher layer configuration comprising a set of SpCell configurations, to be configured in the UE,
receiving from the network node a higher layer configuration comprising one or more Transmission Configuration Indication (TCI) state configurations to be configured in the UE, wherein the TCI state configurations are associated to one or more SpCells;
while being in connected state, receiving a lower layer signaling from a network node, wherein the lower layer signaling comprises an indication that indicates any one out of:
the one or more SpCells, wherein the one or more SpCells comprised in the set of SpCell configurations, to be any one or more out of: activated or deactivated, and
one or more TCI states comprised in the one or more TCI state configurations,
when receiving an indication indicating one or more TCI states, wherein the one or more TCI states is associated with a configured SpCell that is currently not activated, performing deactivation of a currently activated SpCell, and activation of an SpCell associated with the indicated one or more TCI states.

2. The method according to claim 1, further comprising:
based on the set of SpCell configurations, performing the indicated activation, or deactivation of the indicated one or more SpCells.

3. The method according to claim 1, further comprising:
receiving from a network node a higher layer configuration comprising one or more Transmission Configuration Indication, TCI, state configurations to be configured in the UE, which TCI state configurations are associated to the configured SpCells comprised the set of SpCells.

4. The method according to claim 3, further comprising:
based on the set of TCI, state configurations, performing the indicated activation, or deactivation of the indicated one or more SpCells.

5. The method according to claim 3, further comprising:
based on the set of SpCell configurations and TCI state configurations, identifying the TCI state associated with the indicated one or more SpCells and based on the identified TCI state, performing the indicated activation, or deactivation of the indicated one or more SpCells.

6. The method according to claim 1, wherein higher layer relates to a layer being higher than a Medium Access Control, MAC, protocol in the NR Radio protocol stack, and wherein lower layer relates to a layer being equal to or lower than the MAC protocol in the NR Radio protocol stack.

7. The method according to claim 1, wherein each SpCell configuration out of the set of SpCell configurations is related to any one out of: a Primary Cell, PCell, or a Primary Secondary Cell, PSCell.

8. The method according to claim 1, wherein a higher layer configuration is received by RRC signalling.

9. The method according to claim 1, wherein the lower layer signaling is received by a Medium Access Control, MAC, Control Element, CE.

10. The method according to claim 1, wherein the method is for any one out of: switching from one or more SpCells to other one or more SpCells, adding an SpCell and/or removing an SpCell.

11. A method performed by a network node, the method comprising:
configuring a User Equipment (UE), by sending to the UE, a higher layer configuration comprising a set of SpCell configurations, to be configured in the UE,
configuring the UE, by sending to the UE, a higher layer configuration comprising one or more Transmission Configuration Indication (TCI) state configurations to be configured in the UE, wherein the TCI state configurations are associated to one or more SpCells;
while the UE is in connected state, transmitting a lower layer signaling to the UE, wherein the lower layer signaling comprises an indication that indicates any one out of:
one or more SpCells comprised in the set of SpCell configurations, to be any one or more out of: activated or deactivated, and
one or more TCI states comprised in the one or more TCI state configurations.

12. The method according to claim 11, further comprising:
further configuring the UE, by sending to the UE, a higher layer configuration comprising one or more Transmission Configuration Indication, TCI, state configurations to be configured in the UE, which TCI state configurations are associated to the configured SpCells comprised the set of SpCells.

13. The method according to claim 11, further comprising:
when exceeding a predefined time period after the lower layer signaling comprising an indication to activate an SpCell, was transmitted to the UE, deciding that the UE has applied a stored SpCell configuration that is indexed by an index received in the lower layer signaling.

14. The method according to claim 11, wherein higher layer relates to a layer being higher than a Medium Access Control, MAC, protocol in the NR Radio protocol stack, and wherein lower layer relates to a layer being equal to or lower than the MAC protocol in the NR Radio protocol stack.

15. The method according to claim 11, wherein each SpCell configuration out of the set of SpCell configurations is related to any one out of: a Primary Cell, PCell, or a Primary Secondary Cell, PSCell.

16. The method according to claim 11, wherein a higher layer configuration is transmitted by RRC signalling.

17. The method according to claim 11, wherein the lower layer signaling is sent by a Medium Access Control, MAC, Control Element, CE.

18. The method according to claim 11, wherein the method is for assisting the UE in any one out of: switching from one or more SpCells to other one or more SpCells, adding an SpCell and/or removing an SpCell.

19. A User Equipment (UE), being configured to:
receive from a network node, a higher layer configuration comprising a set of SpCell configurations, to be configured in the UE,
receive from the network node a higher layer configuration comprising one or more Transmission Configuration Indication (TCI) state configurations to be configured in the UE, wherein the TCI state configurations are associated to one or more SpCells;
while being in connected state, receive a lower layer signaling from a network node, which lower layer signaling is adapted to comprise an indication that is adapted to indicate any one out of:
an SpCell comprised in the set of SpCell configurations, to be any one or more out of: activated, or deactivated, and
one or more TCI states comprised in the one or more TCI state configurations,
when receiving an indication indicating one or more TCI states, wherein the one or more TCI states is associated with a configured SpCell that is currently not activated, perform a deactivation of a currently activated SpCell, and an activation of an SpCell associated with the indicated one or more TCI states.

20. The UE according to claim 19, further being configured to:
based on the set of SpCell configurations, perform the indicated activation, or deactivation of the indicated one or more SpCells.

21. A network node being configured to:
configure a User Equipment (UE), by sending to the UE, a higher layer configuration comprising a set of SpCell configurations to be configured in the UE,
configure the UE, by sending to the UE, a higher layer configuration comprising one or more Transmission Configuration Indication (TCI) state configurations to be configured in the UE, wherein the TCI state configurations are associated to one or more SpCells;
while the UE is in connected state, transmit a lower layer signaling to the UE, wherein the lower layer signaling is adapted to comprise an indication that indicates any one out of:
one or more SpCells comprised in the set of SpCell configurations, to be any one or more out of: activated or deactivated, and
one or more TCI states comprised in the one or more TCI state configurations.

22. The network node according to claim 21, further being configured to:
further configure the UE, by sending to the UE, a higher layer configuration comprising one or more Transmission Configuration Indication, TCI, state configurations to be configured in the UE, which TCI state configurations are adapted to be associated to the configured SpCells comprised the set of SpCells.

* * * * *